US011022297B2

(12) United States Patent
Shum

(10) Patent No.: US 11,022,297 B2
(45) Date of Patent: Jun. 1, 2021

(54) LED LIGHT RE-DIRECTION ACCESSORY

(71) Applicant: Frank Shum, Sunnyvale, CA (US)

(72) Inventor: Frank Shum, Sunnyvale, CA (US)

(*) Notice: Subject to any disclaimer, the term of this patent is extended or adjusted under 35 U.S.C. 154(b) by 0 days.

(21) Appl. No.: 16/821,791

(22) Filed: Mar. 17, 2020

(65) Prior Publication Data

US 2020/0217495 A1 Jul. 9, 2020

Related U.S. Application Data

(63) Continuation-in-part of application No. 16/713,452, filed on Dec. 13, 2019, now abandoned, which is a
(Continued)

(51) Int. Cl.
*F21V 29/77* (2015.01)
*F21V 23/00* (2015.01)
(Continued)

(52) U.S. Cl.
CPC .......... *F21V 29/773* (2015.01); *F21K 9/235* (2016.08); *F21K 9/238* (2016.08); *F21K 9/69* (2016.08); *F21V 23/005* (2013.01); *F21V 23/006* (2013.01); *F21V 23/009* (2013.01); *F21V 29/713* (2015.01); *F21V 29/74* (2015.01); *F21V 29/83* (2015.01); *H05B 45/10* (2020.01); *H05B 45/37* (2020.01); *H05B 45/395* (2020.01); *H05B 45/44* (2020.01); *F21K 9/232* (2016.08); *F21K 9/65* (2016.08); *F21K 9/68* (2016.08); *F21Y 2105/18* (2016.08); *F21Y 2115/10* (2016.08); *Y02B 20/30* (2013.01)

(58) Field of Classification Search
CPC ...... F21V 29/773; F21V 29/713; F21V 29/83; F21V 29/74; F21V 23/005; F21V 23/009; F21V 23/006; F21V 5/007; F21V 7/0016; F21V 7/0091; F21V 29/80; F21V 29/87; F21V 29/89; F21V 29/719; F21V 29/717; F21V 29/75; F21V 29/15; F21V 29/006; F21V 29/02; F21V 29/2212; F21V 29/51; F21V 29/60; F21V 29/67; F21V 29/71; F21V 29/76; F21V 29/763; F21V 29/90; F21K 9/238; F21K 9/235; F21K 9/69; F21K 9/68; F21K 9/65; F21K 9/232; F21K 9/23; F21K 9/00; F21K 9/60; H05B 45/10; H05B 45/37; H05B 45/44; H05B 45/395; H05B 47/105; H05B 47/175; Y02B 20/30
See application file for complete search history.

(56) References Cited

U.S. PATENT DOCUMENTS 9,228,724 B2 * 1/2016 Wu .................. F21S 8/026
9,488,324 B2 * 11/2016 Shum .................. F21V 7/00
10,619,808 B2 * 4/2020 Serak .................. F21S 8/04

* cited by examiner

Primary Examiner — Vibol Tan
(74) Attorney, Agent, or Firm — Craige Thompson; Thompson Patent Law

(57) ABSTRACT

Apparatus and associated methods relate to development of a LED system with high thermal dissipation power relative to the system weight by the inclusion of open regions. The open regions reduce the weight of the optical system while improving airflow. Associated optics are described to efficiently and evenly distribute the light from an LED by tailoring the optical distribution. In addition, circuitry and methods are described to allow for the LED system to operate with existing power sources such as ballast or offline AC voltage sources or both.

20 Claims, 67 Drawing Sheets

Related U.S. Application Data continuation of application No. 16/130,891, filed on Sep. 13, 2018, now abandoned, which is a continuation of application No. 15/880,369, filed on Jan. 25, 2018, now Pat. No. 10,082,284, which is a continuation-in-part of application No. 15/407,140, filed on Jan. 16, 2017, now Pat. No. 9,897,304, which is a continuation of application No. 15/215,964, filed on Jul. 21, 2016, now Pat. No. 9,581,323, which is a continuation-in-part of application No. 14/952,079, filed on Nov. 25, 2015, now Pat. No. 9,420,644.

(60) Provisional application No. 62/141,010, filed on Mar. 31, 2015.

(51) Int. Cl.
| | |
|---|---|
| *F21V 29/71* | (2015.01) |
| *F21K 9/238* | (2016.01) |
| *F21V 29/83* | (2015.01) |
| *F21V 29/74* | (2015.01) |
| *F21K 9/235* | (2016.01) |
| *F21K 9/69* | (2016.01) |
| *H05B 45/10* | (2020.01) |
| *H05B 45/37* | (2020.01) |
| *H05B 45/44* | (2020.01) |
| *H05B 45/395* | (2020.01) |
| *F21Y 105/18* | (2016.01) |
| *F21Y 115/10* | (2016.01) |
| *F21K 9/68* | (2016.01) |
| *F21K 9/65* | (2016.01) |
| *F21K 9/232* | (2016.01) |

SECTION L-L

Isometric View

Section D-D

Isometric View

Front View

Isometric View

Front View

Isometric View**

Front View**

Isometric View

Top View

Exploded View

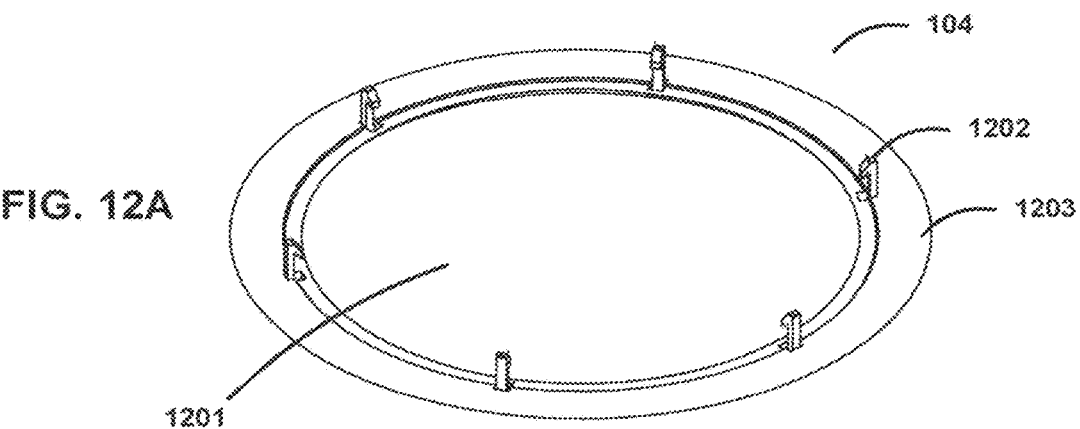
FIG. 12A
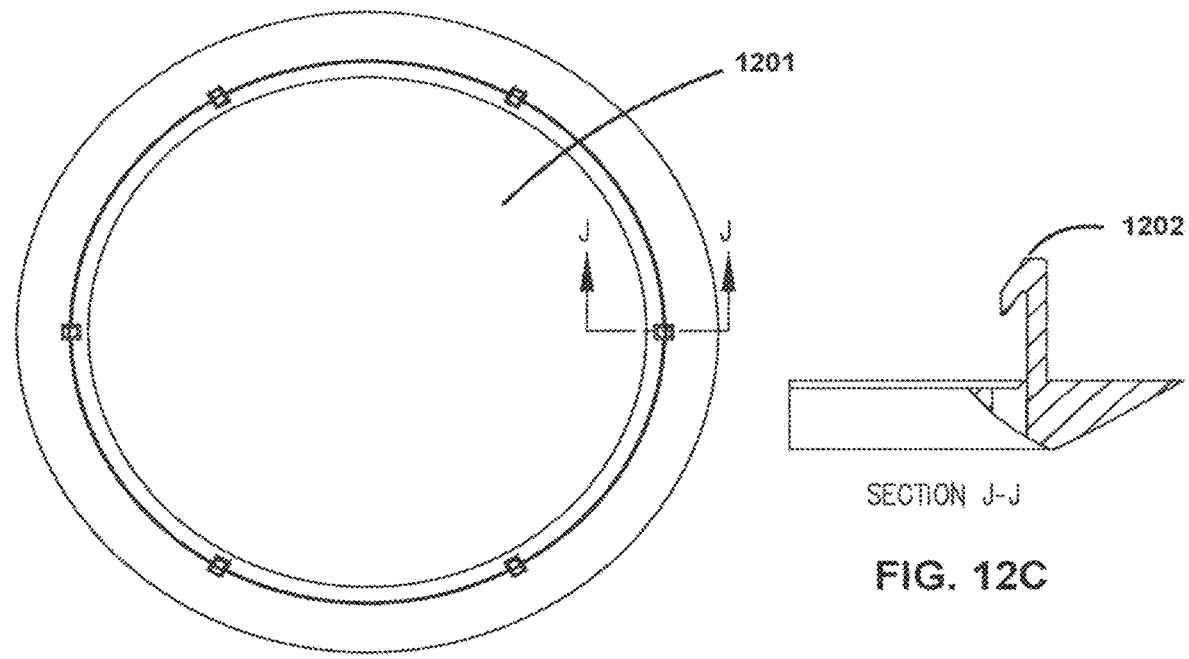
FIG. 12B
SECTION J-J
FIG. 12C

SECTION F-F

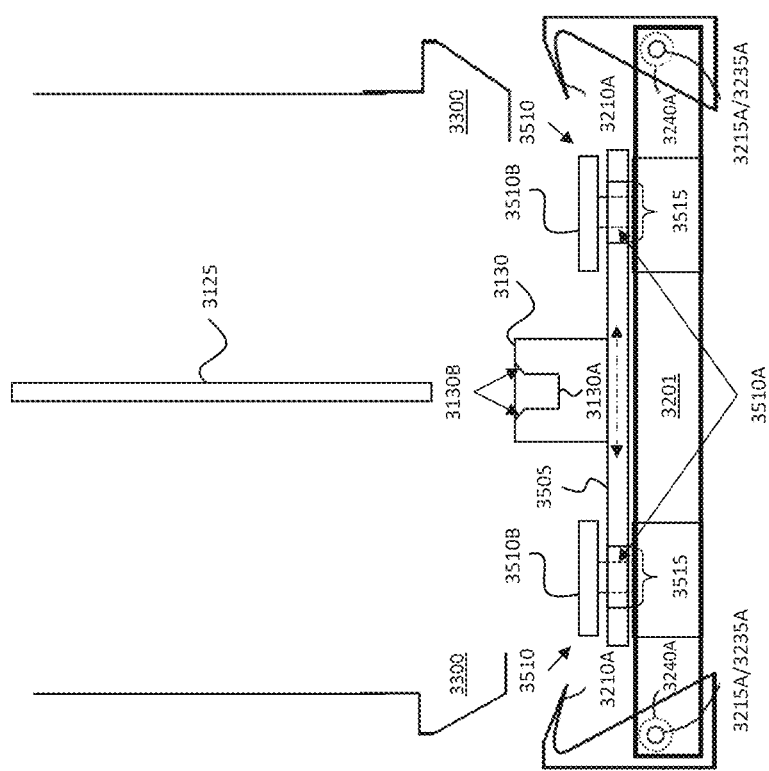

LED LIGHT RE-DIRECTION ACCESSORY

CROSS-REFERENCE TO RELATED APPLICATIONS

This application is a Continuation-in-Part and claims the benefit of U.S. patent application Ser. No. 16/713,452 entitled "LED Light Re-Direction Accessory," filed by Frank Shum on Dec. 13, 2019, which is a Continuation and claims the benefit of U.S. patent application Ser. No. 16/130,891 entitled "LED Light Re-Direction Accessory," filed by Frank Shum on Sep. 13, 2018, which is a Continuation-in-Part and claims the benefit of U.S. patent application Ser. No. 15/880,369 entitled "LED Light Re-Direction Accessory," filed by Frank Shum on Jan. 25, 2018, now U.S. Pat. No. 10,082,284, which is a Continuation-in-Part of U.S. patent application Ser. No. 15/407,140 entitled "LED Light Re-Direction Accessory," filed by Frank Shum on Jan. 16, 2017, now U.S. Pat. No. 9,897,304, which is a Continuation of U.S. patent application Ser. No. 15/215,964 titled "LED Lighting," filed by Frank Shum on Jul. 21, 2016, now U.S. Pat. No. 9,581,323, which is a Continuation-in-Part of U.S. patent application Ser. No. 14/952,079 titled "LED Lighting," filed by Frank Shum on Nov. 25, 2015, now U.S. Pat. No. 9,420,644, which claims the benefit of U.S. Provisional Application Ser. No. 62/141,010 titled "LED Lighting," filed by Frank Shum on Mar. 31, 2015.

This application incorporates herein the entire contents of the foregoing applications by reference.

TECHNICAL FIELD

Various embodiments relate generally to improved LED (light emitting diode) lighting sources, and some embodiments relate particularly to lightweight improved thermal management. Other embodiments relate to optics with optional accessories with tailored distributions targeted for particular optical distributions. Other embodiments relate to electronics necessary for operation of the LED system with legacy ballast.

BACKGROUND

The field of LED lighting has made tremendous progress, however thermal management remains a challenge, particularly where the high light output is required relative to the allowable size of LED lighting system. This is a particular issue, namely, to replace high light output and high light density lamps and fixture. One such area that remains a challenge is high intensity discharge (HID) Lamps that have very high light output. For example, a 400 W HID lamp of less than 300 mm long and 120 mm diameter will have more than 35,000 lumens.

Types of HID lamps include metal halide lamp, high pressure sodium lamp and low pressure sodium lamps. These types of lamps require a warm up period of 1 to 15 minutes to reach 90% of their full light output. After a lamp has been operating for a period of time and then extinguished, it cannot be immediately turned back on. Before the lamp can be turned back on, the arc tube must have a chance to cool down or the lamp will not restart. This period of time is called the restrike time. Restrike times for traditional probe-start MH lamps can take 15 minutes or longer while restrike times for pulse-start MH lamps are generally much shorter. The long warm up time and long restrike time are a disadvantage. HID lamps may also contain mercury, a hazardous material, and may have only moderate life spans of about 10,000-20,000 hours, some may have rapid lumen depreciation in the first 3000-5000 hours.

In addition, HID lamps are an omni-directional light source which may be difficult to efficiently redirect into a more useful and efficient distribution. The optics used for redirecting the light can be expensive and lossy. For example, a fixture light loss factor, or the optical loss may typically be around 30%. So, the moderate efficiency of a HID lamp is immediately discounted by 30%. It is also typically difficult to control the light, resulting glare that is not only wasted but a source of visual discomfort.

SUMMARY

Apparatus and methods relate to a lighting system having a unique combination of one or more of the following sub systems including: a light emitting diode (LED), a heatsink, an electronic driver, a primary optic that redirects at least a portion of the raw LED light distribution into a primary optical distribution, a secondary optical accessory that redirects at least a portion of the primary optical distribution into a secondary optical distribution, and an electronic accessory. The system may be an optical system such as, for example, a lamp, a fixture, a luminaire, a module, an optical sub system or a light engine. The sub-systems may be novel alone or in combination with other sub systems. The sub systems, or a combination thereof, may be novel and need not be related to LEDs.

In various embodiments, a set of combined geometries may provide for improved air flow to a heatsink, thus improving thermal dissipation. In some embodiments, the heat sink construction may allow for reduced weight.

In various embodiments, optics may be used to tailor the light into predetermined optical distributions, thus increasing the efficiency of the system. In a some embodiments, the distribution may be tailored to have a cut off such that above certain angles, there is substantially little light. In various embodiments, a secondary optical accessory may be used to change the optical distribution, for example, to provide uplight or asymmetrical distributions.

In some embodiments, the LED system may be designed to be less than 4 lbs with the capacity to emit greater than 10,000 lumens. In some embodiments, the LED systems may be designed to operate from offline AC voltage sources. In various embodiments, the LED systems may be designed to operate from a ballast. In some embodiments, the LED systems may be designed to operate from offline AC voltage sources. In various embodiments, the LED systems may be designed to operate from a ballast and from offline AC voltage sources.

Although the technology described is particularly applicable to LED lamps such as PAR, MR, BR, HID shapes, it can also be applied to build LED fixtures or more generally any LED systems. In some embodiments, the LED lighting system may replace HID lamps used in high bay or low bay applications. In some implementations, references to high bay also apply to low bay implementations and vice versa.

In the illustrations and embodiments of this disclosure, the orientation of LED system is shown with LED pointing in a downward orientation so the air flow from bottom through the LED and/or optics into interior of the heatsink and outward through the back of the LED system. However, the orientation may be reversed so the inlet is the back of the LED system and the air outlet is the front of the system. In other embodiments, the LED system may be of a skewed orientation. As such, the embodiments are not necessarily restricted to any particular orientation.

The details of various embodiments are set forth in the accompanying drawings and the description below. Other features and advantages will be apparent from the description and drawings, and from the claims.

BRIEF DESCRIPTION OF THE DRAWINGS

FIGS. 12A, 12B and 12C depict an isometric view and a front view of an exemplary optical accessory.

FIG. 25 depicts a process by which the control scheme can determine the type of power source it is connected to.

FIG. 35 depicts a side cross-sectional view of an exemplary electronic accessory configured to couple with an LED system, including a floating printed circuit board (PCB).

ILLUSTRATIVE EMBODIMENTS

Figure 1A:
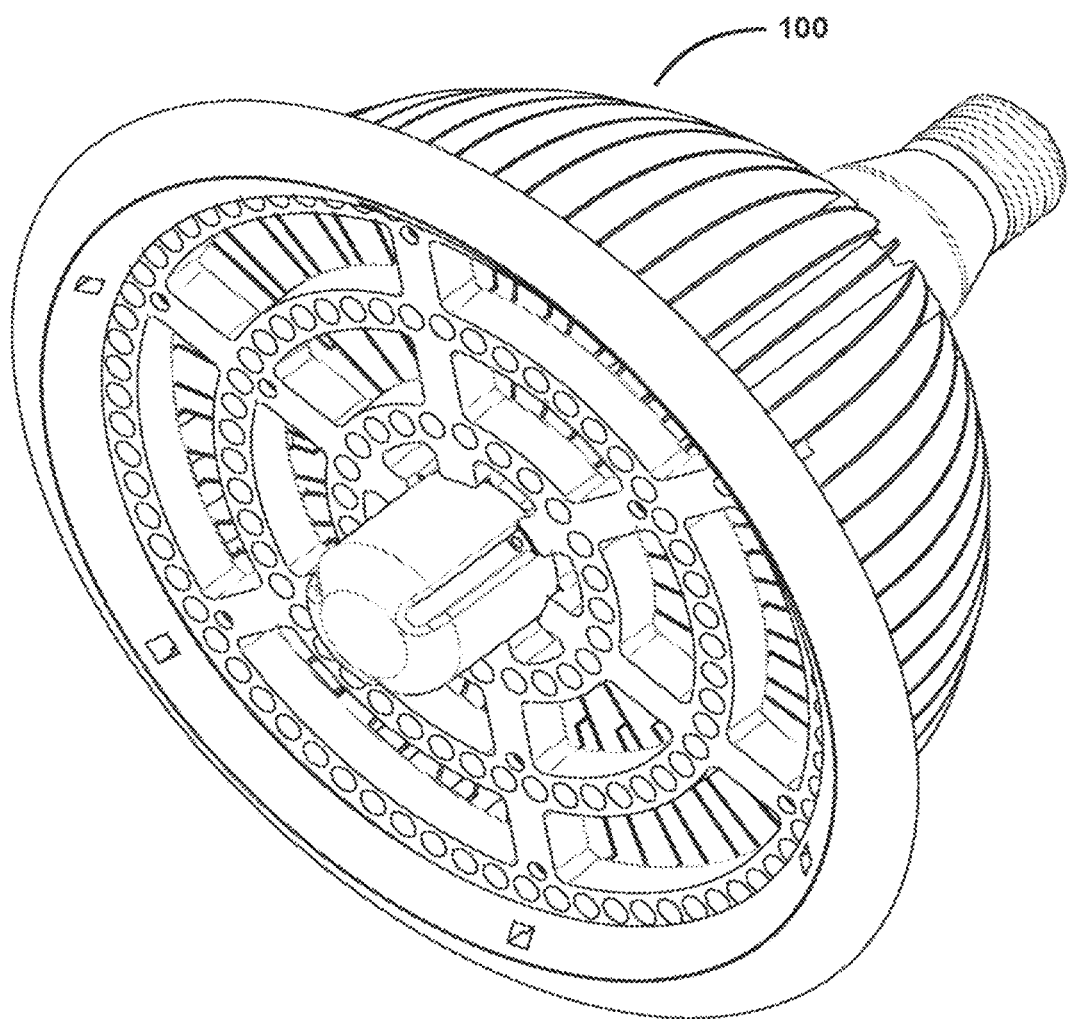
FIG. 1A depicts an isometric view of an exemplary LED system.

FIG. 1A depicts an isometric view of an exemplary LED system. As depicted, the LED system is in the form factor of a LED Lamp 100.

Figure 1B:
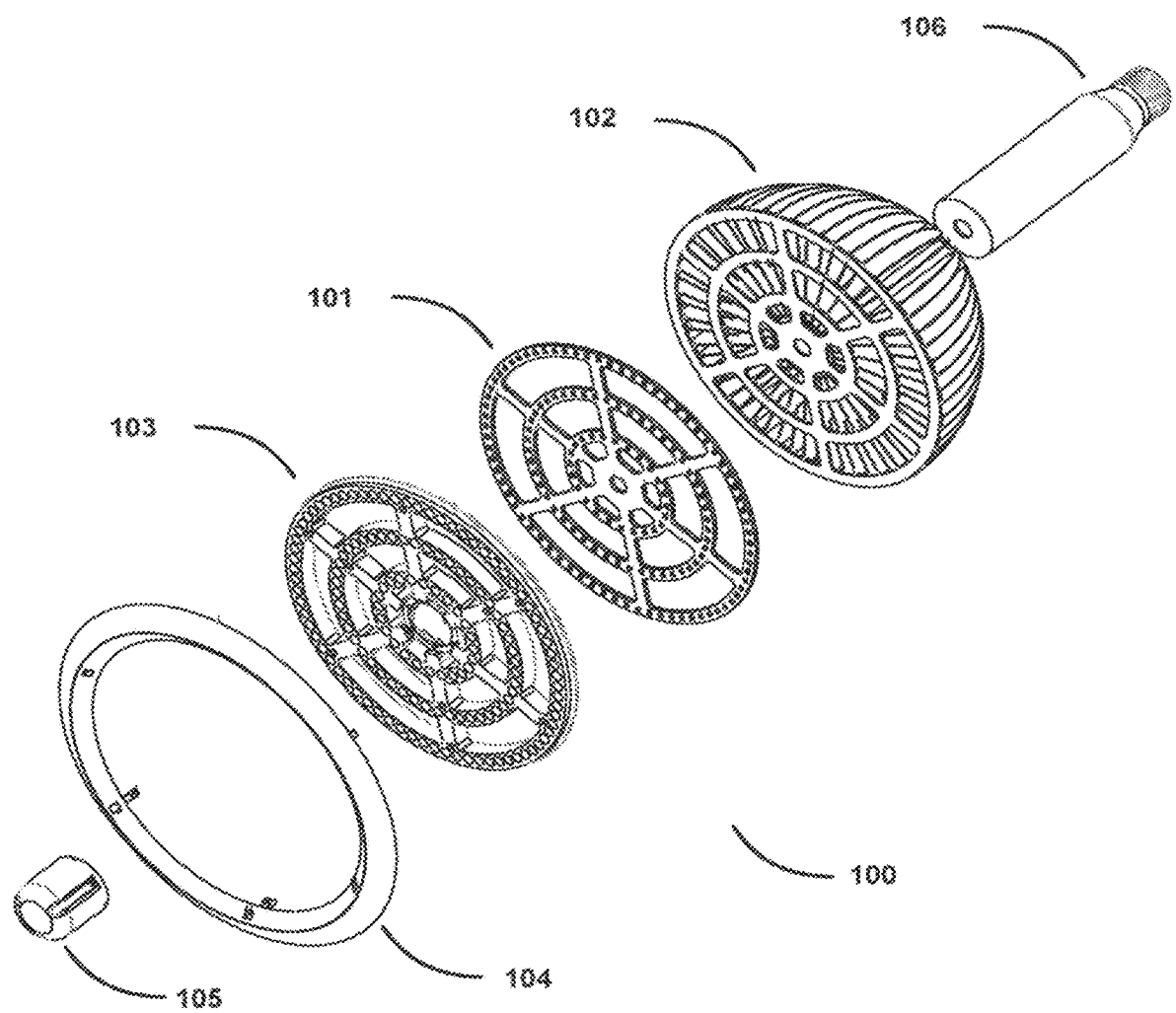
FIG. 1B depicts an exploded view of an exemplary LED system.

FIG. 1B depicts an exploded view of an exemplary LED system. With reference to FIG. 1A, the LED system includes the following subsystems: a light emitting diode (LED) 101, a heatsink 102, an electronic driver 106, a primary optic 103, a secondary optic accessory 104, and an electronic accessory 105.

Each sub-system 101-106, having characteristics, features, permutations or variations described in further detail below.

LED

The LED referenced in this disclosure is intended to be very general in nature. The LED includes at least one light emitting semiconductor die and, optionally, packaged with phosphor or integral optic or external optic or mounted on to a PCB.

The LED having at least a portion of its spectrum emitting in the range 250 nm to 900 nm, such as, for example, UV, visible or infrared regions.

The LED may be packaged in a format that allows for mounting to a PCB. The PCB material, such as, for example, fiber glass resin material (e.g., FR4) or a metal core printed circuit board (MCPCB), may have improved thermal dissipation characteristics. The LED package may be a surface mountable device (SMD), chip on board (COB) or chip scale package (CSP) or other well know packaging methods.

In the event where there are at least two LEDs, the LEDs may have substantially similar spectrums or substantially dissimilar spectrums. For example, different spectrums may include a color that is red, orange, yellow, green, blue, indigo, violet, ultra violet or infra-red or different color temperatures of white.

Figure 2A:
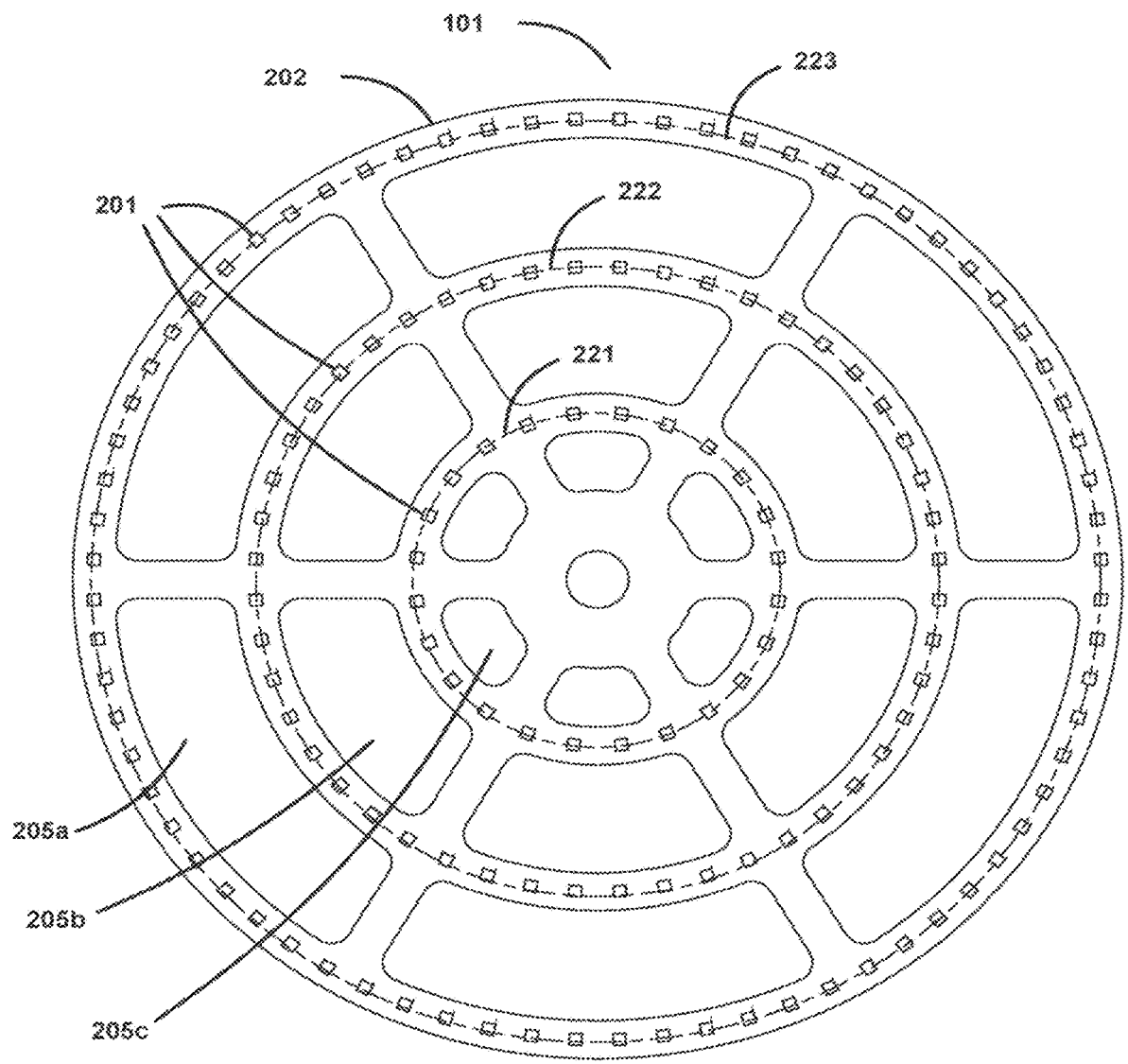
FIG. 2A depicts a front view an exemplary LED embodiment.

FIG. 2A depicts a front view an exemplary LED embodiment. With reference to FIG. 1B, LED 101 includes one hundred and forty-four LED packages 201 mounted to a printed circuit board (PCB) 202. The LEDs are arranged in an inner ring or perimeter 221, a middle ring or perimeter 222 and an outer ring or outer perimeter 223. The middle perimeter 222 does not cross the outer perimeter 223. The inner most perimeter 221 does not cross the middle perimeter 222. The word ring and perimeter are used interchangeably. As depicted, the outer ring has more LEDs than the inner ring. The inner ring 221 having twenty-four LED packages, the middle ring 222 having forty-eight LED packages, and the outer ring 223 having seventy-two LED packages. The outer ring 223 encircling, encompassing, enclosing or containing all the LEDs as well as the middle ring 222 and inner most ring 221. The middle ring 222 containing the inner ring 221. At least one open region 205a is contained between the middle ring 222 and the outer ring 223. At least one open region 205b is contained between the inner ring 221 and the middle ring 222. At least one open region 205c is contained within the inner ring 221. The open regions 205a, 205b and 205c may allow for air flow.

Spreading the LEDs across multiple rings may provide advantages over a single ring containing all the LEDs or if all the LEDs were concentrated in a central region. The placing of LEDs across multiple rings may enable the LED to be thermally distributed more evenly across the surface contained within the outer perimeter and thereby lower thermal while enabling more LEDs to be disposed on the surface. In various embodiments, the LED may include at least one opening between the rings of LEDs.

Figure 2B:
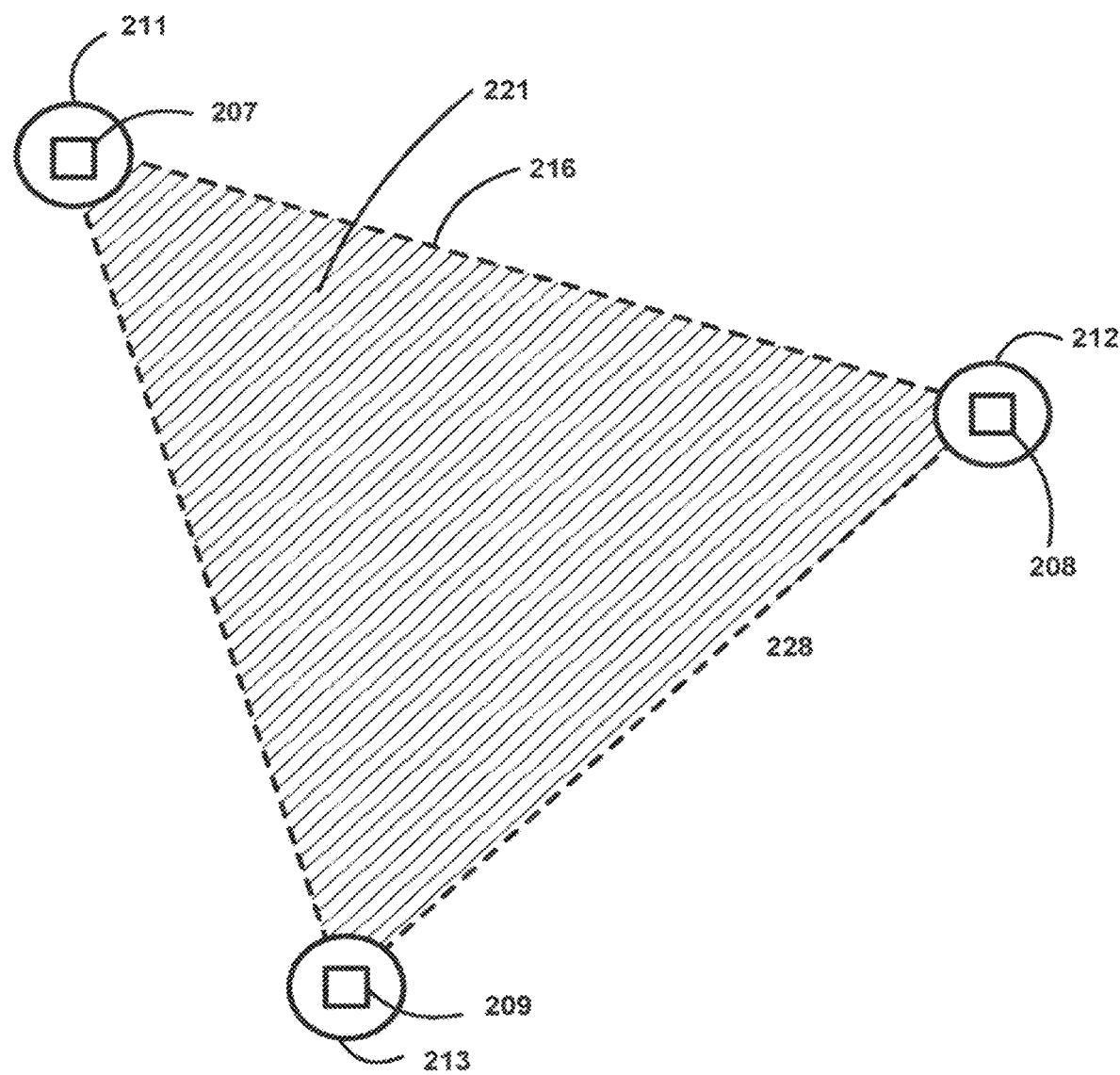
FIG. 2B depicts a conceptual view of exemplary opening or open regions between the LEDs.

FIG. 2B depicts a conceptual view of exemplary opening or open regions between the LEDs. As depicted, a LED (e.g., the LED 101) includes at least 3 LEDs 207-209, each LED 207-209 mounted on a printed circuit board (PCB) 211-213, respectively. The PCBs 211-213 may be mechanically isolated or mechanically connect to each other. For example, the dotted lines may represent PCB, or other material, that mechanically connects to at least two of the PCB 211-213. An outer perimeter 216 is formed by the outer LEDs 207-209. The outer perimeter 216 containing, encompassing, encircling, or containing all the LEDs in the system. The PCB open region 221 is formed within the outer perimeter 216 and between the PCBs 211-213 allowing for air to flow between the LEDs.

Figure 2C:
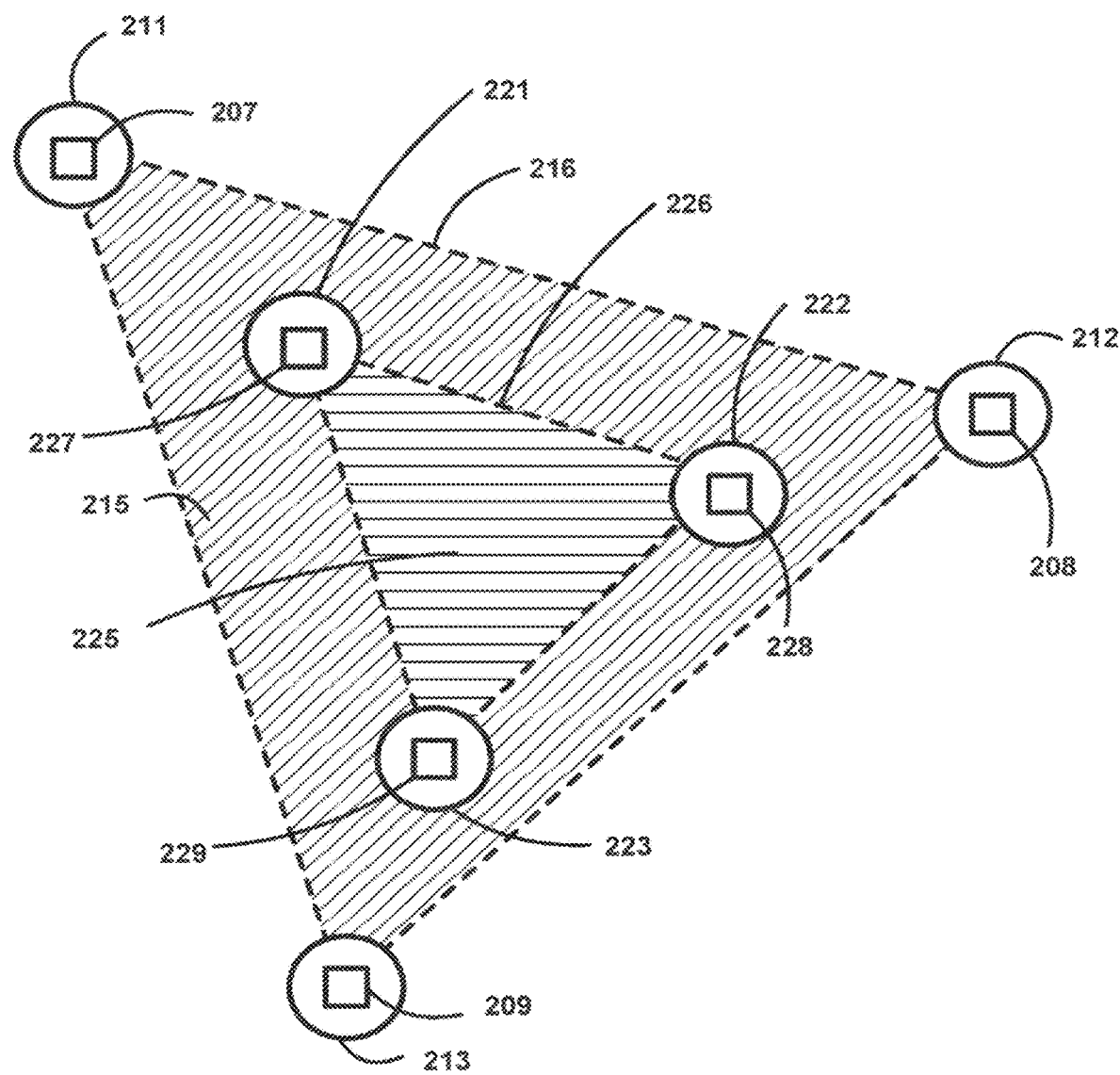
FIG. 2C depicts a conceptual view of exemplary openings of a LED.

FIG. 2C depicts a conceptual view of exemplary openings or open regions between the LEDs. With reference to FIG. 2B, the LED further includes an inner perimeter 226 contained within the outer perimeter 216. As depicted, the inner perimeter is formed by three LEDs 227-229. Each LED 227-229 mounts on a PCB 231-233, respectively. At least one of the LEDs 227-229 forming the inner perimeter 226 may be different than the LEDs 207-209 forming the outer perimeter 216. The outer perimeter 216 and the inner perimeter 226 do not cross each other. The outer perimeter 216 encloses the inner perimeter 226. The PCBs 227-229 may be mechanically isolated or mechanically connect together. For example, the dotted lines may represent PCB, or other material, that mechanically connects at least two of the PCBs 227-229. The inner perimeter 226 contains at least one inner open region 225 that allows for air flow between the LEDs. The inner perimeter 226 is completely contained by the outer perimeter 216. The addition of the inner perimeters 226, with optics (not shown), allows for the LEDs, and thus the LED generated heat, to be optimally spread across a surface defined and bounded by the outer perimeter, allowing for improved heat dissipation resulting and a more even temperature distribution across the heatsink surface.

In various embodiments, at least one of the LEDs 227-229 may be mounted near the edge or near the perimeter of the mechanics that comprise the LED optical system. In some embodiments, the LEDs 227-229 may be mounted within 25 mm of the edge of the optical system. With reference to FIGS. 1B-2B, the outer ring of the LED 223 is mounted within 25 mm of the diameter edge of the heatsink 102.

Primary Optic

The primary optic redirects at least a portion of light from at least one LED into a first optical distribution. The type of optic is intended to be very general and may accomplish the redirection of light through mechanisms such as reflection or refraction or combinations thereof. Reflective or refractive elements may include convex lens, concave lens, air compound parabolic reflector (air CPC), dielectric compound parabolic reflector (dielectric CPC), Fresnel lens, total internal reflection lens (TIR), gradient index lens, diffractive lens, micro lenses, micro structures, diffractive optics, segmented lens, RXI lens, light guide or light guide taper or combinations thereof. The primary optic may consist of a single optic or an array of optics.

In some embodiments, the LED system may include at least three LEDs, each LED having its own optic. Within an outer perimeter formed by the at least three LEDs, at least one open region may be formed within the optic and LEDs that allows for improved air flow when compared to an open region that is blocked.

In some embodiments, the LED system 101 has at least three LED packages and at least one optic. The optic may be shared by the LEDs. The optic may have an open region. An outer perimeter formed by the at least three LEDs includes at least one open region. The open region for the optic and the LEDs may allow for improved air flow. In an illustrative example, the optic may be a reflector, such as, for example, a prismatic reflector, a mirror, or an aluminum metal reflector. Such reflector structures may have an open structure that allows for air flow.

Figure 3:
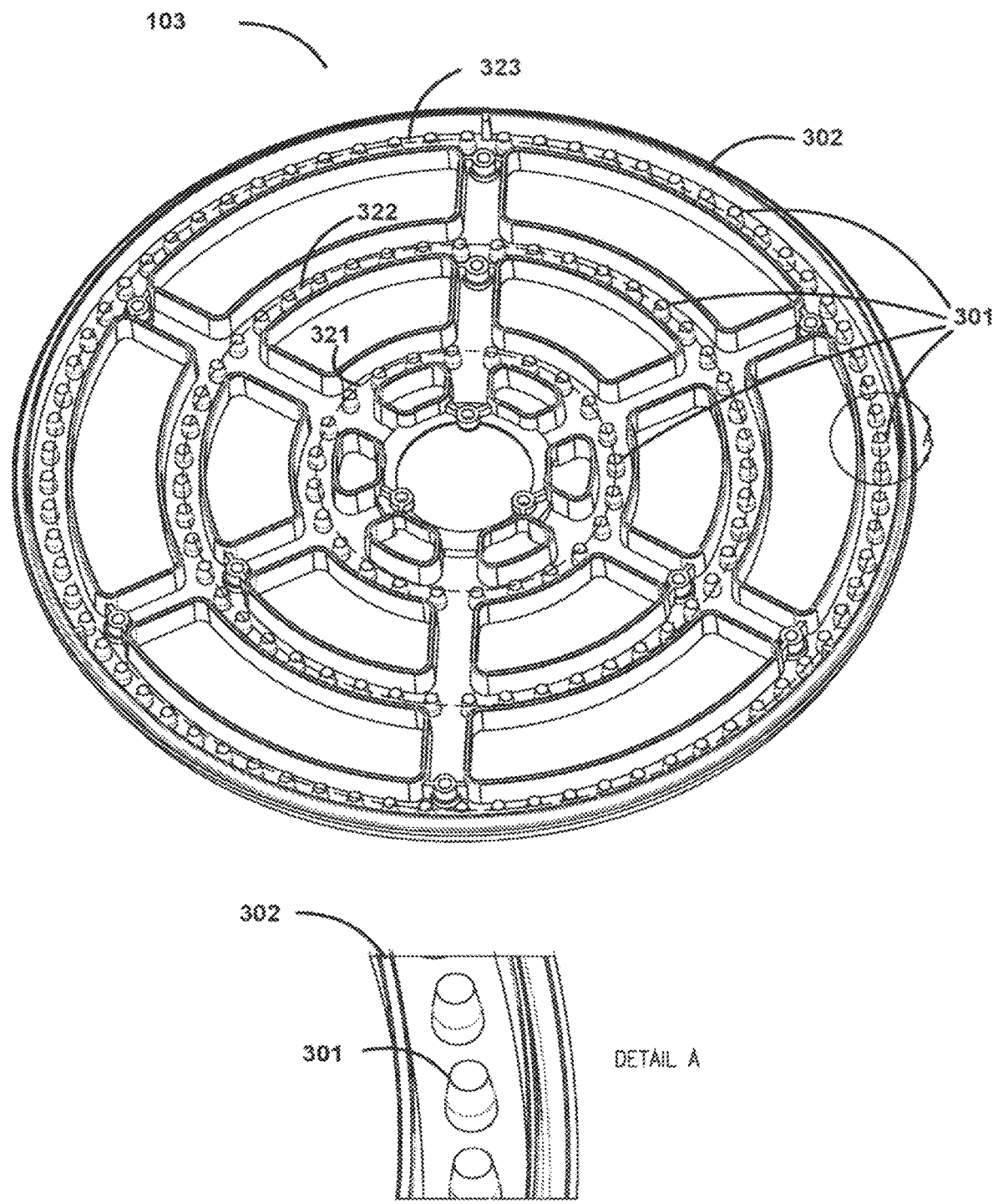
FIG. 3 depicts a rear view of a primary optic having at least one optic.

FIG. 3 depicts a rear view of primary optic having at least one optic 301. With reference to FIGS. 1A-3, each optic 301 corresponds to at least one LED package 201 of the LED 101. The optic 301 redirects at least a portion of the raw light output, from at least one LED package 201, into a first optical distribution. As depicted, there are one hundred and forty-four optics 301. The optics 301 are arranged such that an inner ring 321 of twenty-four optics corresponds to the LED packages 201 of the inner ring 221, a middle ring 322 of forty-eight optics corresponds to the LED packages 201 of the middle ring 222, and an outer ring 323 of seventy-two optics corresponds to the LED packages 201 of the outer ring 223. The individual optics 301 are held together by a holder 302 to form a common mechanical unit held together for ease of assembly. The material for the optics may be substantially optically transmissive and include material such as acrylic, polycarbonate or glass. If the material is plastic, the material may be fabricated using injection molding or compression molding techniques.

Figure 4A:
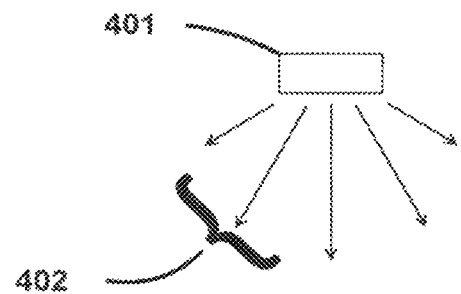
FIG. 4A depicts a raw light output distribution from an exemplary LED.

FIG. 4A depicts a raw light output distribution from an exemplary LED. As depicted, a raw light output 402 from an exemplary LED package 401 tends to be substantially Lambertian in distribution with a full width half maximum beam angle (FWHM) of about 120 degrees (120°). The purpose of the primary optic is to redirect at least a portion of this raw output into an overall first optical distribution. In some embodiments, the first optical distribution has a FWHM<120°, for example FWHM<100° or FWHM<90°.

Figure 4B:
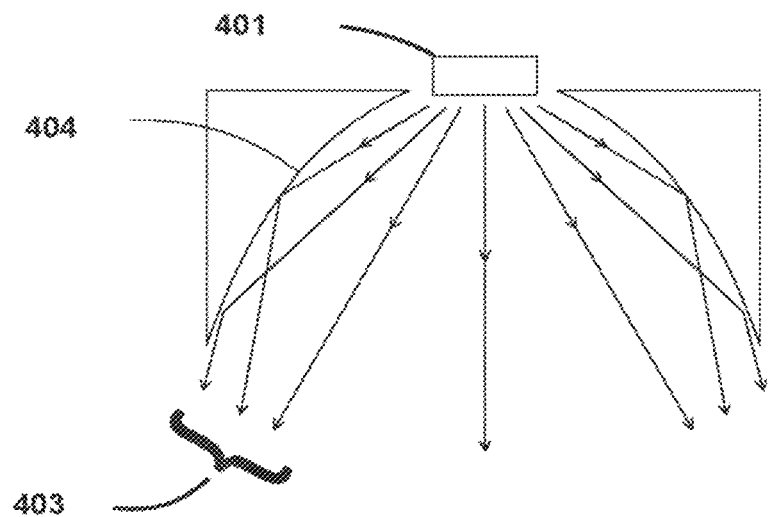
FIG. 4B depicts a reflector with a reflective surface redirecting at least a portion of a raw light output from an exemplary LED package.

FIG. 4B depicts a reflector with a reflective surface redirecting at least a portion of a raw light output from an exemplary LED package. The total resulting light includes redirected and un-redirected light which form a first optical distribution 403. A reflective surface 404 may be formed by a metal coating on to a substrate material of appropriate shape to reflect the incident light into at least a portion of the first optical distribution. In such a case, since the light does not penetrate the substrate material, the substrate material needs not be optically transmissive. In some embodiments, at least a portion of the reflective surface 404 may be substantially in the shape, or based on the shape, of a compound parabolic concentrator (CPC).

Figure 4C:
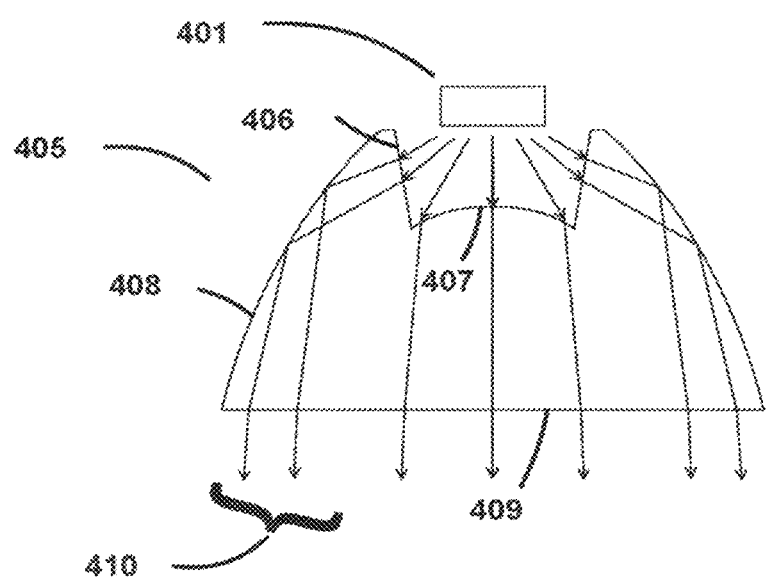
FIG. 4C depicts a light output distribution of a total internal reflection (TIR) lens.

FIG. 4C depicts a light output distribution of a total internal reflection (TIR) lens. Input refractive surfaces 406, 407 refract at least a portion of the raw light output 402 from the LED 401. At least a portion of the light refracted by input surface 407 is further refracted by exit surface 409. At least a portion light refracted by input surface 406 is reflected by TIR surface 408 and then refracted by exit surface 409. The total resulting light forms a first optical distribution 410.

Figure 4D:
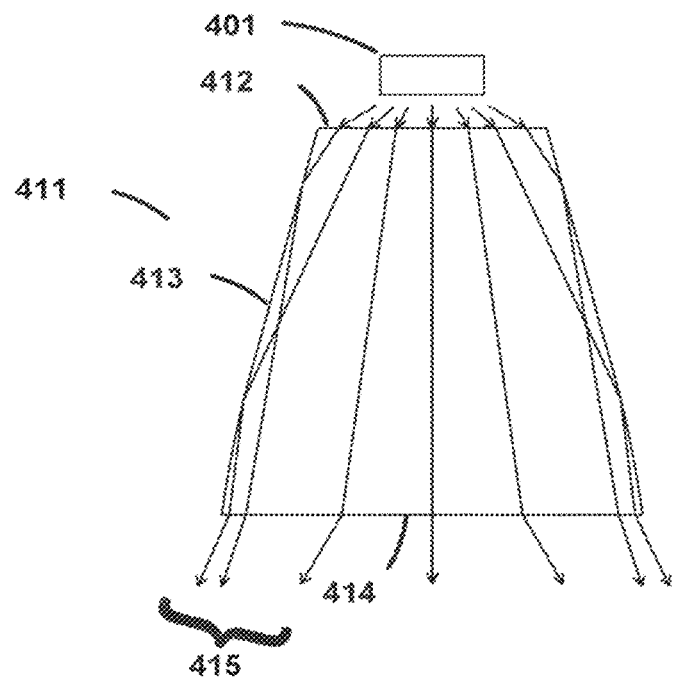
FIG. 4D depicts a light output distribution of a dielectric CPC.

FIG. 4D depicts a light output distribution of a dielectric CPC. An input surface 412 refracts at least a portion of the raw light output 402 from the LED 401. At least a portion of the light refracted by the input surface 412 is further refracted by an exit surface 414. At least a portion of the light refracted by the input surface 412 is further totally internally reflected by a surface 413 and then refracted by an exit surface 414. The total resulting light forms a first optical distribution 415. In an illustrative example, the surfaces 414, 412 are substantially flat. In some embodiments, at least a portion of either of the surfaces 414, 412 are curved.

Figure 4E:
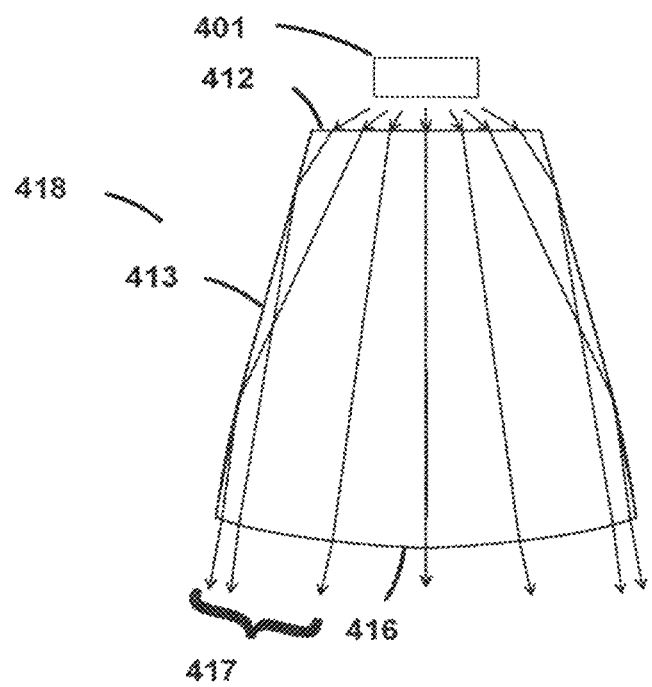
FIG. 4E depicts a light output distribution of aa dielectric CPC with an output surface explicitly curved in a convex shape.

FIG. 4E depicts a light output distribution of a dielectric CPC with an output or exit surface explicitly curved in a convex shape. As depicted, a first optical distribution 417 results from an output surface 416 being explicitly curved in a convex shape. The output surface 416 may advantageously reduce wide angle rays in the first optical distribution 415 to a distribution 417 with less wide angle light. The resulting distribution 417 may reduce glare.

Figure 4F:
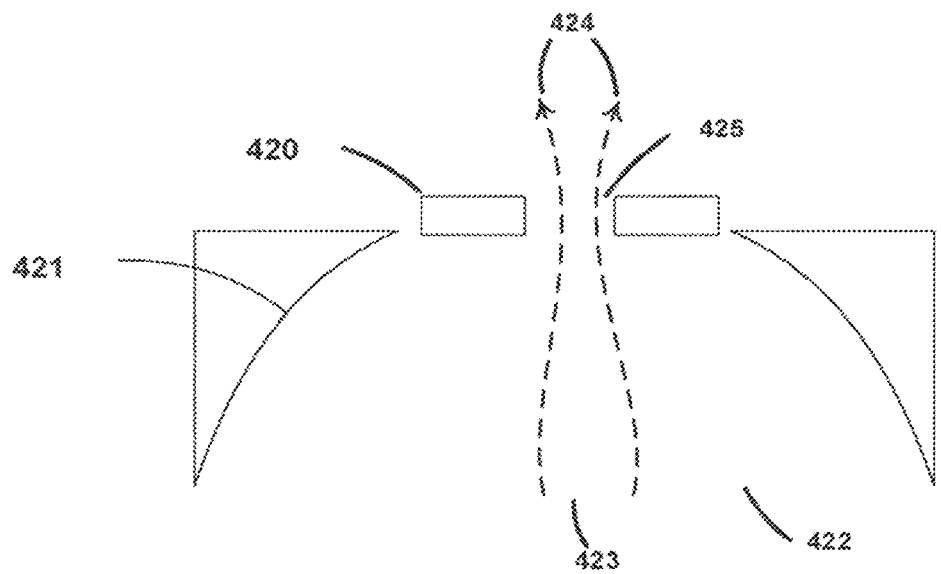
FIG. 4F depicts a side view of an LED system having multiple LED packages 420 corresponding to one optic.

FIG. 4F depicts a side view of an LED system having multiple LED packages corresponding to one optic. As depicted, an optic 421 is shared by at least three of the LEDs 420 (third LED not shown). The optic 421 having an open region 422. Within an outer perimeter, formed by at least three LEDs 420, includes an open region 425. In various embodiments, the outer perimeter may include multiple open regions. The open region 425, as formed by the optic 421 and the LEDs 420 may allow for improved air flow 423, 424. For example, the optic 421 may be a reflector, such as, for example, a prismatic reflector, or a coated mirror, or an aluminum metal reflector. Generally, such reflectors are open structures to permit air to flow freely.

Figure 5A:
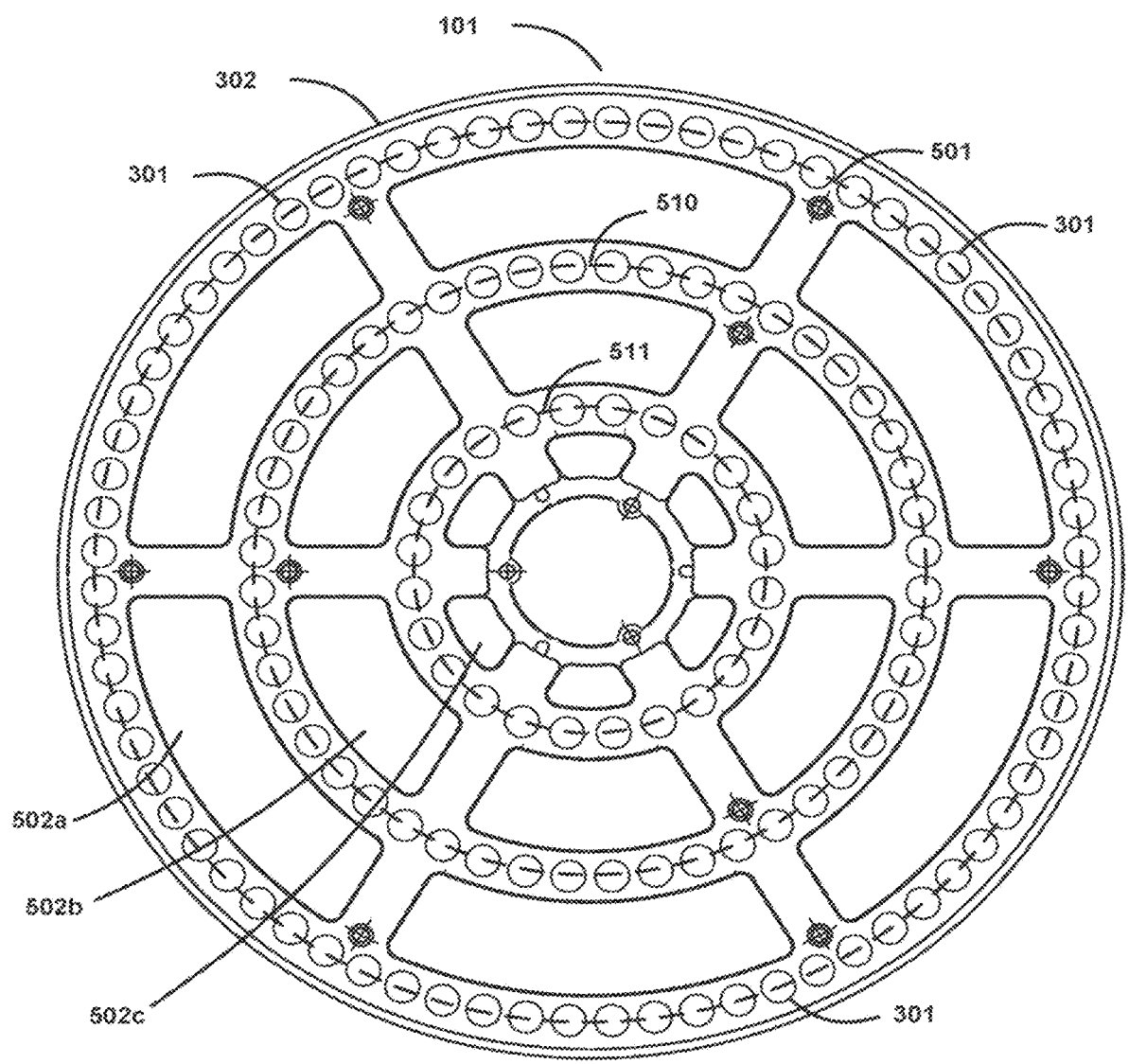
FIG. 5A depicts a top view of an exemplary primary optic.

FIG. 5A depicts a bottom view of an exemplary primary optic. With reference to FIGS. 1 and 3, the LED system 101 includes an outer perimeter 501 formed from 72 outer optics 301. The outer perimeter 501 encompasses all remaining optics 301. All one hundred and forty-four optics 301 are joined together by a holder 302 to form a common mechanical unit. As depicted, the LED system 101 includes an outer ring 501, a middle ring 510 and an inner ring 511. Each ring 501, 510-511 having a plurality of LEDs. The outer ring 501 containing both the middle ring 510 and the inner ring 511. The middle ring 510 containing the inner ring 511. The ring 501 having at least one optic open region 502a. The ring 510 having at least one optic open region 502b. The ring 511 having at least one optic open region 502c. The open regions 502a-502c allow for air flow.

Figure 5B:
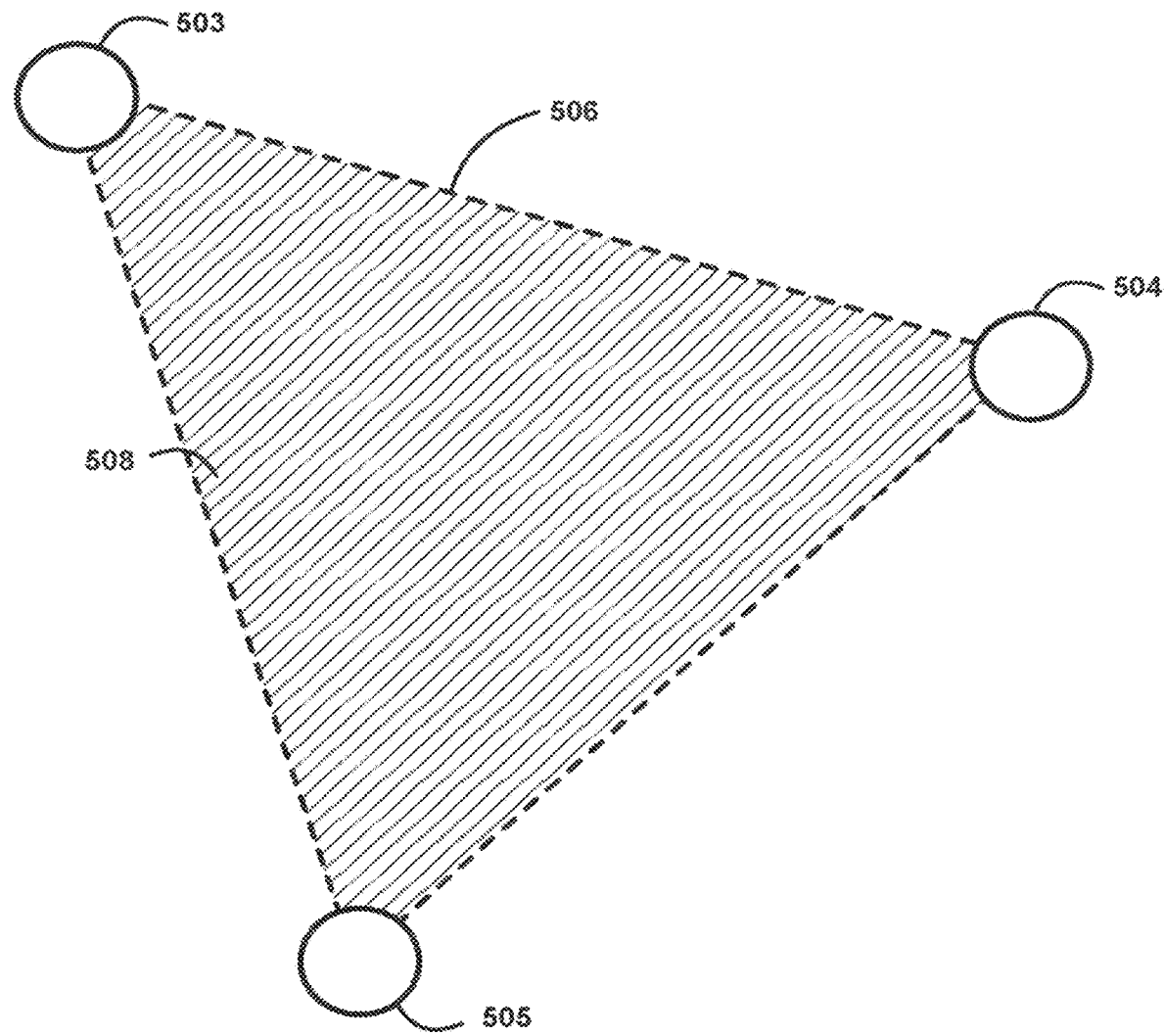
FIG. 5B depicts a conceptual view of exemplary opening having at least three optics that form an outer perimeter.

FIG. 5B depicts a conceptual view of exemplary opening in the optic having at least three optics that form an outer perimeter. At least three optics 503-505 form an outer perimeter 506 such that the outer perimeter 506 contains, encircles, or encompasses any remaining optics in the LED system (e.g., LED system 101). The optics 503-505 may be mechanically isolated or mechanically connect together. For example, the dotted lines may represent portion of a lens holder that mechanically connects at least two of the optics 503-505. Each optic 503-505 corresponds to an LED package (e.g., LED package 201). The optic open region 508 is formed within the perimeter 506 between the optics 503-505. The optic open region 508 may allow for air flow.

Figure 5C:
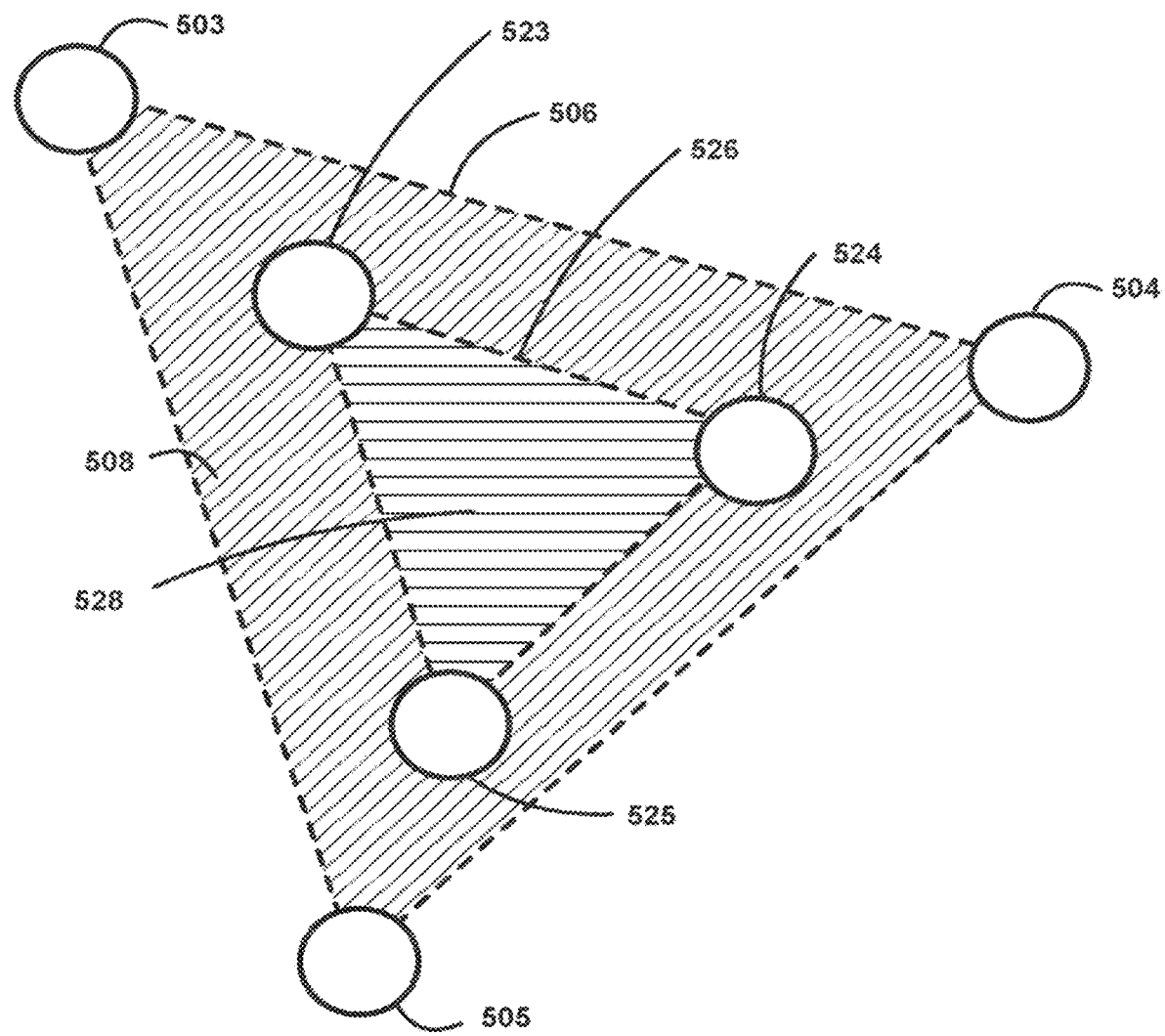
FIG. 5C depicts a conceptual view of an exemplary opening within an outer perimeter.

FIG. 5C depicts a conceptual view of an exemplary opening within an outer perimeter. With reference to FIG. 5B, a second inner perimeter 526 formed by an inner at least three optics 523-525 is contained within the outer perimeter 506. In some embodiments, at least one of the LEDs corresponding to at least one of the optics 523-525 is different than at least one of the LEDs corresponding to at least one of the optics 503-505. Each optic 503-505, 523-525 corresponds to an LED package. As depicted, the outer perimeter 506 and the inner perimeter 526 do not cross each other. The optics 523-525 may be mechanically isolated or mechanically connected together. For example, the dotted lines may represent a portion of a lens holder that mechanically connects at least two of the optics 523-525. The inner perimeter 526 includes at least one inner open region 528 to allow airflow. The inner perimeter 526, as depicted, is completely contained within the outer perimeter 506. The addition of the inner perimeter 526, with optics, allows for the LEDs to be optimally spread out across the surface defined and bounded by the outer perimeter 506 thus allowing for improved heat dissipation resulting in a more even temperature distribution across the heatsink surface.

In some embodiments, at least one optic may be mounted near the perimeter of the mechanics that compose the overall optical system. In various embodiments, at least a portion of the optic may be mounted within 25 mm of the edge of the LED system. With reference to FIGS. 2A and 3A, the outer ring 323 of optics, corresponds to the outer ring 223 of LEDs. The outer ring 323 may be mounted within 25 mm of the diameter edge of the heatsink 102.

Optical illuminous intensity distribution or optical light distribution is measured in how light is emitted at different angles from a light source. The total possible distribution is into a sphere, also known as four PI steradians ($4\pi$) A typical unit for visible light intensity is candela (cd) or lumens (l) per steradians. A typical representation of the light distribution is to slice through the sphere and plot the light intensity in the form of a polar plot where the radial units are in candela.

Figure 6A:
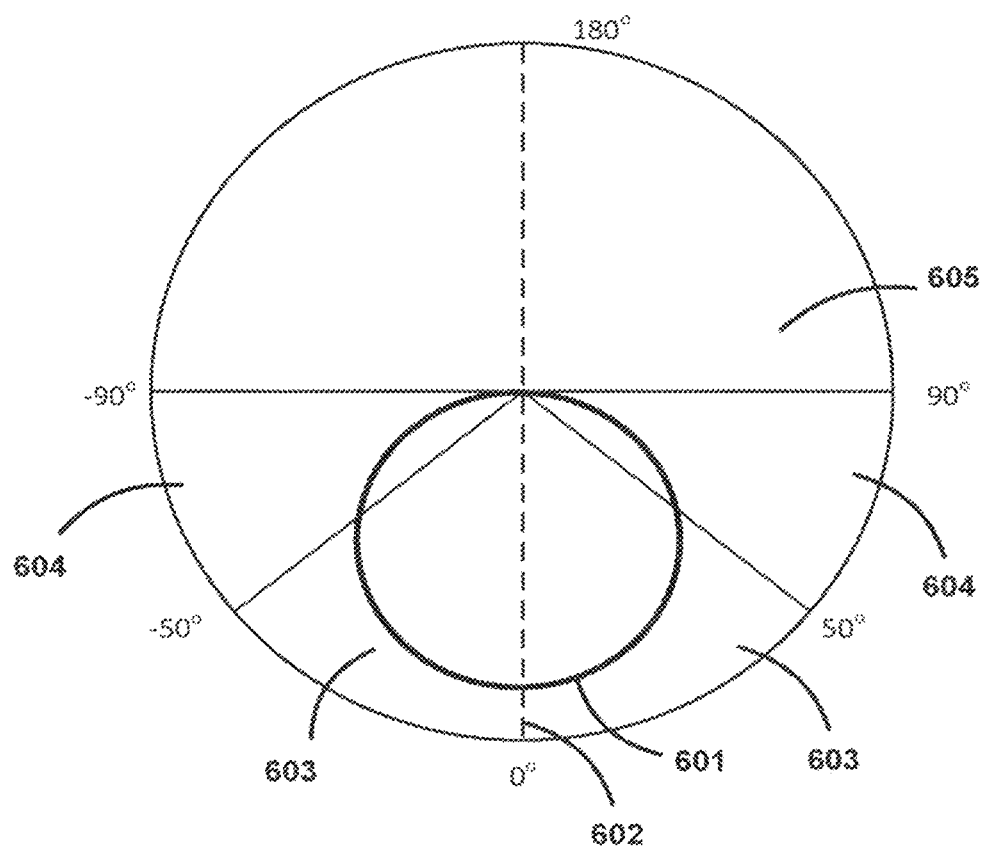
FIG. 6A depicts a polar plot illustrating an exemplary optical intensity for a Lambertian optical intensity distribution of a raw light output from an LED.

FIG. 6A depicts a polar plot illustrating an exemplary optical intensity for a Lambertian optical intensity distribution of a raw light output from an LED. A LED emits a light 601 substantially into the lower hemisphere. A center optical axis 602 is at zero degrees (0°) on the polar plot. For directional lighting applications including high bay, low bay, PAR, MR, BR, AR, the majority of light is intended to illuminate a useful area in front of the optical system in direction of the optical axis 602. A Useful Region of light 603 is defined as ±50° from the center optical axis 602. The region above ±50° but below ±90° is defined as the Glare Zone 604. For the Lambertian distribution, significant light may be in the Glare Zone 604 which is not only wasted but a source of visual discomfort. It is highly desirable to minimize light emitted into the Glare Zone 604 and more efficiently redirect, via an optic, this light into the Useful Region 603. The Useful Region 603 and the Glare Zone 604 form the lower hemisphere where the majority of light is generally emitted into. The upper hemisphere 605 defines a region called Uplight Zone 605. The Uplight defines how well a light may illuminate the ceiling. In various embodiments, Uplight may or may not be required.

Figure 6B:
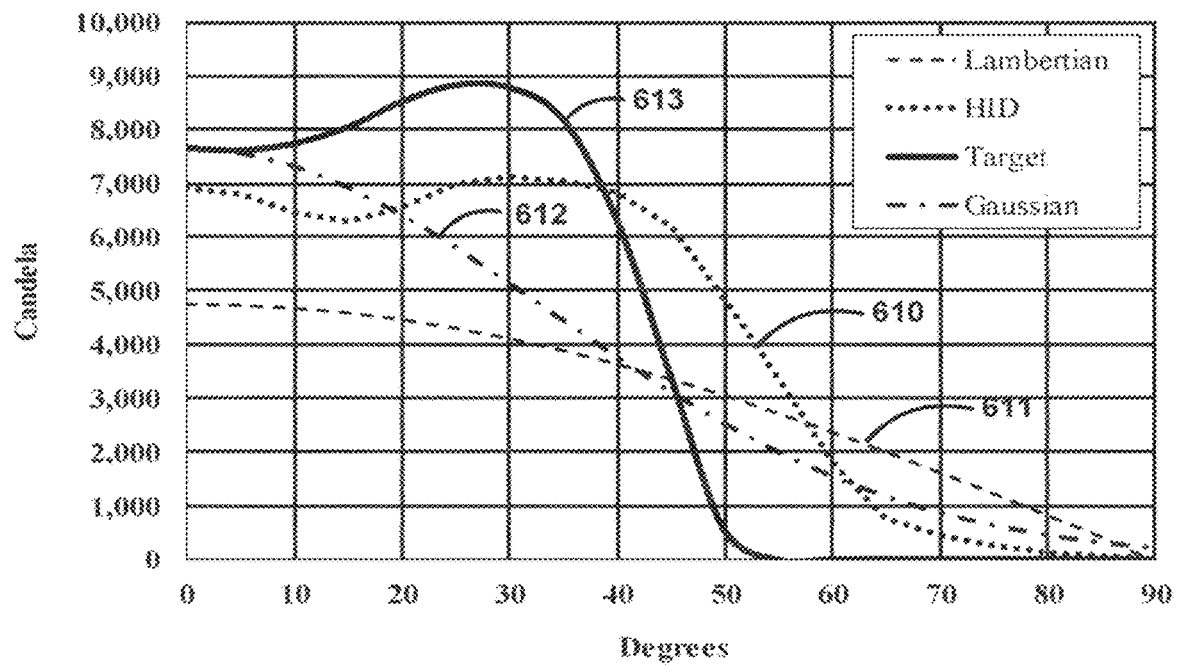
FIG. 6B depicts a plotted Cartesian light distribution where an x-axis is plotted from 0-90°.

FIG. 6B depicts a plotted Cartesian light distribution where an x-axis is plotted from 0-90° to show the optical intensity distribution in only one hemisphere.

The illuminance profile $E(\theta)$, at a plane of interest, is calculated by $$E(\theta) = \frac{I(\theta) \cdot (\cos\theta)^3}{h^2}$$

where an intensity distribution $I(\theta)$ in candela at angle $\theta$ and h equals the height from the luminaire to a plane where the illuminance is to be calculated. The plane, for example, may be a work surface or a floor. One unit for illuminance is lumens per meter square ($1/m^2$) or lux. Note the illuminance $E(\theta)$ from equation $$\frac{I(\theta) \cdot (\cos\theta)^3}{h^2}$$

declines rapidly with $(\cos\theta)^3$. In order to have a more evenly illuminance $E(\theta)$, optical intensity distribution $I(\theta)$ needs to at least partially compensate by increasing in value with $\theta$ to counteract the decreases with $(\cos\theta)^3$. In some embodiments, this compensation in $I(\theta)$ manifest itself as a peak of the optical intensity distribution $I(\theta)$ away from the center axis to an off axis region 15-45°. In various embodiments, the optical intensity results in a relative illuminance profile such that the variation, from center to a relative lateral distance of 0.7 from center, may be at least 40% of the center illuminance. Relative lateral distance is defined as the lateral distance D from the center axis 602 divided by height h, where the lateral distance is $D = h \cdot \tan\theta$, and the height h of the LED system As such, the relative lateral distance is simply $\tan\theta$.

The optical distribution created by at the at least one LED in combination with at least one optic may determine parameters such as glare, amount of light in the Useful Zone, Uplight, relative illuminance uniformity and level or illuminance. In various embodiments, the optical distribution may satisfy one or more of the following requirements:
 a. The peak of the optical intensity distribution $I(\theta)$ is not at the center axis but in a region 15°-40° from center.
 b. The optical intensity $I(\theta)$ results in a relative illuminance profile such that the variation, from center to a relative lateral distance of 0.7 ($\tan\theta = 0.7$), is at least 40% of the center illuminance.
 c. At least 85% of the total light in the lower hemisphere is in the useful zone.
 d. No more than 20% of light is in the glare zone.
 e. The maximum candela in the glare zone 604 is no more than 15% of the center axis 602 candela.
 f. At least 70% of the total light is in the useful zone 603 and at least 7.5% of light is in the up light zone.
 g. At least 5% light is in the Uplight zone.

FIGS. 6B, 6C, 6D, 6E, and 6F illustrate characteristics of various different optical distributions. The first optical distribution from an existing Acuity HID 400 W fixture. The second optical distribution illustrates an example of an LED Lambertian distribution. The third optical distribution from an LED Gaussian distribution. The fourth optical distribution from an exemplary LED target distribution. The characteristics of these optical distributions are also summarized in Tables 1 to 3.

TABLE 1

| Luminaire System | Lamp Lumens | Fixture Efficiency | Light Loss Factor | Net Lumens |
|---|---|---|---|---|
| Acuity HID | 40,000 | 70% | 63% | 17,640 |
| LED Lambertian | 18,000 | 100% | 85% | 15,300 |
| LED Gaussian | 18,000 | 100% | 85% | 15,300 |
| LED Target | 18,000 | 100% | 85% | 15,300 |

TABLE 2

| Luminaire System | % Light in Useful Zone | % Light in Glare Zone | Lumens in Useful Zone | Lumens in Glare Zone |
|---|---|---|---|---|
| Acuity HID | 78.5% | 21.5% | 13,841 | 3,799 |
| LED Lambertian | 60.3% | 39.7% | 9,225 | 6,075 |
| LED Gaussian | 72.6% | 27.4% | 11,115 | 4,185 |
| LED Target | 99.7% | 0.3% | 15,260 | 40 |

TABLE 3

| Luminaire System | Center Candela @ 0° | Relative Max Candela in Glare Zone | Center Lux @ 0° (20 ft Height) | Lux Variation from Center (0-0.7) |
|---|---|---|---|---|
| Acuity HID | 6915 | 69.8% | 186 | 56% |
| LED Lambertian | 4740 | 64.3% | 128 | 45% |
| LED Gaussian | 7661 | 33.0% | 206 | 32% |
| LED Target | 7662 | 6.9% | 206 | 59% |

Figure 6C:
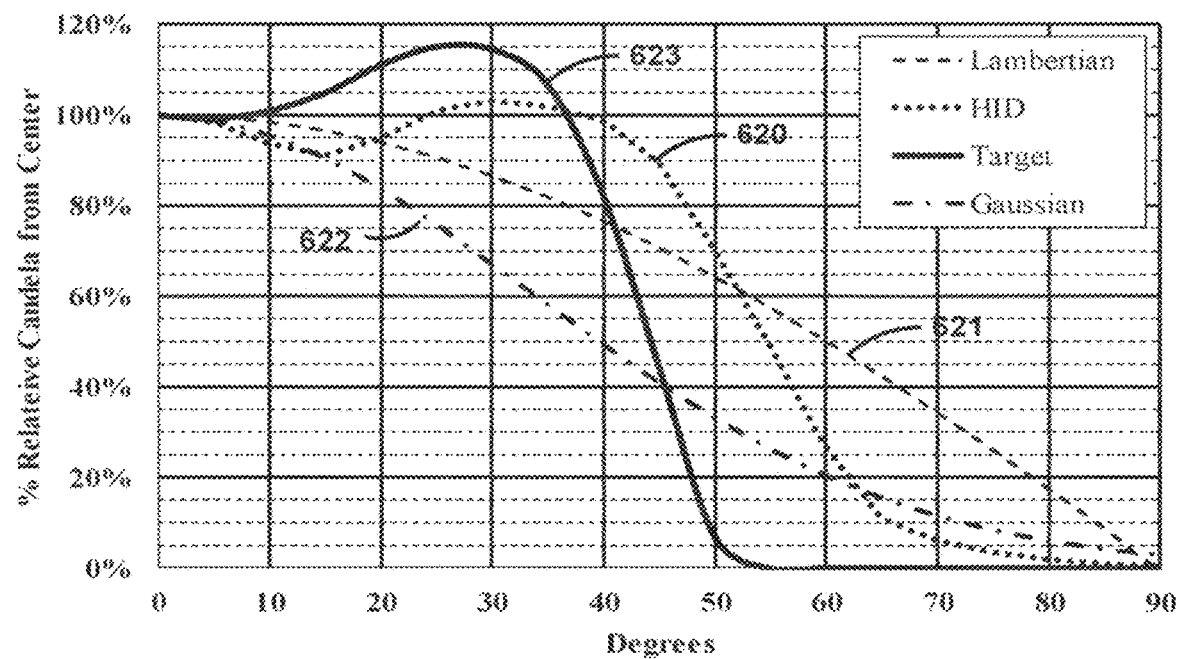
FIGS. 6C, 6D, 6E, and 6F illustrate characteristics of various different optical distributions.

The first optical distribution is an existing commercial luminaire, Acuity High Bay HID (THD 400MP A15 TB LPI) system. This Acuity HID fixture is used for reference to compare the later three LED systems. As summarized in Table 1, the Acuity HID fixture uses an HID lamp with an initial 40,000 lumens and a reflector with a 30% loss that is used to redirect the light. As such, the Acuity HID has fixture efficiency of 70%. In addition, the Acuity HID Fixture has a light loss factor of 63%. Light loss factor accounts for other loss issues, such as, for example, lamp lumen depreciation or dirt accumulation. Generally HID systems have a much higher lumen degradation than LED systems resulting in the HID having a worse light loss factor, at 63%, than an LED system, at 85%. The net lumens after fixture efficiency and the light loss factor is 17,640 lumens. The Acuity HID optical distribution 610, as depicted in FIG. 6B, is calculated based on 17,640 lumens. FIG. 6F depicts the cumulative integrated light from on center axis 602 to various angles and provides an indication of the total light in various zones. In the case of the Acuity HID Fixture, FIG. 6F and Table 2, illustrate that the Acuity HID optical distribution 650 has about 78.5% in the Useful Zone 603 while 21.5% of the energy is wasted in the Glare Zone 604. As such, only 13,841 lumens are in the Useful Zone 603 while 3,799 lumens are wasted in the Glare Zone. FIG. 6C depicts the optical distribution normalized to a center value. As depicted, the HID normalized optical intensity distribution curve 620 shows that the maximum candela in the Glare Zone 604 is at very high 69.8% of the center candela value.

Figure 6D:
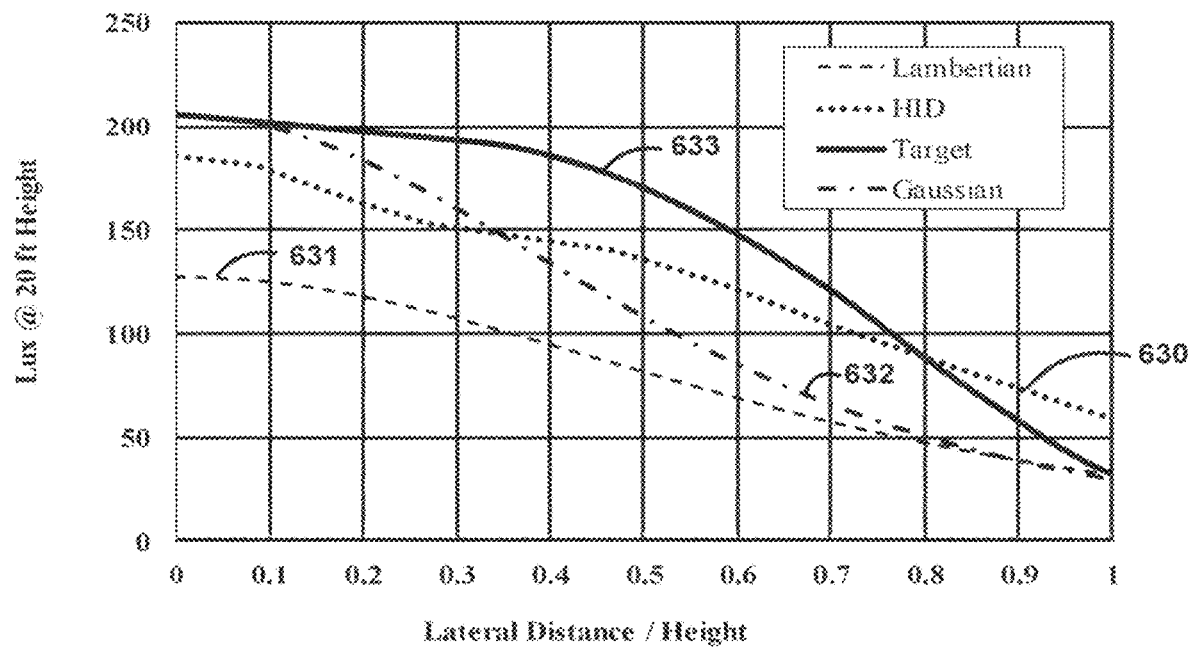
Figure 6E:
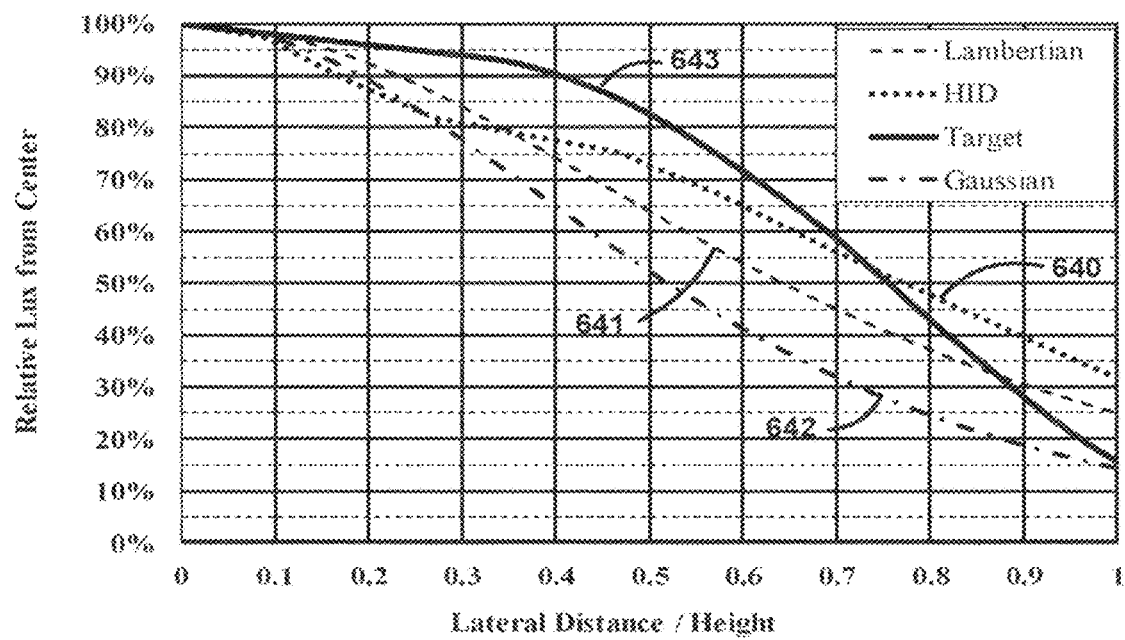
Figure 6F:
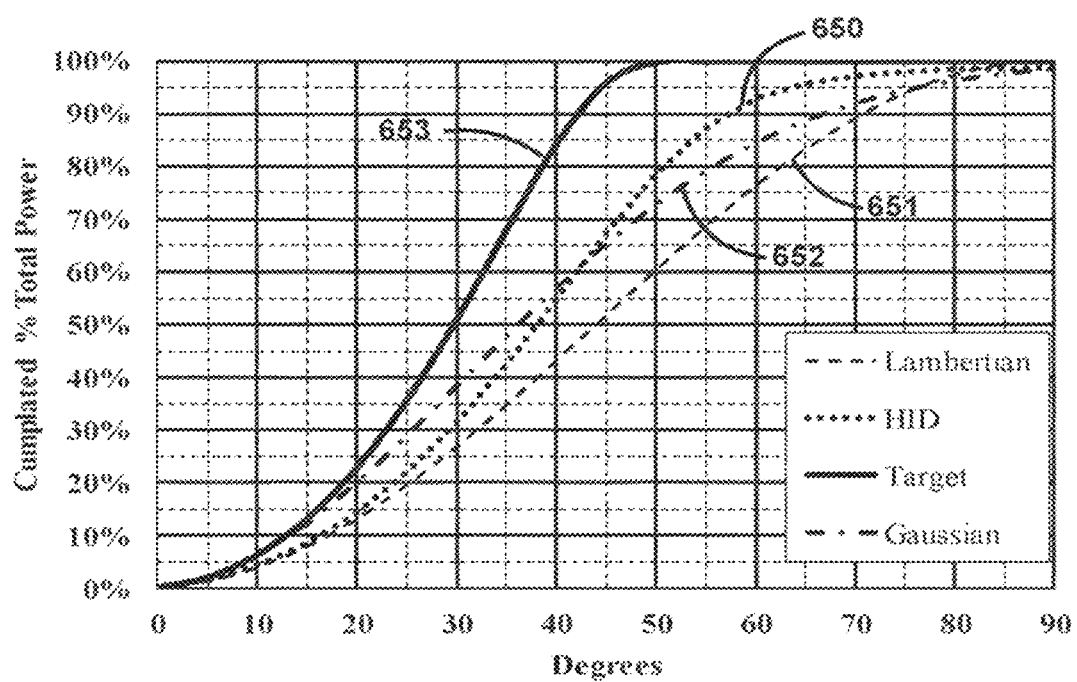

FIG. 6D depicts a calculated illuminance in lux at a height equal to 20 feet (h=20). The X-axis is the relative lateral distance from center axis 602 and is calculated as lateral distance divided by the height, or simply tan θ. The HID illuminance 630, corresponding to Table 3, illustrates a center peak of about 186 lux. FIG. 6E depicts the relative illuminance 640 uniformity normalized to the center axis illuminance. FIG. 6E, and Table 3, illustrate the curve 640 showing the HID optical distribution results in a worst case of a relative illuminance of 56% at relative lateral distance of 0.7.

The second optical distribution is an example of a LED system with substantially Lambertian distribution 611 (reference FIG. 6B). Such a distribution is typical of a raw LED emission without redirection with an optic. The raw LED output is 18,000 lumens. Accounting for an after the fixture efficiency of 100% and a light loss factor of 85%, the net lumens are reduced to 15,300 lumens. The optical distribution of 611 is adjusted to reflect 15,300 lumens. With reference to Table 2 and the cumulative light curve 651, the Lambertian optical distribution 611 has significant glare with about 39.7% of light (6,075 lumens) wasted in the Glare Zone 604 and only 60.3% (9,225 lumens) in the Useful Zone 603. The resulting illuminance 631, with reference to FIG. 6D and summarized in Table 3, has center value of 4740 lux which is significantly lower than the reference case of the Acuity HID of 6915 lux. The Lambertian distribution relative intensity 621, with reference to FIG. 6C and summarized in Table 2, shows a relative maximum candela of 64.3% in the Glare Zone 604 relative to the center intensity. The curve 641, with reference to FIG. 6E and summarized in Table 3, illustrates the Lambertian optical distribution results in a worst case of a relative illuminance of 45% at relative lateral distance of 0.7.

The Gaussian optical intensity profile is intended to represent a broad class of intensity profiles. The profile need not to be exactly Gaussian in shape but rather any optical distributions with a peak intensity substantially near a center optical axis of 0° then declining in intensity with higher angles, i.e. moving away from the center optical axis 602. Such an optical intensity distribution I(θ) cannot compensate for the $(\cos θ)^3$ fall off resulting in an illuminance profile that is generally not very uniform. Broadening the Gaussian cannot compensate for $(\cos θ)^3$, and may simultaneously lead to very high glare and significant reduction on axis illuminance. The Gaussian like shapes may typically be created with simple optics, such as, for example, simple lens, TIR, or simple reflectors.

With reference to FIG. 6B and Table 1, the third optical distribution 612 is an example of a LED Gaussian distribution that has been adjusted to reflect 15,300 lumens based on a total of 18,000 lumens discounted by an 100% fixture efficiency and an 85% light loss factor. The Gaussian shape and FWHM was further determined by setting the center peak to 7661 cd to match the fourth distribution 633. Although the total lumens in this example are the same as the Lambertian distribution, the center peak intensity of 7661 cd is higher than both the Lambertian and the Acuity HID. However, the cumulative light curve 652 (reference FIG. 6F and Table 2) shows a relatively high glare of 27.4% of the total light in the Glare Zone 604. This results in 11,115 lumens in the Useful Zone 603 and 4,185 lumens in the Glare Zone 604. Also, the relative candela curve 622 (reference FIG. 6C and Table 3) shows a relative maximum candela of 33% in the Glare Zone 604. Although the portion of glare light and maximum candela in Glare Zone 604 may be improved over both the Acuity HID and the Lambertian, the glare is still relatively high. In addition, the improvement in glare comes at the expense of illuminance uniformity. The illuminance curve 632 (reference FIG. 6D and Table 3) shows a center illuminance of 7661 lux, but the variation in illuminance 642 from center to a relative lateral distance of 0.7 is about 32% which is worse than both the Acuity HID and the Lambertian.

FIG. 6B depicts a Target LED optical distribution 613 that has been adjusted to reflect 15,300 lumens based on a total of 18,000 lumens in accordance with a 100% fixture efficiency and an 85% light loss factor. Optical distribution 613 illustrates a general class of profiles that represents a preferred embodiment of the optical distribution. This class of profiles simultaneously provide an improved lower glare and an improved illuminance uniformity. The characteristic may be accomplished by partially compensating for the $(\cos \theta)^3$ illuminance fall off by increasing the optical intensity distribution $I(\theta)$ with angle $\theta$, for certain range of angles. This results in a peak intensity away from a center axis in a region about 15-45° from center. The particular distribution 613 has a peak intensity at about 24°. Another characteristic, the intensity minimizes glare by bringing optical distribution down from the peak to a relatively low value in the Glare Zone 604. This requires a much steeper roll off in intensity than may be characteristic of either the Lambertian or the Gaussian Intensity Distribution. With reference to FIG. 6C and summarized Table 3, the relative intensity 623, as depicted, is less than 6.9% in the Glare Zone 604 from a peak of about 115% at 24°. This steep roll off occurs within 26°. The result is the cumulative light level curve 653, as depicted in FIG. 6F and as summarized in Table 2, results in about 99.7% (15,260 lumens) of the total light in the useful zone with only 0.3% of the light in Glare zone (40 lumens). The glare may therefore be a significant improvement over optical distribution of Acuity HID, Lambertian or Gaussian. At the same time, as depicted in FIG. 6D, the illuminance profile 633 is significantly higher over a relative lateral distance 0.7 starting with a center illuminance is 206 lux. In addition, the variation in illuminance from center to a relative lateral distance of 0.7 is about 59% of the center illuminance. Thus, of the four distributions, the Target distribution not only has the lowest glare but also the highest center candela, the highest illuminance, the highest center illuminance and the best illuminance uniformity. The LED Target optical distribution of 613, with only a raw 18,000 lumens, significantly out performs the legacy Acuity HID fixture with more than twice the raw light level at 40,000 lumens.

In some embodiments, the characteristics of the Target optical intensity distribution is preferably achieved using the dielectric CPC optic depicted in FIG. 6D or the dielectric CPC optic with the curved output depicted in FIG. 6E.

In some embodiments, the first optical distribution or the Target distribution, satisfies one or more of the following requirements:
  a. The peak of the optical intensity distribution $I(\theta)$ is not at the center axis but in a region 15°-45° from center.
  b. The optical intensity distribution $I(\theta)$ results in a relative illuminance profile such the variation in illuminance from center to a relative lateral distance of 0.7 is at least 40% of the center illuminance.
  c. At least 85% of the total light in the lower hemisphere is in the useful zone 603.
  d. No more than 20% of light in the glare zone 604.
  e. The maximum relative intensity in the glare zone 604 is no more than 15% of the center intensity.

Heat Sink

Heatsinks can be fabricated by multiple processes well known in the arts, such as, for example, diecasting, extrusion, skiving, folded fin, and sheet metal. The heat sink material may include aluminum, aluminum alloys, copper, copper alloys or a thermally conductive plastic. Such thermally conductive plastic can be fabricated from processes such as injection molding that have a thermal conductivity greater than 1 W/M-K. One company that supplies such thermally conductive plastic material is Celanese Corporation. Generally, heatsinks are constructed with a region of elongated features that have a large surface area composing of features such as pins or fins attached to a common base. The large surface area may be used to dissipate heat from the heatsink to the air. These elongated features are generally mechanically held together by attaching them to a common base. In some of the embodiments of this disclosure the base is substantially planar and serves as a mechanical structure where the LEDs and/or Optics are attached.

Figure 7A:
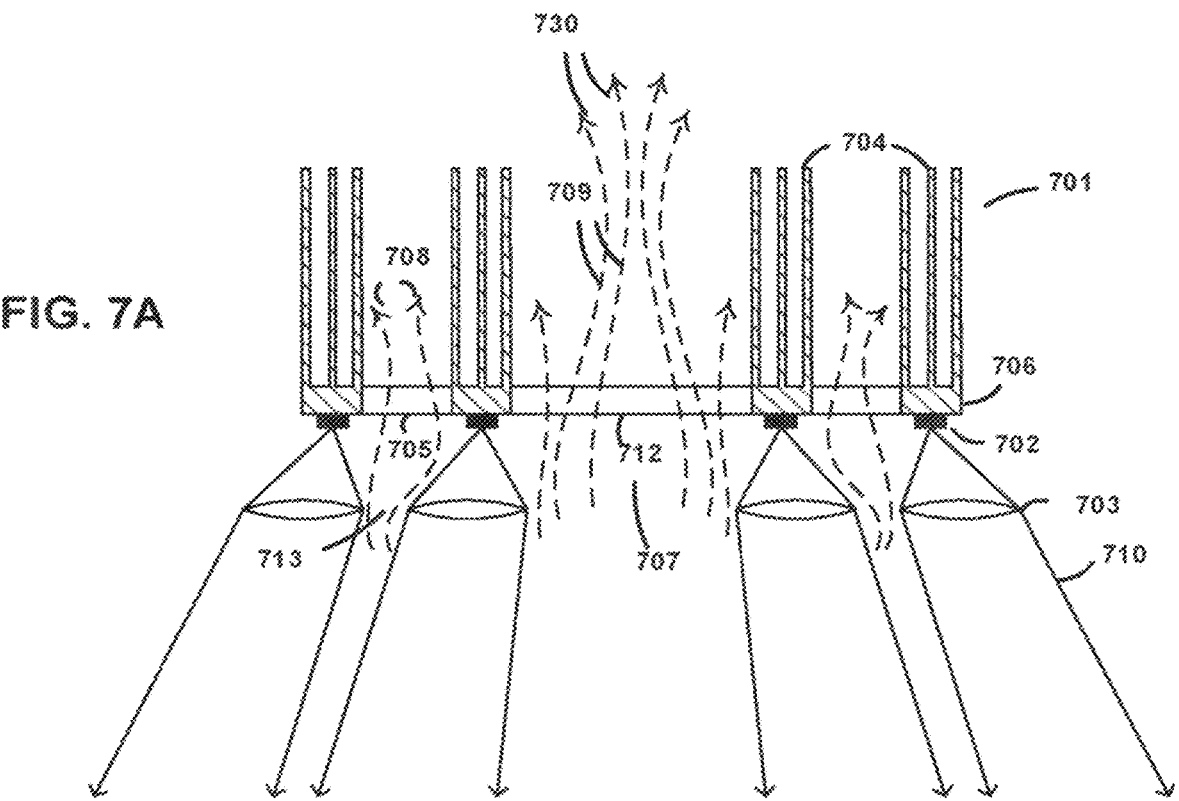
FIG. 7A depicts a cross section view of an exemplary LED system having a heatsink.

FIG. 7A depicts a cross section view of an exemplary LED system having a heatsink. A LED system includes a heatsink 701, at least 3 LEDs 702, and a series of optics 703 that correspond to the LEDs 702. The LED 702 are in thermal and mechanical contact with heat sink 701. The heatsink 701 has a series of elongated features 704, such as fins or pins, to dissipate the heat generated from the LED 702 to the ambient air. These elongated features 704 are mechanically attached to the heatsink base 706 that is substantially planar. The heatsink 701 having at least one opening such as 712 or 705. At least three of the outer LEDs 702 forming an outer perimeter 711. The series of optic 703 have at least one opening 713, 707. The openings 713, 707 at least partially overlap at least one opening 705, 712 in the heatsink base 706. Together these openings enable direct and unimpeded airflow flow along from the front of the LED system to the interior of the elongated regions 708-709 of the heatsink 701 and thereby improve thermal dissipation.

Figure 7B:
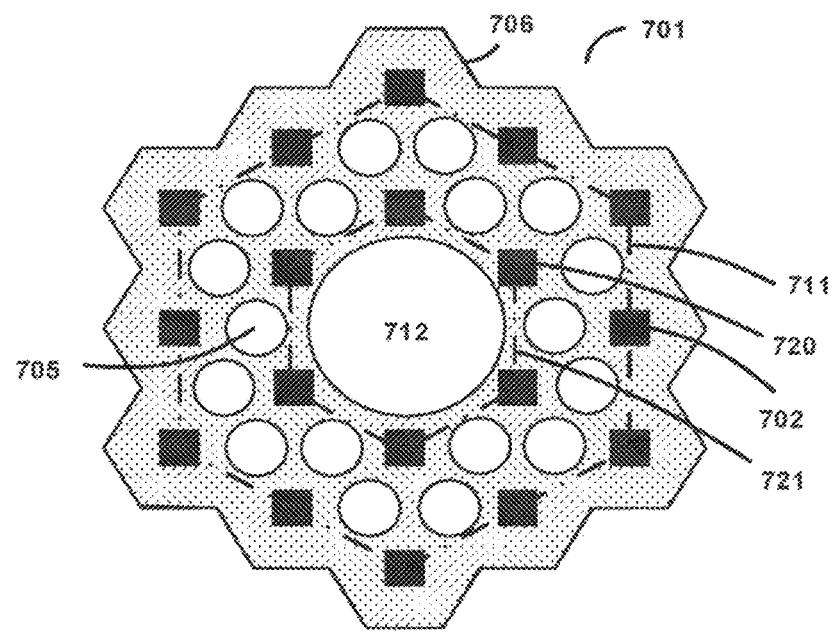
FIG. 7B depicts a front view of an exemplary LED system having the optic removed for to reveal the LED locations.

FIG. 7B depicts a front view of an exemplary LED system having the optic removed for to reveal the LED locations. As depicted, at the LED system includes at least one inner perimeter 721 formed by at least 3 LEDs 720. At least one of the LEDs 720 forming the inner perimeter 721 may be different than the LEDs 702 forming the outer perimeter 711. The inner perimeter 721 does not cross cover the outer perimeter 711. As depicted, the outer perimeter 711 encloses the inner perimeter 721. Within the inner perimeter 721, there is at least one opening, such as 712, that allows for improved air flow.

Without such openings 705, 707, 712-713 or open regions 708-709, the air would need to take an indirect path by flowing from front of the heatsink 701 around the edge of the heatsink 701 and then back towards the interior 709 of the heatsink 701. This indirect circuitous route increases air flow resistance resulting in decreased air flow, and the process of flowing around the heatsink 701 heats up the air such that by the time the air reaches the interior 709 of the heatsink 701 there may be significantly less cooling capacity. The openings 705, 707, 712-713 therefore allow for substantially direct and improved airflow of cool air to the interior of the heatsink elongated region 704 resulting in significantly improved thermal resistance.

The air flow also exits 730 the elongated features directly above the elongated features thus enabling the air to flow in a low air resistance path that is substantially in a vertical axis from the front of the LED system to exit behind the LED system.

At least one opening 705, 707, 712-713 or open regions 708-709 improve air flow and satisfy at least one of the following criteria.
   a. The opening region in the heatsink base, optic and PCB is at least 25% of the outer perimeter area.
   b. The improved air flow decreases thermal resistance by at least 5%, 10% or 20% than if such openings 705, 707, 712-713 were covered up.
   c. The improved air flow reduces the average temperature of the heatsink by at least 5° C. than if such openings were covered up.
   d. The improved air flow reduces the maximum temperature of the heatsink by at least 5° C. than if such openings were covered up.
   e. The air flows in a substantially vertical flow path from the front of the optical system through the heatsink base into the elongated features and exiting directly above the elongated features.

Figure 8A:
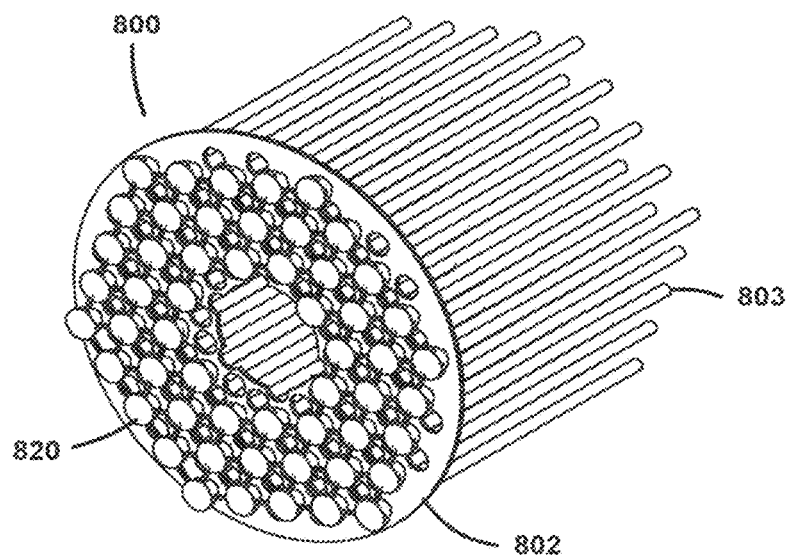
FIGS. 8A, 8B, 8C, 8D, 8E, and 8F depict various views of an exemplary LED system having a heatsink with elongated features.
Figure 8B:
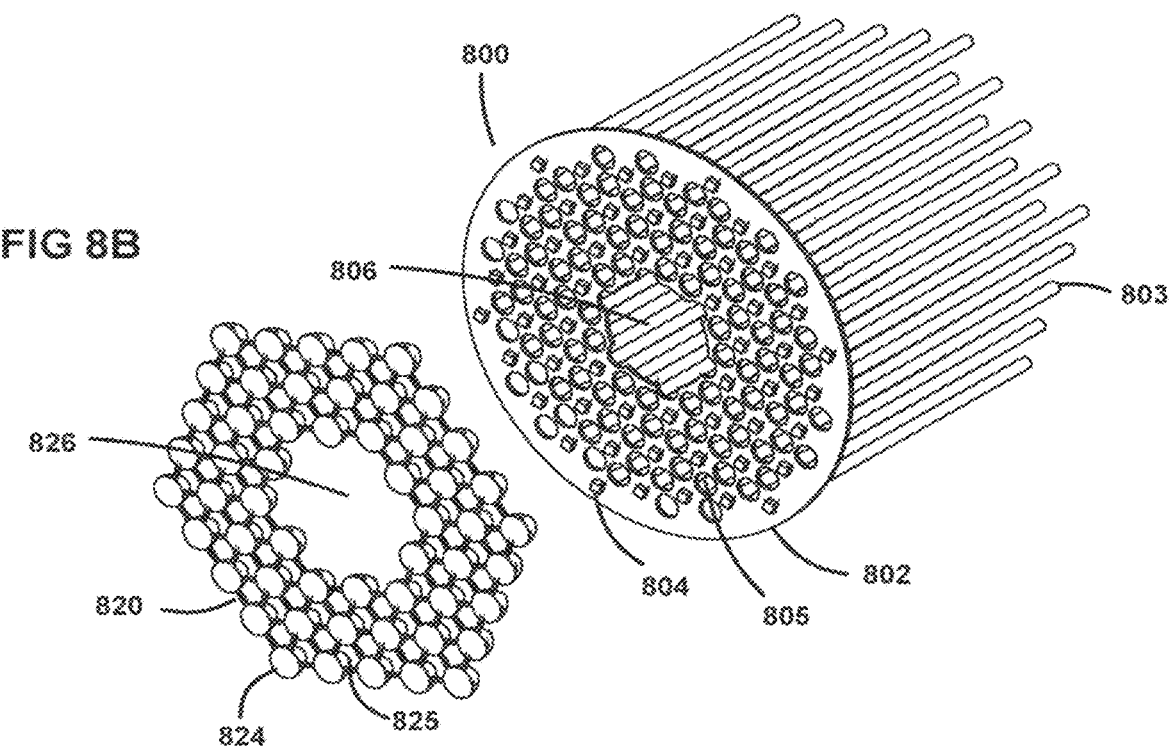
Figure 8C:
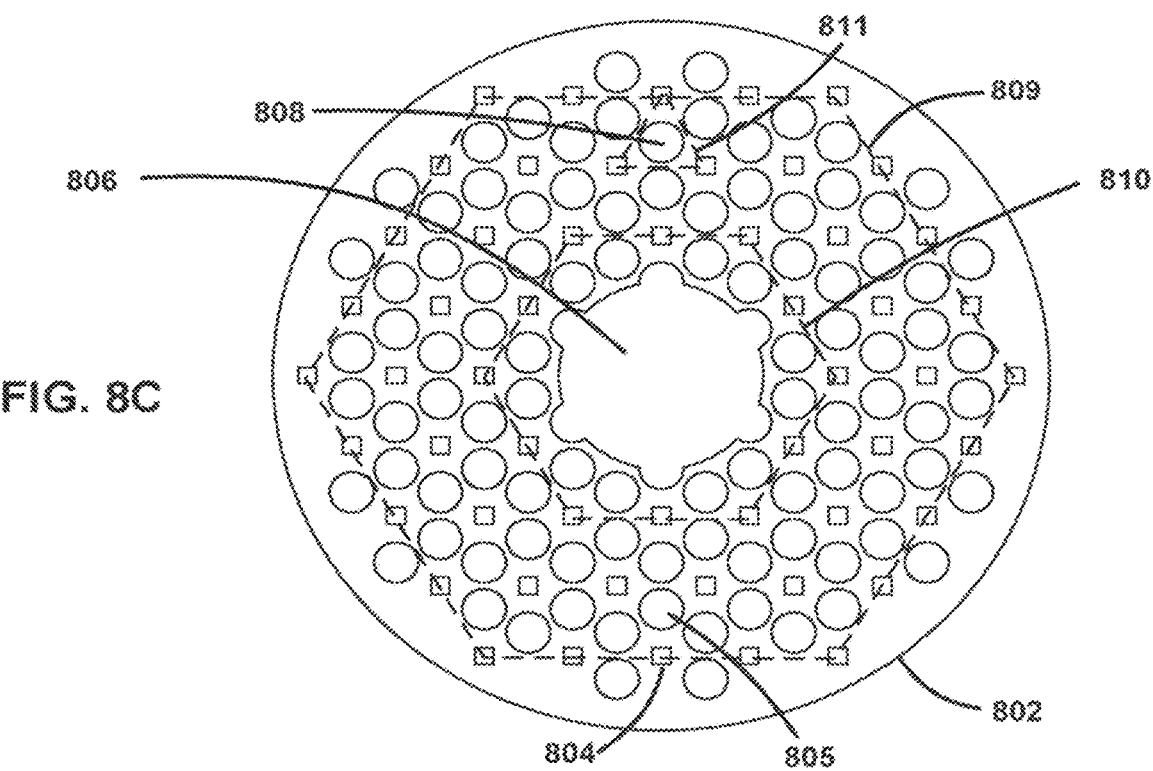
Figure 8D:
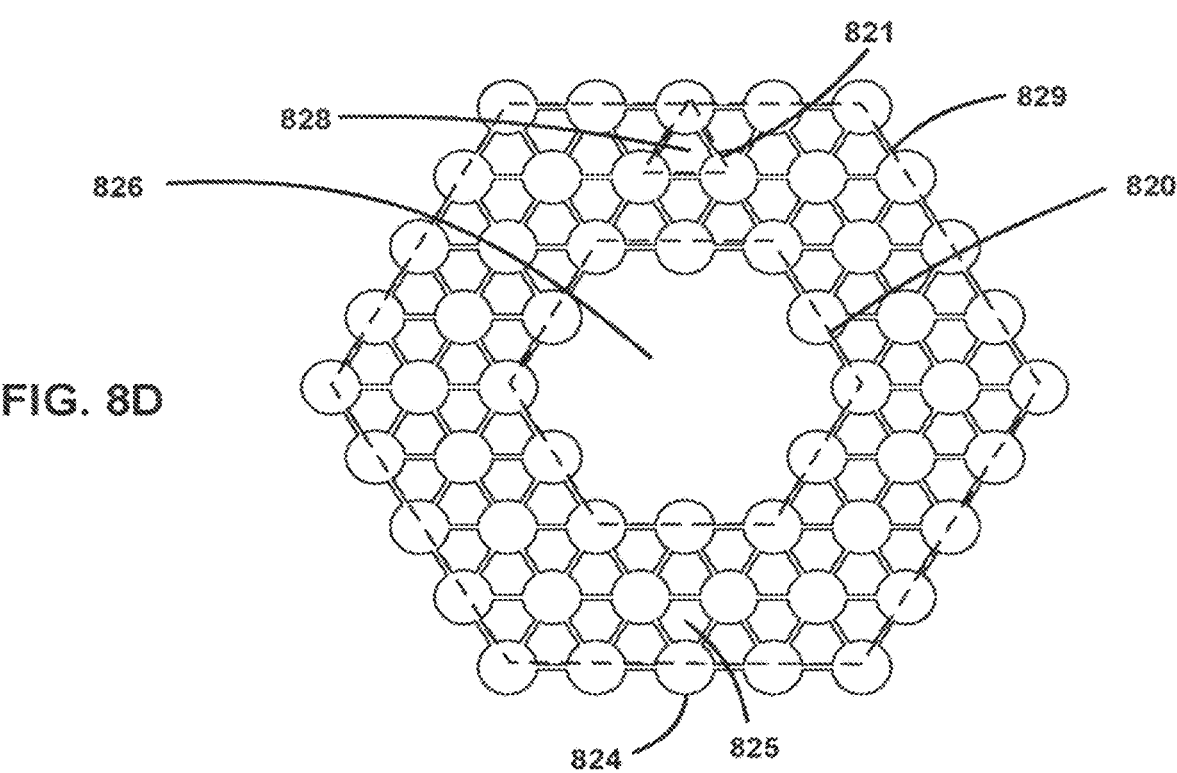
Figure 8E:
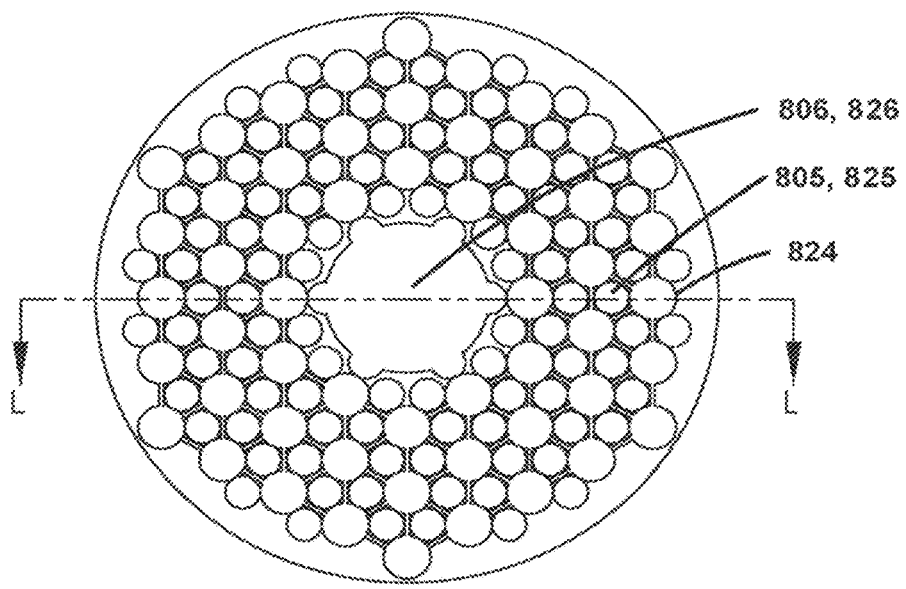
Figure 8F:
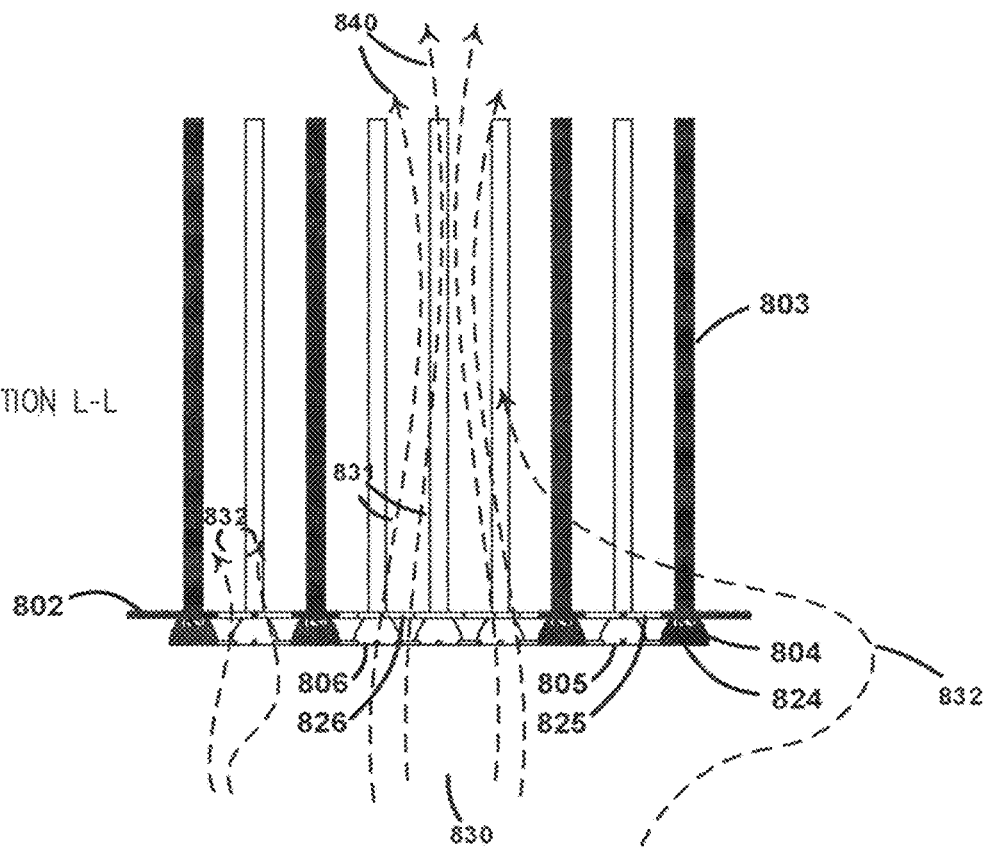

FIGS. 8A, 8B, 8C, 8D, 8E, and 8F depict various views of an exemplary LED system having a heatsink with elongated features. FIG. 8A depicts an isometric view. FIG. 8B depicts an explode view with an optic removed at a distance. FIG. 8C depicts a front view of a LED system with an optic removed to show at least three LEDs. FIG. 8C depicts a front view of the optic. FIG. 8E depicts the front view of the LED system. FIG. 8F depicts a cross section L-L of the LED system referenced to FIG. 8E. A LED system 800 includes a heatsink having a series of pins 803, a heatsink base 802, at least three LEDs 804, an array of optics 820. The array of optics 820 consisting of at least three optics 824 that correspond to the at least three LEDs 804. At least three of the outermost LEDs 804 form an outer perimeter 809 from which all the LEDs 804 are contained. Within the outer perimeter 804 there is at least one opening 806-805, 808 that allows for improved airflow. At least three of the outermost optics 824 form an outer perimeter 829. Within the outer perimeter 829 there is at least one opening 826-825, 828 to allow for improved airflow. Each optic 824 corresponds to an individual LED 804. Optics 824 redirect at least a portion of the raw light output from its corresponding LED 804 into a first optical distribution. The LEDs 804 and optics 824 are described in other parts of this disclosure. The openings in the heatsink 806-805, 808 at least partially overlap some of the openings 825-826, 828 in the optic 824. For example, as depicted in FIGS. 8E and 8F, the heatsink opening 806 at least partially overlaps the optic opening 826, the heatsink opening 805 at least partially overlaps the optic opening 825 and the heatsink opening 811 at least partially overlaps the optic opening 821. Together these openings 805-806, 808, 825-826, 828 allow for improved and more direct vertical airflow path 831, 832 from the front 830 of the LED system 800 to the interior of the heatsink elongated features 803 and exiting 840 above the elongated features. The illustrated geometry may allow for the air to flow almost directly and unimpeded from front 830 of the system to the elongated pin feature 803 at the interior 831, 832 of the heatsink.

In various embodiments, the outer LED perimeter 809 includes at least one inner perimeter 810-811, each inner perimeter 810-811 is formed by at least three LEDs 804. At least one of the LEDs 804 forming the inner perimeter 810-811 is different than the at least three LEDs 804 forming the outer perimeter 809. The inner perimeters 810-811 have at least one opening 806, 808 that allow for improved air flow. The inner perimeters 810-811 do not cross over the outer perimeter 809 and are enclosed by the outer perimeter 809. Within the outer optic perimeter 829, at least one inner perimeter 820-821 is formed by at least three optics 824. At least one of the optics 824 of the least three optics 824 forming the inner perimeter 820-821 may be different than at least three optics 824 forming the outer perimeter 829. The inner perimeters 820-821 have at least one opening 826, 828 to allow for improved air flow. If these such openings 826, 828 are blocked, the air 832 has to flow from front of the heatsink around the edge of the heatsink and then back towards the interior of the heatsink. This indirect circuitous route increases air flow resistance resulting in decreased air flow. This process of flowing around the heatsink base 802 heats up the air such that by the time the air reaches the interior of the heatsink there may be significantly less cooling capacity. The LEDs 804, as depicted in FIG. 8C, are substantially evenly distributed across the surface of the heatsink base 802 thus allowing for improved spreading of the heat load. The openings in the heatsink base 802 are also substantially evenly distributed across the surface of the heatsink thus allowing for a more even air flow into the interior of the heatsink. One consequence of more evenly distributing heat load across the heatsink base is the requirement to spread or conduct the heat across the heatsink base is substantially reduced. Rather much of the heat generated by the LEDs may directly conducted backwards to the heat dissipating features without the need for spreading across the base. In some embodiments, the lateral heat spreading across the surface of the base is substantially negligible. The reduced heat spreading requirement of the base i.e. reduced requirement for in plane lateral thermal conductivity allows for the base to be thin and allow for perforation in the heatsink base 802 with openings which reduces weight and improve air flow. In some embodiments, the heatsink base may be from 0.5-4 mm in thickness. In FIGS. 8A-8F, The LEDs 804 are substantially thermal isolated from each other across the base of the heat sink base 802 and base is only connected by thin slivers 831 between the opening 808 that serves to hold the base as one single mechanical unit than for thermal conductivity across the base.

In certain applications, there may be a weight limit for the overall LED system. For example, Underwriters Laboratory (UL) standard 1993, "Self-Ballasted Lamps and Lamp Adapters" Section 5.4 limits the maximum weight up to 1.7 kilograms (kg) for LED Retrofit lamps intended to replace HID lamps with an E39 socket. Such Retrofit Lamps have been described, for example at ([00182]), in U.S. application Ser. No. 14/952,079, titled "LED LIGHTING," filed by Frank Shum, on Nov. 25, 2015 and at FIG. 29-30, of U.S. Provisional Application Ser. No. 62/141,010, titled "LED Lighting," filed by Frank Shum, on Mar. 31, 2015, the entire disclosures of which are hereby incorporated by reference. Generally, the heatsink may be a significant portion of the weight of an LED system. The LED system also includes the weight of the driver, optics, and driver housing, for example. The heatsink must therefore weigh substantially less than 1.7 kg. In some embodiments, the heatsink weighs less than 1 kg while still being capable for dissipating heat from an optical system generating more than 10,000 lumens. The fabrication process such as die casting or extrusion may require a minimum feature size and or aspect ratio. For example, both die casting and extrusion may have difficulty in fabricating features sizes less than 1 mm or having aspect ratio greater than 10 to 1. The dimensions, and therefore weight, of the heatsink dissipating features, such as fins or pins, may be determined by a fabrication limitation rather than requirements for heat dissipation. As such, the heatsink may be heavier than necessary.

In some applications where weight may be critical, sheet metal fins may be preferred. Sheet metal can achieve a thickness less than 1 mm, less 0.6 mm or less than 0.5 mm while simultaneously achieving an aspect ratio great than 20 to 1, or 40 to 1 or 80 to 1.

Figure 9A:
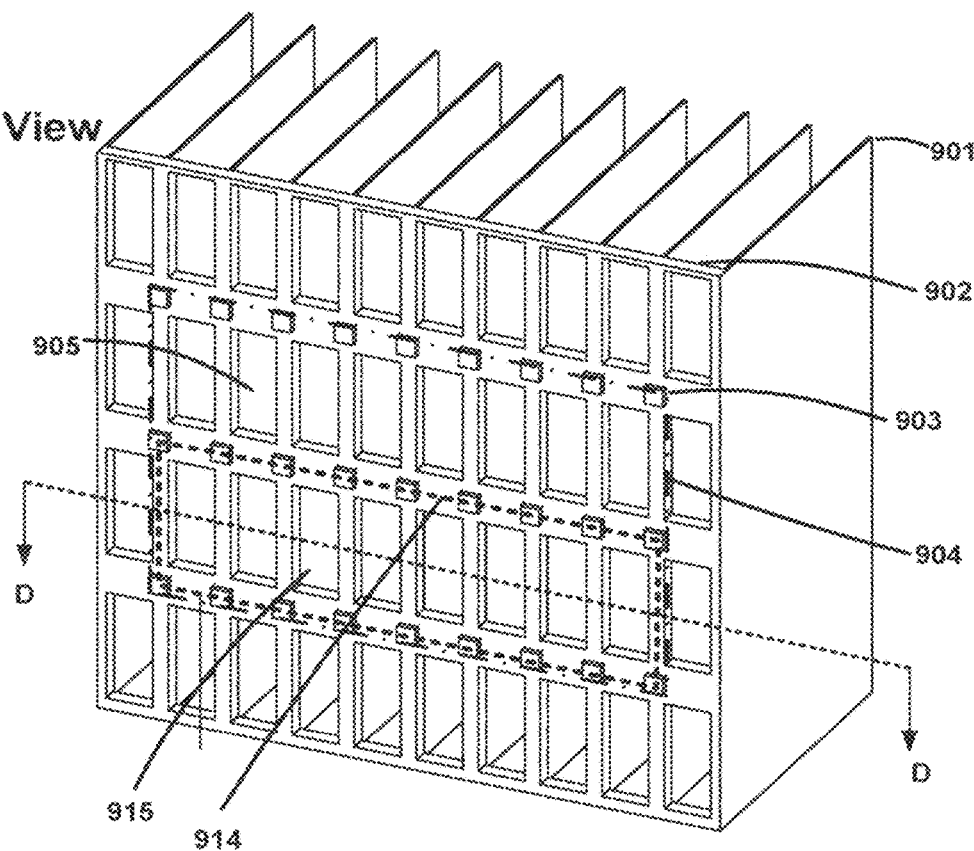
FIGS. 9A-9B depict various views of an exemplary LED system.
Figure 9B:
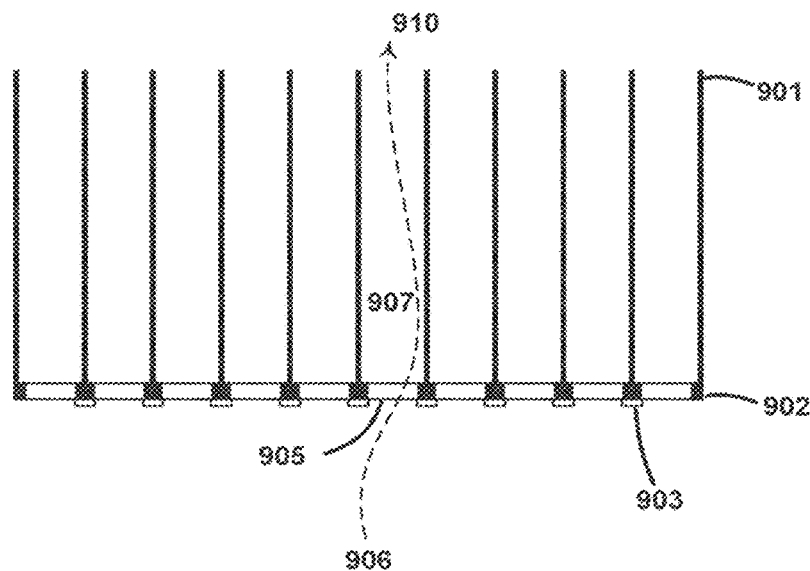

FIGS. 9A-9B depict various views of an exemplary LED system having sheet metal fins. An LED system 906 includes a heatsink having a series of heat transfer members such as elongated sheet metal fins 901 attached to a heatsink base 902. At least three of the LEDs 903 are in thermal communication with the heatsink. As depicted, the outer LEDs 903 form an outer perimeter 904. The outer perimeter 904 includes at least one opening 905 to allow for improved air flow from the front 906 of LED system to the interior 907 of the heat sink. In some embodiments, the LED system includes at least one inner perimeter 914 formed by at least 3 LEDs 903. At least one of the LEDs 903 forming the inner perimeter 914 is different than the LEDs 903 forming the outer perimeter 904. The at least one inner perimeter 914 does not cross over the outer perimeter 904 and is enclosed by the outer perimeter 904. The inner perimeter 914 includes at least one opening 915 to allow for improved and substantially direct and vertical air flow from the front 906 of LED system to the interior 907 of the elongated fins and exiting above the elongated fins 910.

Figure 10A:
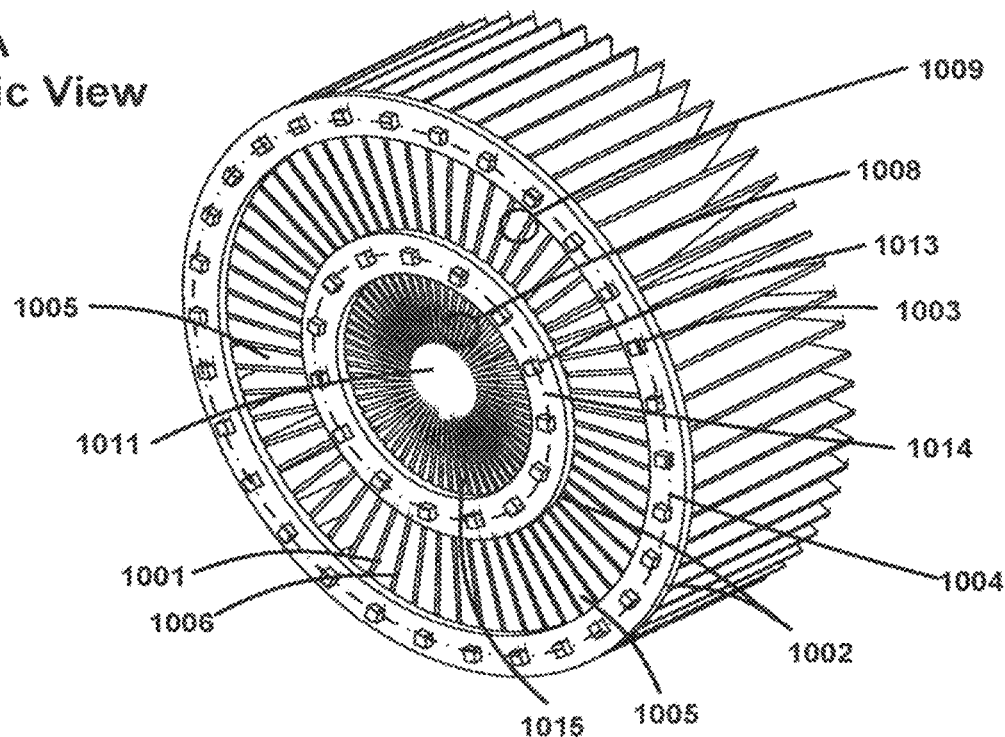
FIGS. 10A-10B depict an isometric view and a front view of an exemplary heat sink having at least two fins.
Figure 10B:
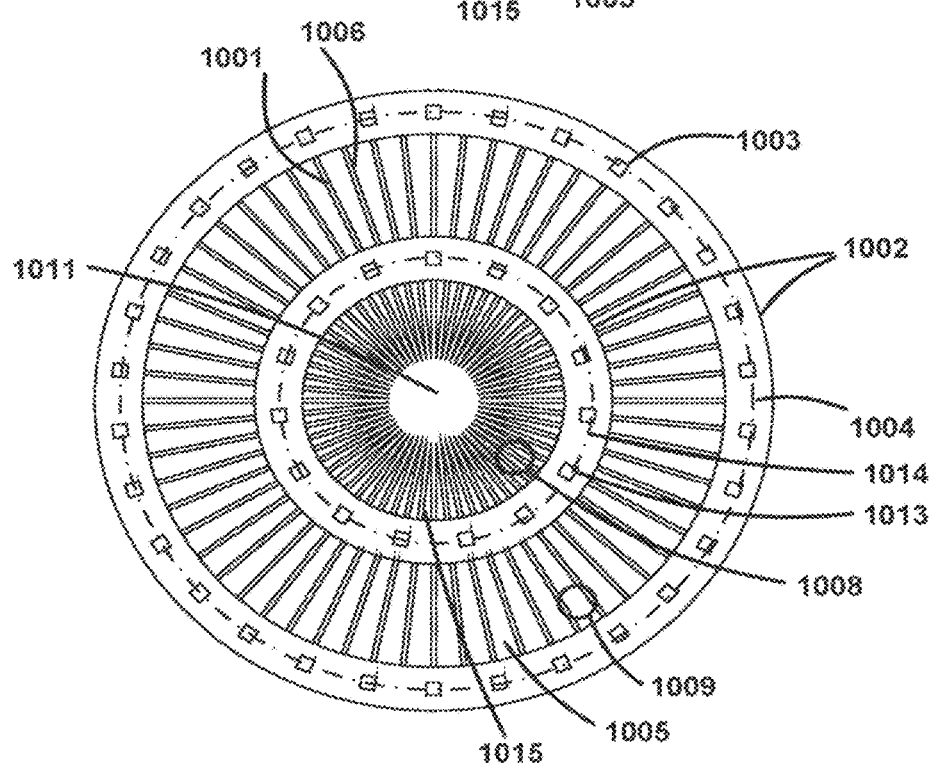

FIGS. 10A-10B depict an isometric view and a front view of an exemplary heat sink having at least two fins. A heat sink includes at least two fins 1001, 1006, which are substantially the same size, pointing radially to a common center and are in thermal contact to a base 1002. At least one of the fins 1001, 1006 thermally and mechanically attaches to a center column 1011. At least three of the outer most LEDs 1003, form an outer perimeter 1004 having at least one opening 1005 formed between the combination of LEDs 1003, the PCB and the optic to allow for improved air flow. The optional optic and the PCB are not shown. As depicted, the spacing between the fins 1001, 1006 at a heat sink perimeter 1009 is larger than the spacing of fins near the center region 1008. In such a radial arrangement, optimum spacing may be generally difficult to achieve. For example, if fin spacing at the perimeter 1009 is optimized, the fin spacing near the center region 1008 becomes too close (e.g., <3 mm) to allow for effective air flow. In some embodiments, at least one of the LEDs 1003 forming the inner perimeter 1014 may be different from the LEDs 1003 forming the outer perimeter 1004. The inner perimeter 1014 does not cross over the outer perimeter 1004 and is enclosed by the outer perimeter 1004. The inner perimeter 1014 includes at least one opening 1015 that allows for improved air flow.

Figure 10C:
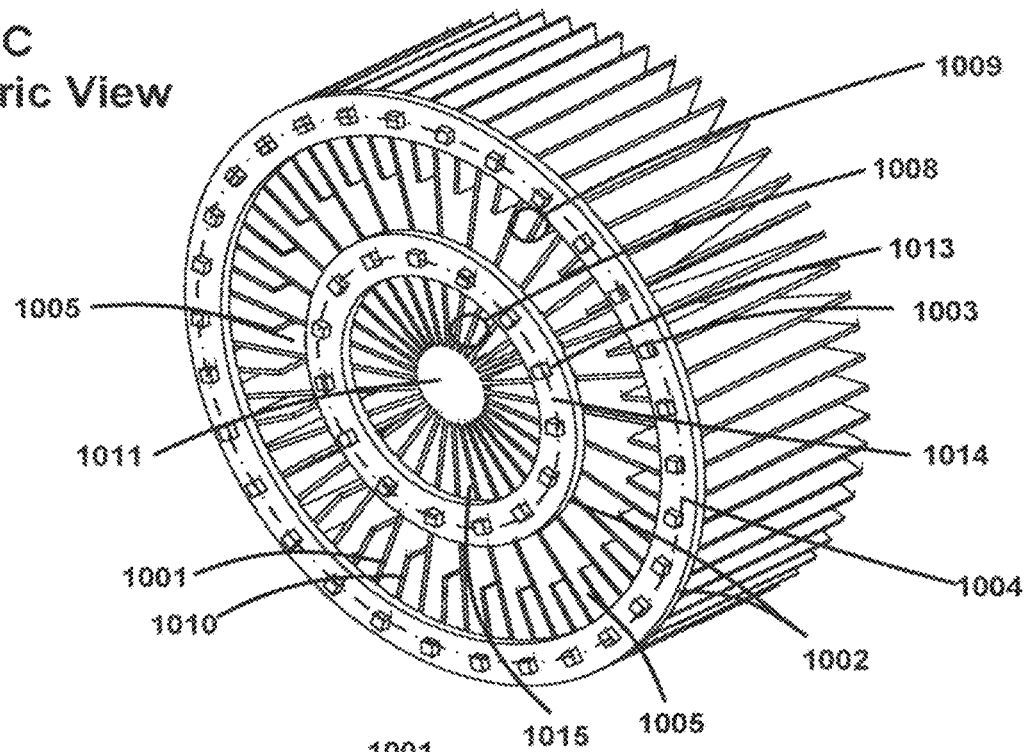
FIGS. 10C-10D depict an isometric view and a front view of an exemplary heatsink having fins of different radial lengths.
Figure 10D:
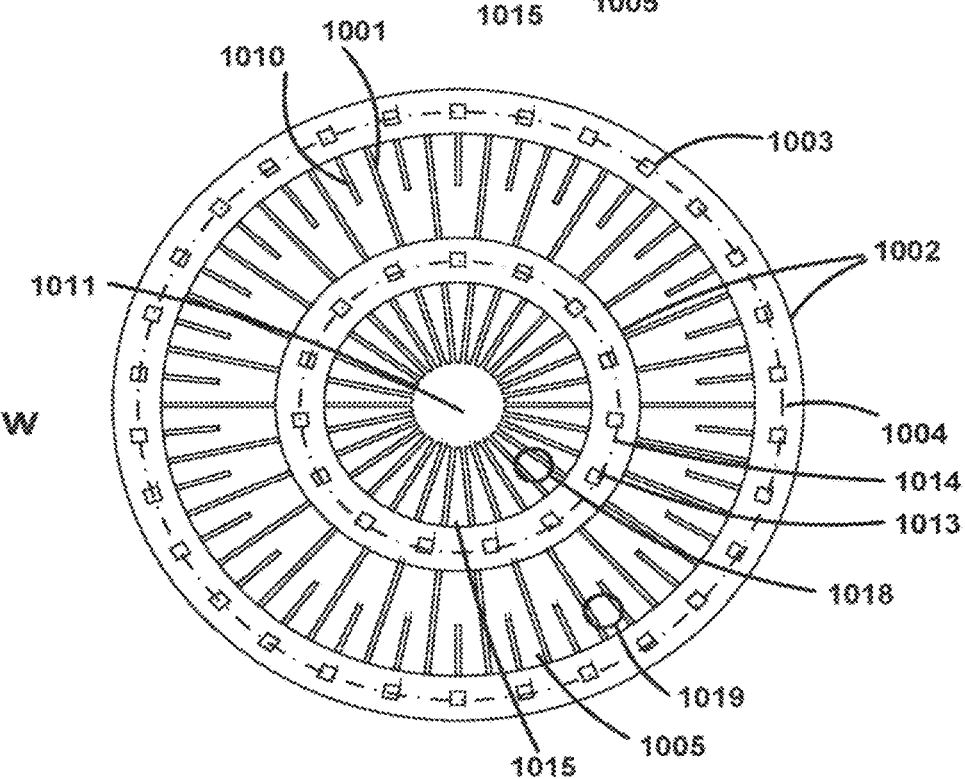

FIGS. 10C-10D depict an isometric view and a front view of an exemplary heatsink having fins of different radial lengths. As depicted, a modification is made to improve the spacing issue by using fins of at least two different radial lengths with a first fin 1001 with a first radial length and a second fin 1010 with a shorter radial length. The shorter fins 1010 are positioned towards the outer perimeter 1004. In this configuration, the interior fin spacing 1018 is substantially improved over the center region 1008 while the fin spacing at the perimeter 1009, 1019 remain substantially unchanged.

Figure 10E:
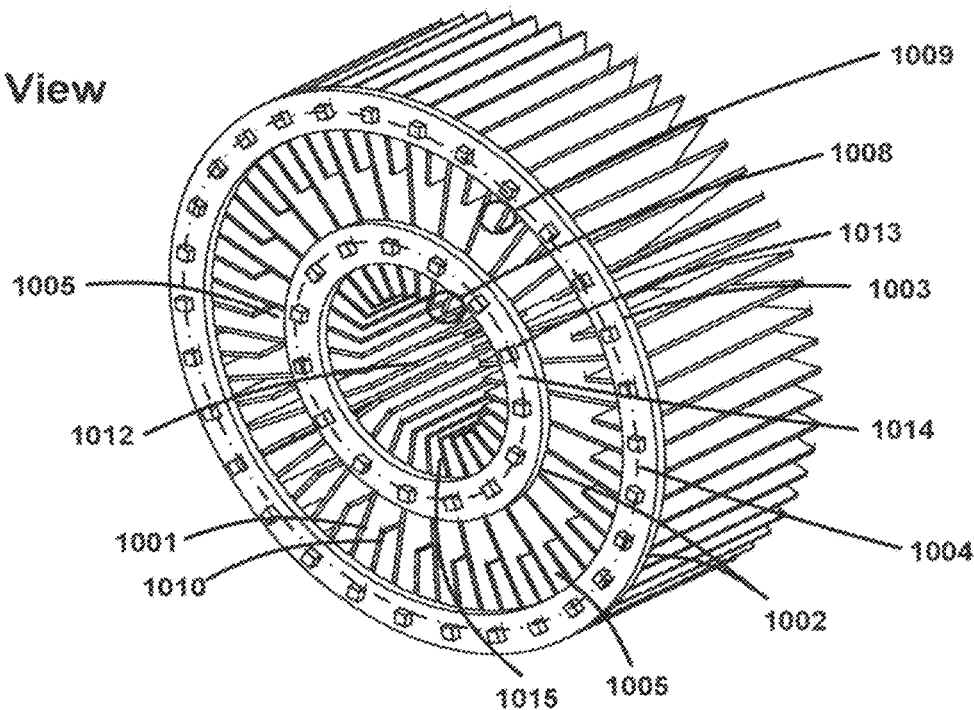
FIGS. 10E-10F depict an isometric view and a front view of an exemplary heatsink having an opening in the center.
Figure 10F:
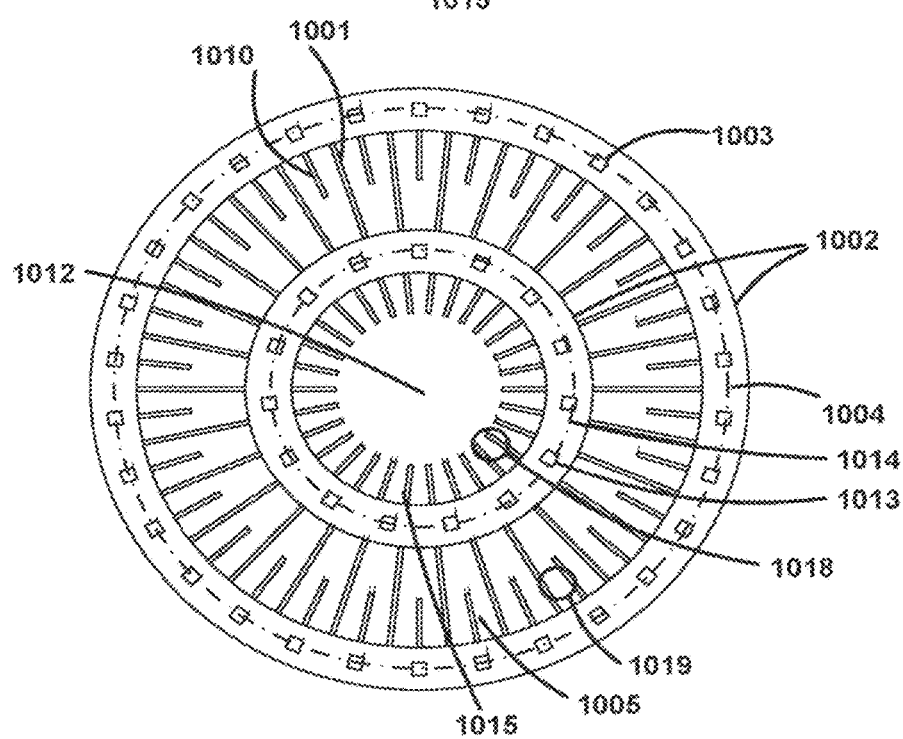

FIGS. 10E-10F depict an isometric view and a front view of an exemplary heatsink having an opening in the center. As depicted, a heatsink includes an opening 1012 in the center to allow for further improved airflow.

In FIGS. 10A-10F, the portion of the heatsink base 1002 separated in two mechanical rings corresponding to outer perimeter 1004 and inner perimeter 1014. The base 1002 itself cannot spread the heat from the outer perimeter 1004 to the inner perimeter 1014 thus the two perimeters are substantially thermally isolated from each other. The majority of the heat generated in each perimeter ring flows substantially directly through the base 1002 backwards into the heat dissipating feature of the fins. By spreading the LEDs 103 into multiple perimeter rings allows for a more even distribution of heat across the front surface of the outer perimeter of base 1002. Within each perimeter ring 1004 1014, the LEDs are substantially distributed uniformly across the circumference of the ring, which mean the heat generation along the ring is substantially uniform and temperature is substantially uniform, so heat need not be spread along the circumference of the ring. As the heat generated need not flow laterally, neither radially or along circumference, in base 1002, the in plane lateral thermal conductivity of base 1002 is greatly reduced. This allow for the base 1002 to be made very thin and perforated with openings 1005 1015 for air flow. The openings 1005, 1015 and thinnest of the base 1002 has the additional advantage of allowing the base 1002 to be light weight.

Figure 11A:
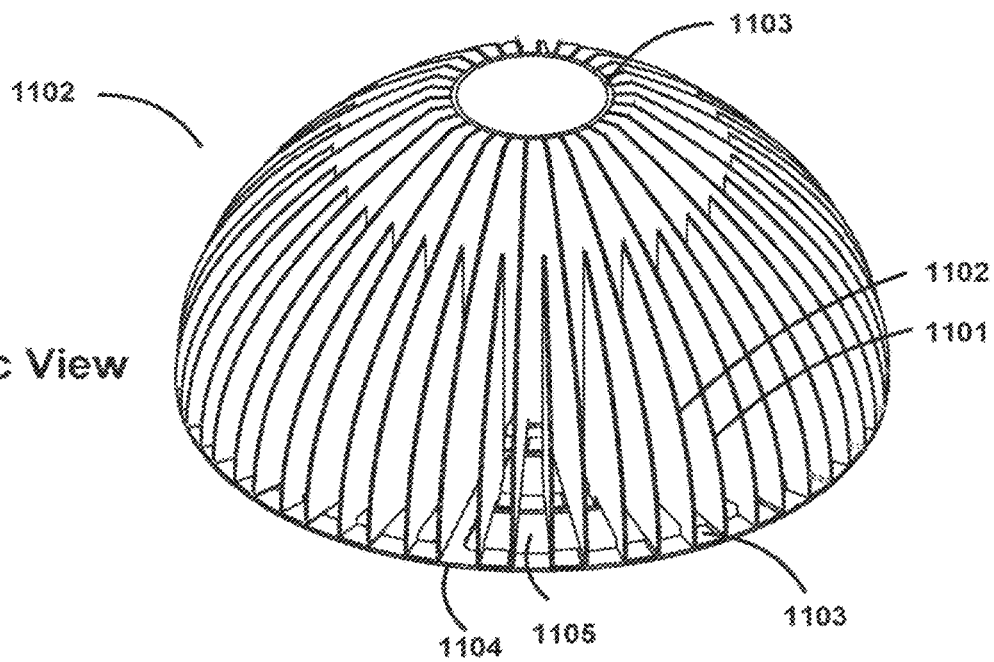
FIGS. 11A-11B depict an isometric view and a front view of an exemplary heatsink.
Figure 11B:
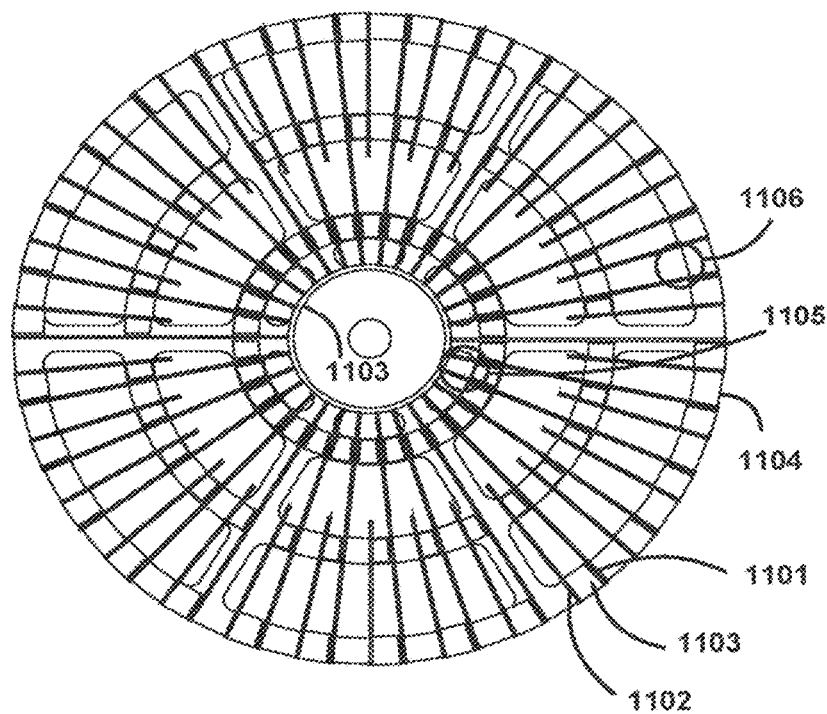

FIGS. 11A-11B depict an isometric view and a front view of an exemplary heatsink. With reference to FIG. 1B, heatsink 102 includes at least two heatsink fins 1101, 1102, each fin 1101, 1102 orientated in a radial pattern. At least one of the fins 1101, 1102 is connected thermally and mechanically to either a central column 1103 and, optionally, to a base 1104. The connection method may include crimping, riveting, brazing, soldering or gluing. In various embodiments, at least one of the fins 1102 may be of a shorter radial length than the other fin 1101. The short fin 1102 may be positioned towards an outer perimeter. In such an arrangement, the spacing 1105 between fins 1101 from near the center may increase leading to improved airflow and reducing temperature. Another benefit of a shorter fin may be reduced weight.

Figure 11C:
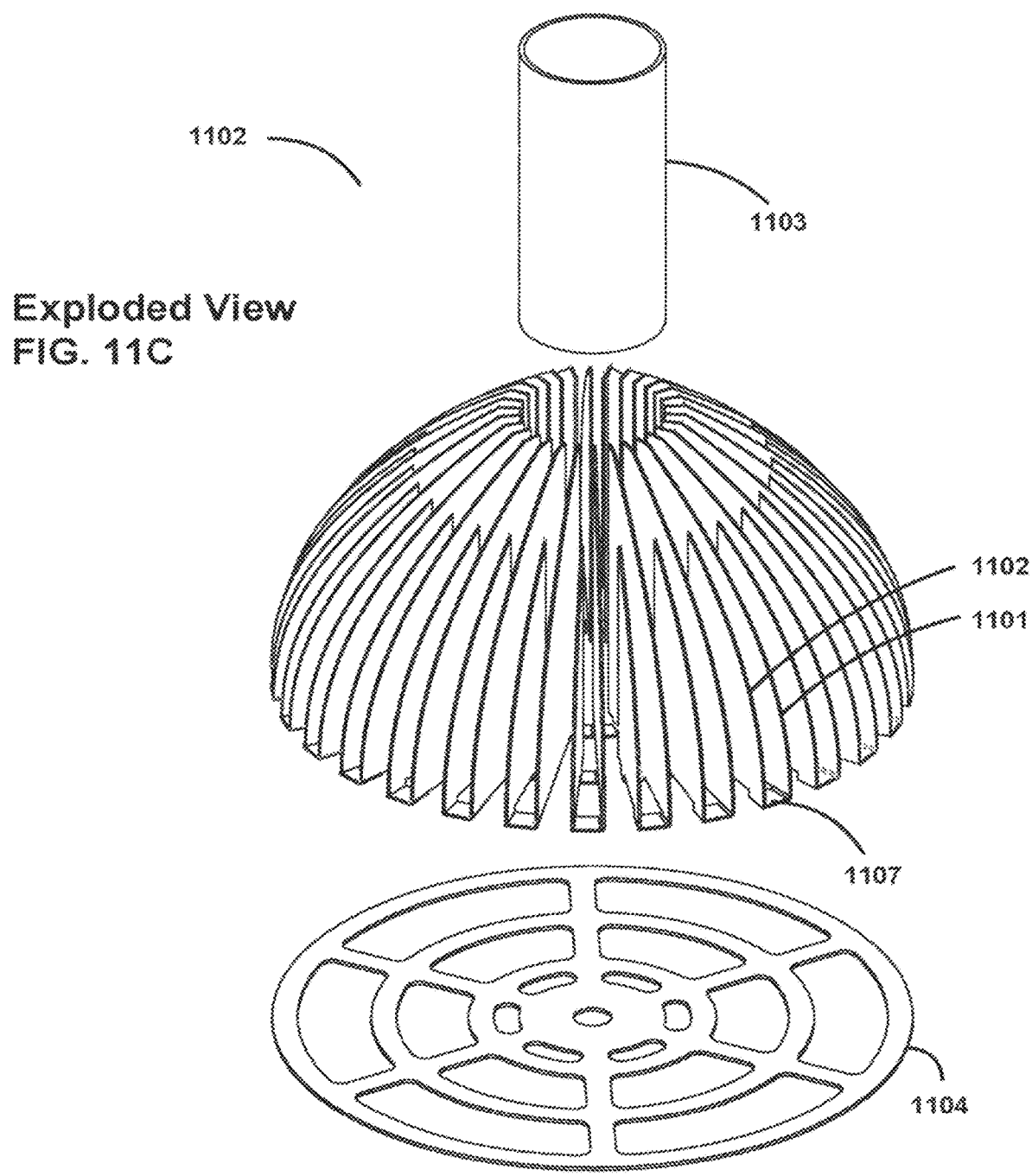
FIG. 11C depicts an exploded view of an exemplary heatsink.

FIG. 11C depicts an exploded view of an exemplary heatsink. As depicted, the heatsink 102 includes the center column 1103, a plurality of fins 1101, 1102 and the base 1104.

Figure 11D:
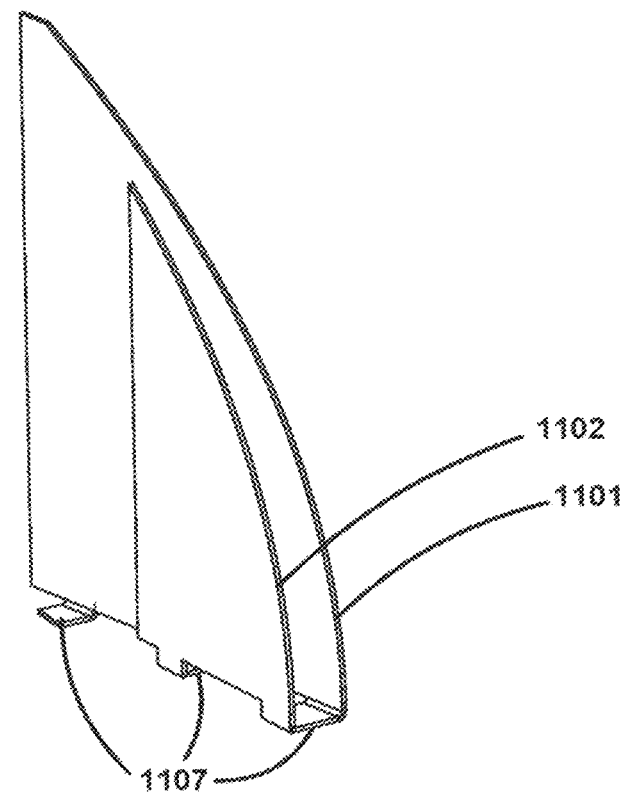
FIGS. 11D and 11E depict an exemplary set of a pair of fins.
Figure 11E:
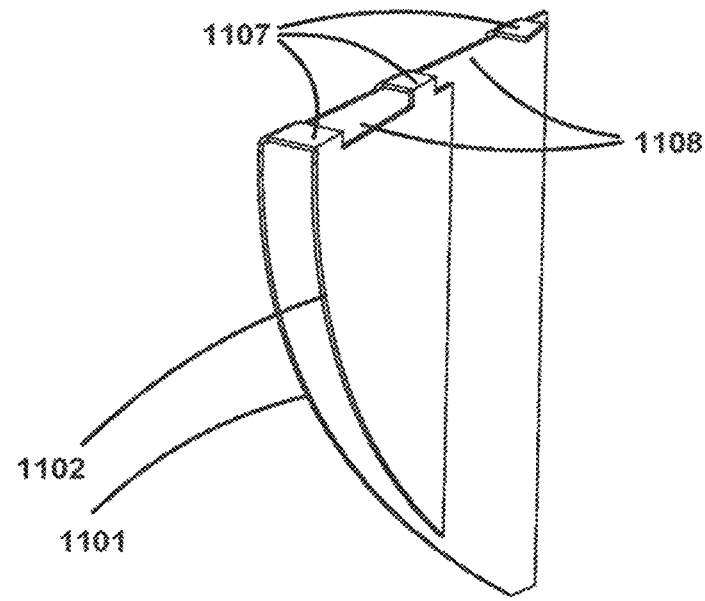

FIGS. 11D and 11E depicts an exemplary set of a pair of fins. As depicted, fins 1101, 1102 are fabricated from a single piece of material, such as sheet metal, and folded into shape. The two fins 1101, 1102 are connected by a flat base region 1107. The flat base region 1107 may be thermally and mechanically attached to the base 1104 or, alternatively, directly to a PCB. If directly attached to a PCB, the preferred method would be a thermally conductive glue, such as, for example, an epoxy, silicone, or thermal grease. In various embodiments, the flat base region 1107 may not be continuous but has openings 1108 between them. These openings 1108 allow for air to flow when assembled into the full heatsink 102.

In some embodiments, the flat metal fins of FIG. 9A-11E may have holes. The purpose of these holes may be to allow for air to flow though the fins which is advantageous if the optical system containing the fins is not mounted in a substantially vertical position. For example, if the optical system is at a skewed angle from vertical or lying horizontal. The holes allow for improved air flow in such orientations. In some embodiments, the hole area may be at least 20% of the surface area of any particular fin.

Optical Accessory

A secondary optic, or optical accessory, may be placed in front of the primary optic to redirect at least a portion of a first optical distribution into an overall secondary optical distirbution. In some embodiments, the primary optical distribution may be modified by the optical accessory so the overall secondary optical distribution becomes one or more of the following: wider, asymmetrical, provide uplight, reduce glare such as in using louvers, diffuse the light, suitable for aisle lighting.

In various embodiments, the majority of primary light distribution passes through unaltered by the optical accessory. In some embodiments, between 5% and 75% of the primary distribution may be substantially unaltered. In various embodiments, openings, or open regions, in the optical accessory may pass light through the accessory unaffected. Although such open areas can be filled with a flat parallel window which does not substantially alter the direction of light passing through it, such windows still suffer from Fresnel reflection or a 4% back reflection from each of the two surfaces resulting in an about 8% loss in optical efficiency. Therefore, openings formed from an absence of material are advantageous as they provide maximum efficiency without Fresnel losses. Such openings also have the additional benefit of reduced weight and allowing for airflow.

In some embodiments, the optical accessory may be substantially round and can be rotated on its center such that any asymmetric secondary optical distribution of the accessory rotates with the accessory.

FIGS. 12A, 12B, and 12C depict various views of an exemplary optical accessory. With reference to FIG. 1B, the optical accessory 104 may be used to provide uplight. The optical accessory 104 includes an optical portion 1203 that redirects at least a portion of the primary optical distribution. In some embodiments, the optical accessory has an opening 1201 that allows for air flow. In various embodiments, the optical accessory 104 has mechanical attachment features that allow for mounting to a LED system. For example, the mechanical attachment features may include screws, snaps, or magnets. In an illustrative example, the mechanical attachment features enable easy rotation of the optical accessory 104 about its center relative to a LED system. As depicted, the optical accessory 104 is attached 132 to the main structure through a series of snap features 1202. The snap features 1202 are designed in such a way that allow for easy rotation of the optical accessory 104. The snap features 1202 are designed to snap into a corresponding feature in the primary optic.

Figure 13A:
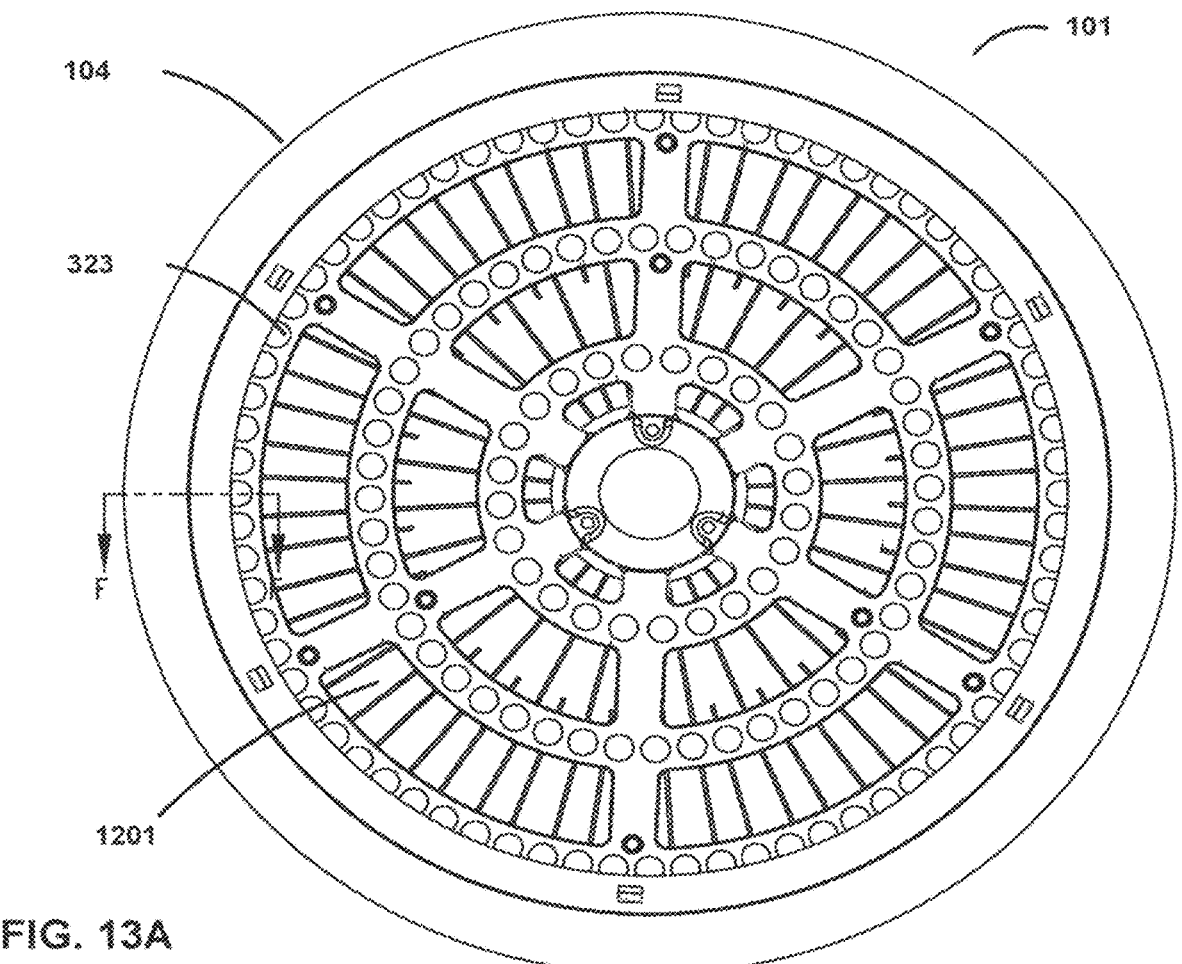
FIG. 13A depicts the front view of an exemplary optical system 101 having an optical accessory.

FIG. 13A depicts the front view of an exemplary optical system having an optical accessory. The optical accessory 104 over laps and redirects at least a portion of the light from the outer ring of optic 323. The opening 1201 in the optical accessory 104 allows for light from the middle ring 322 and the inner ring 321 to escape undisturbed. The opening 1201 further enables air flow to the optic opening 502, the LED opening 205 and into the interior of the heatsink 102. The opening 1201 may also reduce the weight of the optical accessory.

In some embodiments, for the creation of uplight, there is at least one LED at a periphery near the edge of the mechanics. The mechanics may comprise the optical system or the heatsink 102. The optical accessory creates up light by redirecting a least a portion of light emitting from the at least one LED at the periphery to create the up light. In various embodiments, a LED and a corresponding optic may be within 25 mm of an edge of the LED system that does not have the optical accessory. Advantageously, locating the LED near the edge of the mechanics may more easily allow for the redirection of at least a portion of light around the mechanics into uplight. In various embodiments, between 5% and 40% of the total light from the LED system is redirected into uplight. The optical accessory may have interior opening so that majority of the light passes through it unaffected.

Figure 13B:
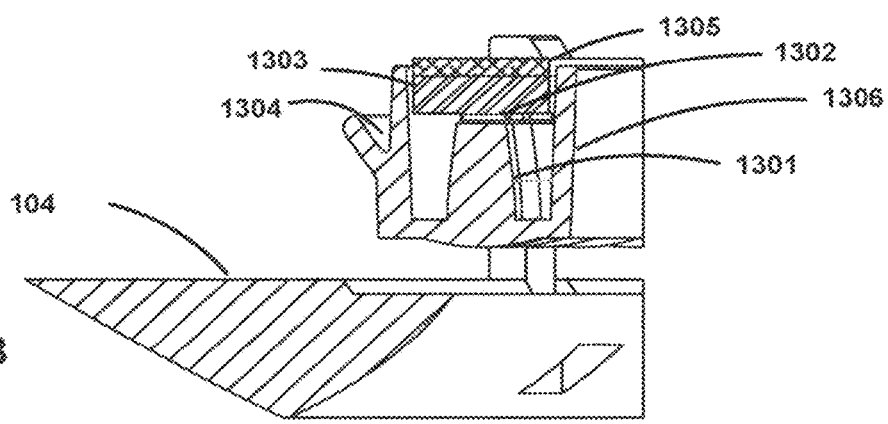
FIG. 13B depicts a cross section view of an exemplary optical system having an optical accessory.

FIG. 13B depicts a cross section view of an exemplary optical system having an optical accessory. The cross section, at F-F, includes the heatsink base 1305, a PCB 1303, at least one LED package 1302, a primary optic and the optical accessory 104. The primary optic includes at least one optic 1301, an optic holder 1306, and a mating snap feature 1304.

Figure 13C:
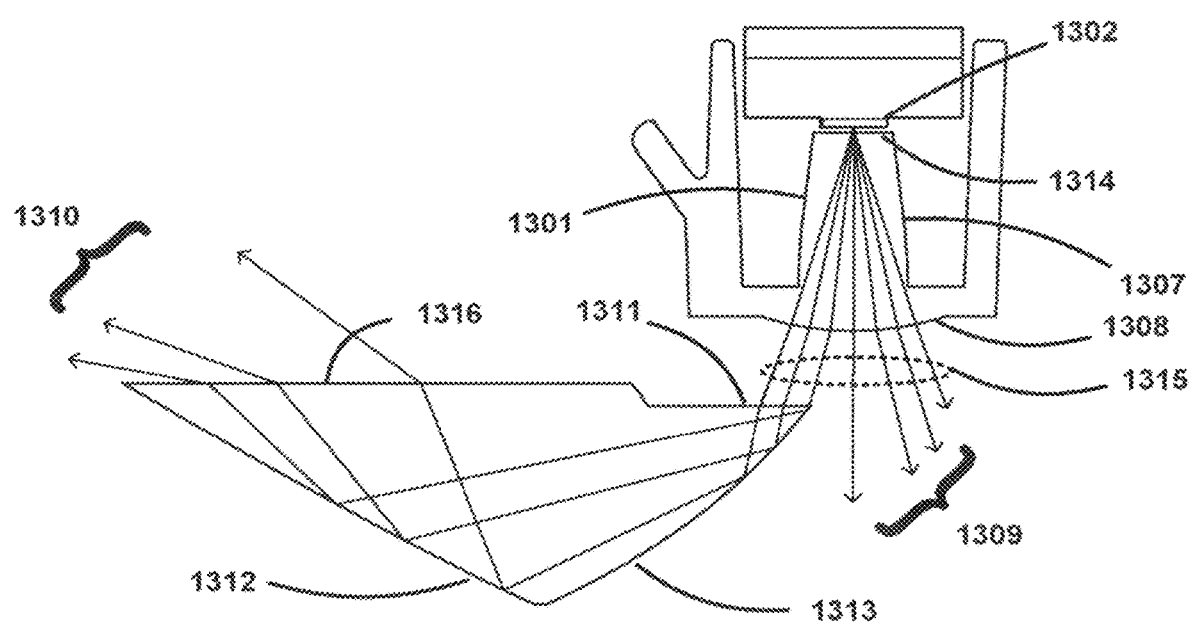
FIG. 13C depicts an illustrative ray trace of a cross section of an exemplary optical system.

FIG. 13C depicts an illustrative optical ray trace of a cross section of an exemplary optical system. The LED 1302 is located near the perimeter of the mechanics of the optical system. The mechanics compose an optical system such that a portion of an emitted light may be more easily redirected by the optical accessory 104 around the mechanics to form uplight 1310. At least one portion of the emitted light from the LED 1302 is redirected by the optic 1301 into a first distribution 1315. At least a portion of the first optical distribution 1315 is further redirected by the optical accessory 104 into an overall secondary distribution comprising of the unaffected light 1309 and the redirected light 1310. In some embodiments, the primary optic 1301 may be in the form of a dielectric CPC with an input surface 1314, a TIR reflector surface 1307 and a curved output surface 1308. The optical accessory 104 includes an input surface, a first reflector surface 1313, a second reflector surface 1312 and an exit surface 1316. The input surface and the exit surface 1316 may share a portion of the same physical surface. The optical accessory 104 has series of snap features 1202 designed to mate to the main optical system via corresponding features in the optic 1304. The snap features 1202 may be designed in such a way to allow for easy rotation of the optical accessory 104 by hand.

Figure 14:
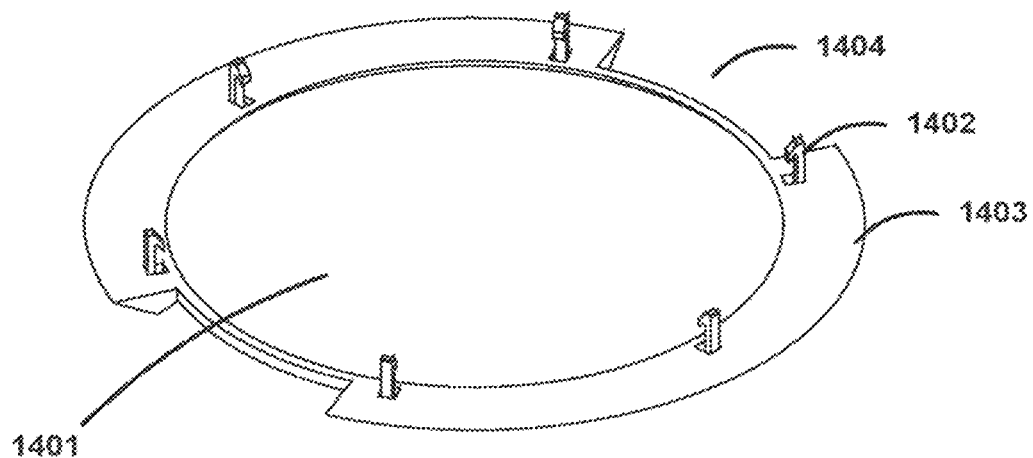
FIG. 14 depicts perspective view of an optical accessory.

FIG. 14 depicts perspective view of an optical accessory. An optical accessory, as depicted, may be used to redirect a light into a more asymmetric profile. The optical accessory having at least two different regions, a first region 1403 and a second region 1404. Each region arranged to redirect the light into substantially different distributions. The optical accessory further comprising an open region 1401 having similar function to the open region 1201. The optical accessory includes a snap feature 1402 having similar function to snap feature 1202.

Figure 15:
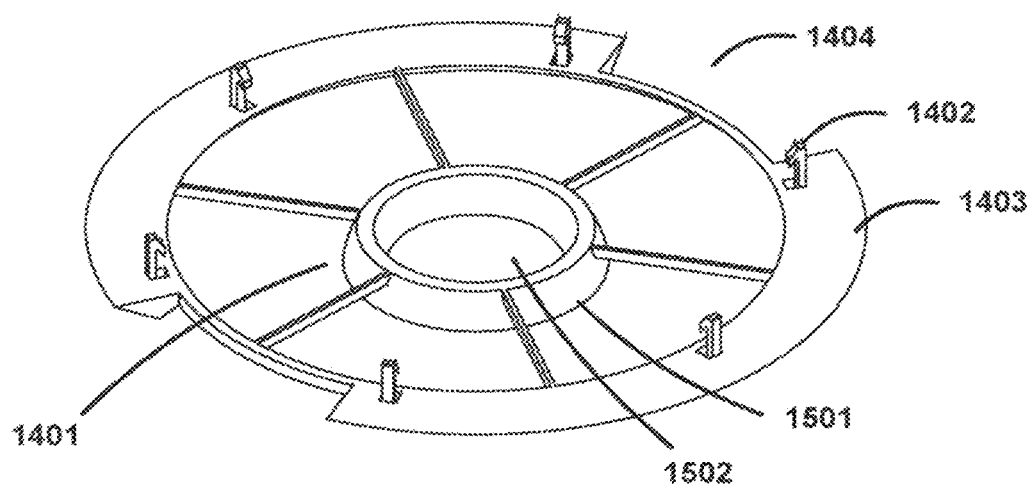
FIG. 15 depicts a top perspective view of an exemplary optical accessory having an additional optical accessory region 1501 that is used to redirect the light from the interior of corresponding LEDs.

FIG. 15 depicts a top perspective view of an exemplary optical accessory having an additional optical accessory region 1501 that is used to redirect the light from the interior of corresponding LEDs. The additional region 1501 may have an opening region 1502 to allow for improved air flow into the LED system.

In some embodiments, the optical accessory may be stackable so at least a portion of light may be redirected by each optical accessory.

Electronic Driver

The LED systems may be powered from at least two types of sources, such as, for example, directly from offline AC voltage source or from a ballast.

In the case of offline operation with AC voltage source 1701, the electronic LED driver may be powered by AC line voltages including 100 VAC to 480 VAC and including frequencies 50 Hz or 60 Hz. Some popular voltages include 100, 110, 115, 120, 200, 220, 230, 208, 240, 277, 305, 380, 400, 415 or 480 VAC. The electronic driver technology for such offline supplies include switching mode drivers with various topologies, such as, for example, buck, boost, buck bust, flyback, or combinations thereof.

In the case of operation with a ballast, such as a magnetic HID ballast, certain challenges need to resolved, for example achieving an acceptable power factor (PF) and a total harmonic distortion (THD) at the input to the ballast. Additionally, preventing damage from pulse start ballasts with ignitors that generate approximately 2-5 kV pulses during the initial warm phase intended for an HID lamp may also need to be resolved. Examples of Pulse start 400 W HID ballast with ignitors include M135, M155, or SD51. An example of Probe start 400 W HID ballast without ignitors includes M59.

HID magnetic ballasts are designed for specific HID lamp load. For example, a M59 magnetic ballast is designed to power 400 W metal halide HID lamp with good power factor, generally >0.9 or >0.8 and a good THD, generally less than 32% or less than 20%. A LED lamp intended to directly retrofit to with the same HID ballast would require significantly less power, for example consume 150 W instead of 400 W. This presents a completely different load to ballast and may result in a poor power factor, for example a power factor less than 0.8, and a poor THD, for example a THD greater than 32%. The LED electronic driver must operate to trick the ballast in delivering a significantly lower power of about 150 W or about 200 W while maintaining a good PF and a good THD to the system.

Figure 16A:
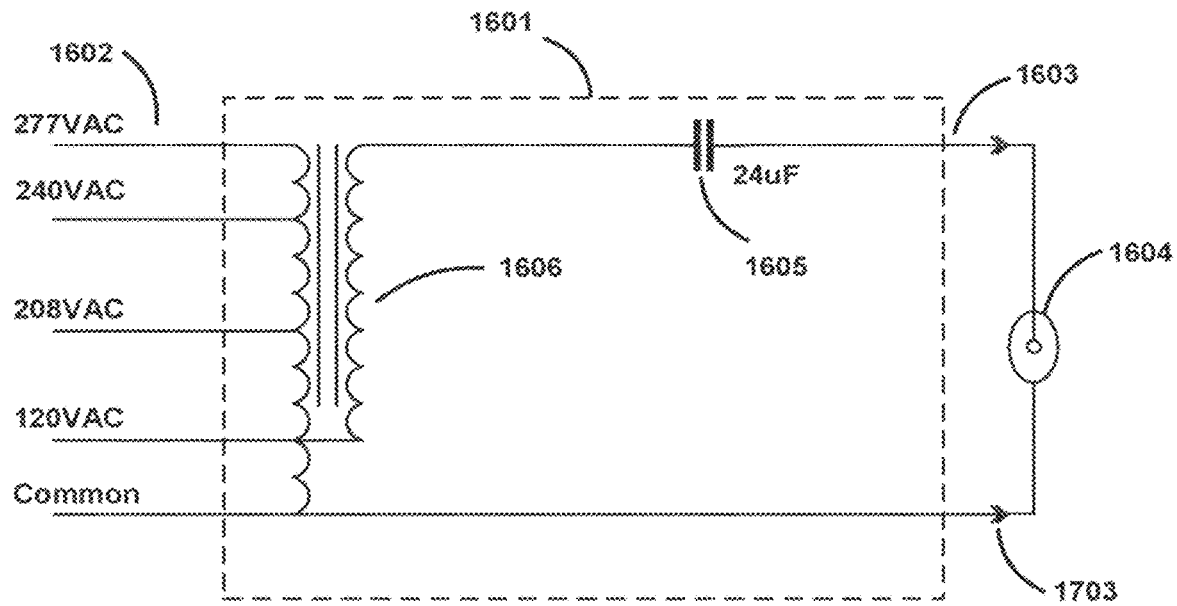
FIG. 16A depicts a schematic of an exemplary 400 W Probe Start Metal Halide ballast designed to work with a probe start M59 Metal Halide lamp load.

FIG. 16A depicts a schematic of an exemplary 400 W Probe Start Metal Halide ballast designed to work with a probe start M59 Metal Halide lamp load. A ballast 1601 includes a transformer 1606, an output capacitor 1605, a series of inputs 1602 and an output 1603. The series of inputs 1602 includes multiple taps into the transfer allowing the ballast 1601 to operate at different AC voltage sources, such as 277V, 240V, 208V or 120V. In an illustrative example, a Metal Halide lamp load 1604 may be replaced with an electronic driver through a connection 1703. During the initial operation of a HID lamp, where the HID lamp is in a cold state, the HID lamp has high impedance and the ballast 1601 operating in a relatively constant wattage mode delivers about 300V to the HID lamp. As the HID lamp warms up, the impedance drops resulting in a drop in voltage to about 130 V.

Figure 16B:
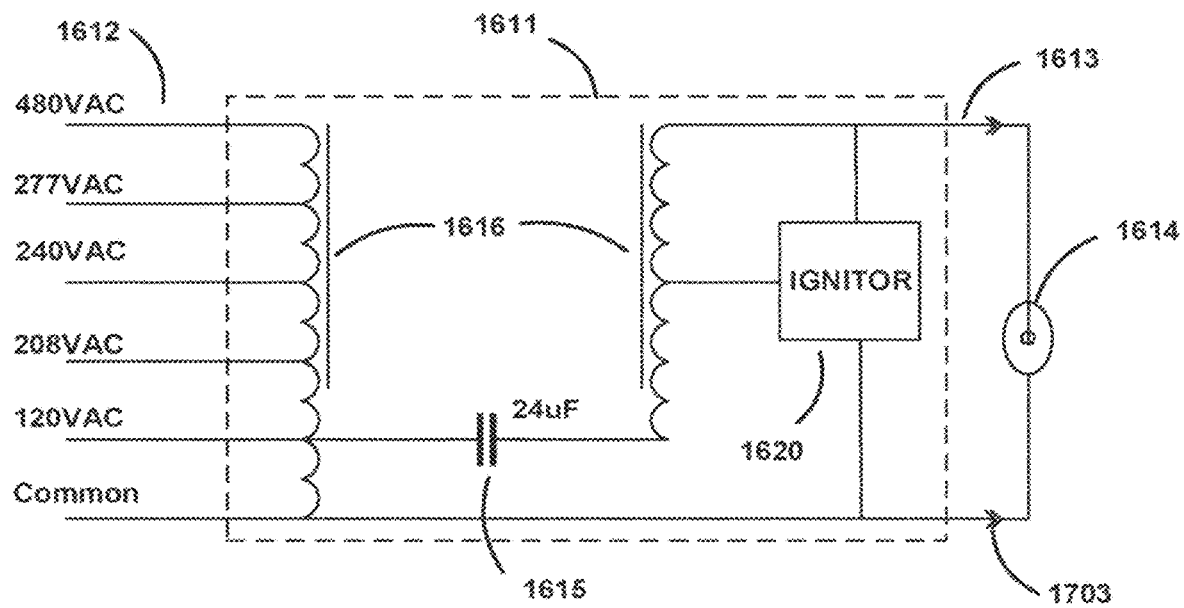
FIG. 16B depicts a schematic of a 400 W Pulse Start Metal Halide ballast designed to work with probe start M135 Metal Halide lamp load.

FIG. 16B depicts a schematic of a 400 W Pulse Start Metal Halide ballast designed to work with pulse start M135 Metal Halide lamp load. A ballast 1611 includes a transformer 1616, a capacitor 1615, a series of inputs 1612 and an output 1614. The series of inputs 1612 includes multiple taps into the transfer allowing the ballast 1611 to operate at different AC voltage sources, such as 480V, 277V, 240V, 208V or 120V. The Metal Halide lamp load 1614 may be replaced with an electronic driver through the connection 1703. The initial high impedance of a HID lamp in a cold state results in an initial higher voltage across the lamps, for example, $V_i$>250V. The high voltage may be sensed by ignitor 1620 and causes it to generate 2-5 kV pulses to help expedite the warm up of HID lamps. Once a HID lamp warms up, the impedance drops to about 130V. The ignitor senses this drop in voltage and ceases firing.

Figure 17:
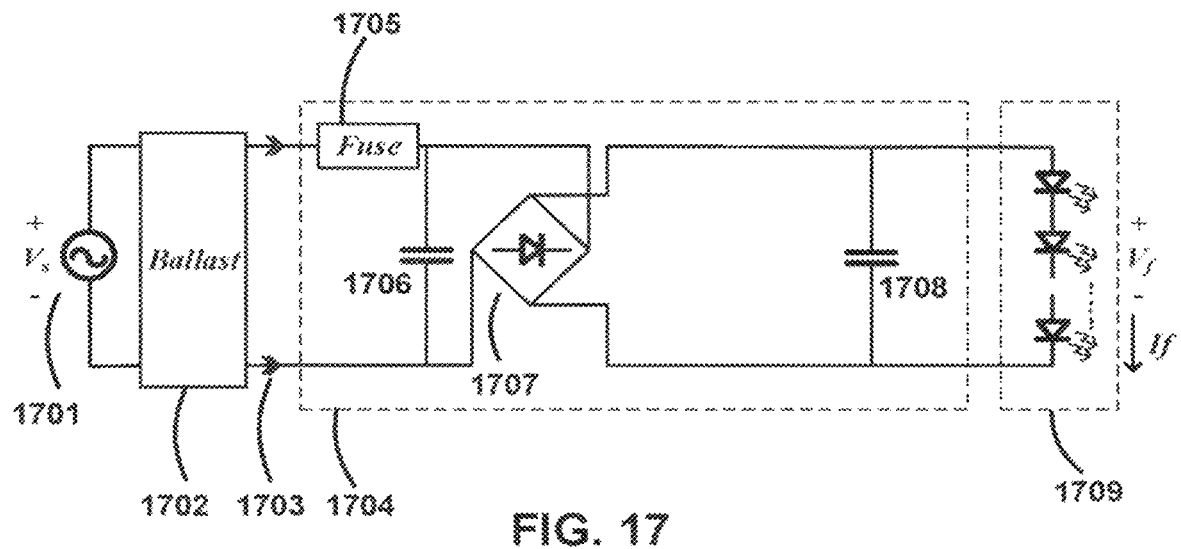
FIG. 17 depicts a schematic of an exemplary electronic LED driver designed to interface with a magnetic ballast.

FIG. 17 depicts a schematic of an exemplary electronic LED driver designed to interface with a magnetic ballast. A magnetic ballast 1702 (e.g., ballast 1601 or ballast 1611) is powered by an offline AC voltage source 1701. The ballast 1702 is connected to the electronic LED driver 1704 via an electrical connection 1703, for example an E39 or E40 lamp base. The electronic LED driver 1704 includes a capacitor 1708, a rectifier bridge 1707, a smoothing capacitor 1708, and optional current and/or thermal fuses 1705. The electronic LED driver 1704 powers LED 1709 with forward voltage $V_f$. The input capacitor 1706, disposed before the bridge, needs to be bipolar, such as a film type capacitor. The input capacitor 1706 serves as a partial shunt that diverts some of the output power and current from ballast 1702 back into the ballast 1702 instead of to the LED 1709. The smoothing capacitor 1708 is intended to minimize the current ripple going into the LED 1709. The power and LED forward current $I_f$, into the LED 1709, is controlled by the combination of the capacitance in capacitor 1706 and the LED 1709 forward voltage, $V_f$. A M59 ballast, with an input capacitor 1706 of about 22 uF and a LED with forward voltage of about 140V, will result in approximately 150 W delivered to the LED 1709. The value of the smoothing capacitor may be set to 1000 s uF. In such a configuration, at the input to the ballast 1702, the PF is about 0.89 with a relatively high THD, at 48%.

In some embodiments, the input capacitor 1706 may be reduced to 10 uF and the LED 1709 forward voltage $V_f$ may be reduced to between 65V-75V. This results in an improved power factor of 0.92 and a significantly improved THD of 23% with power, about 200 W, delivered to the LED 1709. The load voltage experienced by the ballast output is substantially equal to the LED forward voltage, which is well below the voltage needed for the ignitor to fire Voltage $V_i$ of about 250V. Thus, in such an arrangement, the electronics driver components are protected from the ignitor high voltage pulses.

The LED 1709 has a forward Voltage $V_f$ and a LED current $I_f$. The LED 1709 may be the previously referenced LED 101 that is part of the overall LED system 100.

Figure 18:
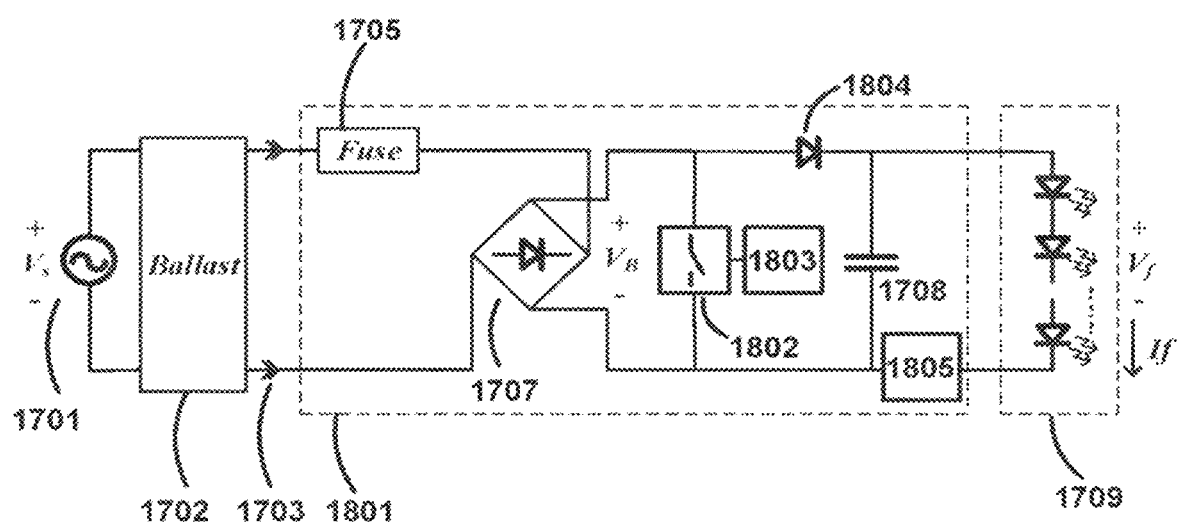
FIG. 18 depicts a schematic of an electronic LED driver designed to interface with a magnetic ballast having a bridge, a switch controlled by a controller unit, a smoothing capacitor and a string of LEDs with total forward voltage $V_f$.

FIG. 18 depicts a schematic of an electronic LED driver designed to interface with a magnetic ballast. The electronic LED Driver having a bridge, a switch controlled by a controller unit, a smoothing capacitor and a string of LEDs with total forward voltage $V_f$. With reference to FIG. 17, FIG. 18 consists of the addition of a switch 1802 controlled by a controller unit 1803. The switch 1802 may be a MOSFET, or any other device or combination of devices that have relatively low impedance when activated and have a current carrying capacity for at least a portion of time to shunt the power and current back into the ballast 1702. The switch 1802 may be designed to selectively shunt a portion of the power and current from the ballast 1702 back to ballast 1702 thereby regulating the power into the string of LEDs 1709. The controller unit 1803 may have selective sensor inputs. The selective sensor inputs may include a LED current from current sensor 1805, the output voltage $V_B$ from rectifier bridge 1707, a voltage across capacitor 1708, a temperature of the string of LEDs 1709 or a temperature of the electronic LED driver 1801 itself. The controller unit 1803 senses these inputs and controls the switch 1802 accordingly to regulate the LED forward current $I_f$. The controller unit 1803 may simply be a selection of discrete components or more flexibly be a microprocessor or micro controller unit. If the controller unit 1803 is able to sense the phase of the input voltage, such as, for example, by monitoring the voltage $V_B$ across the bridge 1707, switching can be in phase or synchronous with the line frequency. In some embodiments, the controller unit 1803 may control the switch 1802 regardless of phase or in heuristic control manner that is asynchronous with the input voltage waveform.

The main purpose of the controller unit 1803 is to the control switch 1802 in a manner that regulates the LED current to some predetermined manner. One advantage of FIG. 18 over FIG. 17 is that the controller unit 1803 can regulate current $I_f$ to the LED 1709 more precisely to accommodate variations in the line voltage $V_s$. For example, $V_s$ commonly varies at ≥10% and the controller unit 1803 can sense the LED current $I_f$ and adjust the switch 1802 to maintain a substantially predetermined current level. Further, when the temperature of the system exceeds some predetermined value, either for safety or to prolonging the life of the system, the controller unit 1803 can reduce the current to the LED 1709 thereby reducing the heat generated regulate the over temperature, a feature known as thermal roll back. Another advantage of the controller unit 1803 may be configured to dim the system when less light is required.

In reference to FIG. 18, and assuming a constant supply voltage $V_s$, the ballast 1702 may supply substantially a constant ballast current $I_{Ballast}$ over a range of Ballast loads. Table 4 summarizes the maximum power delivered to the LED ($I_f V_f$), using the schematic of FIG. 18, where ballast 1702 is a M59 HID ballast and switch 1802 is in an open state. By leaving switch 1802 in an open or deactivated, none of the current from the ballast is shorted back to itself, instead all the current is sourced to LED ($I_f = I_{Ballast}$) which allows the determination maximum possible delivered power to the LED. In Table 4, the current $I_f$ is substantially constant with changing LED forward voltage $V_f$ resulting in the power delivered to the LED to be substantially proportional to the LED forward voltage $V_f$. If there is no variation in ballast input voltage $V_s$ and no variation in the components such as the ballast or LEDs, the system power can simply be maintained by setting the LED forward voltage and there is no need for incorporation of switch 1802 or controller 1803. In reality, the AC source voltage can vary by at least +/−10% which leads to a ballast current to vary approximately proportionally or $I_{Ballast} \, \alpha \, V_s$. Also, the ballast may vary from unit to unit and with aging which also affects the ballast current $I_{Ballast}$. The addition of switch 1803, and 1802 compensates for such variations. The activation of switch 1803 can only decrease the delivered LED power from the maximum possible delivered power, so it is necessary to set the LED forward voltage $V_f$ such that the maximum possible deliver power is higher than the nominal power. In the nominal situation, the switch activates with the required duty cycle to reduce the delivered power to the desired nominal level. For example, in the case of Table 4, assume the nominal desired power is 175 W and assume the ballast current can vary $I_{Ballast}$=2.6 A+/−15%. The system would be designed such the maximum possible power level at the nominal ballast current would be at least 15% greater than 175 W or about 201 W. This would correspond to a minimum required LED forward voltage of about $V_f \geq 79.8V$. To deliver only 175 W at $V_f$=79.8V, the LED forward current need to be regulated to about 2.19 A instead of 2.6 A (175 W=79.8V·2.19 A). This may be accomplished by controller 1803 monitoring the LED forward current $I_F$, using current sensor 1805, and producing an appropriate duty cycle in switch 1802 such that average LED forward current is controlled to about $I_f$=2.19 A, with the excess current bypassed by the switch back to the ballast. In such a scenario, the switch is always switching under nominal conditions with an appropriate duty cycle to maintain a LED forward current $I_f$ less than the ballast current $I_{Ballast}$ i.e. $I_{Ballast}$ (2.6 A)>$I_f$ (2.19 A). However, if $I_{Ballast}$ fluctuates away from its nominal current of $I_{Ballast}$=2.6 A to $I_{Ballast}$<2.19 A, the switch can no longer regulate the LED current to $I_f$=2.19 A, as at most can LED current $I_F$ only be equal the ballast current to $I_B$. Thus, to be able to maintain regulation around the nominal condition, at the nominal operating point, the LED forward current $I_f$ must always less than the ballast current $I_{Ballast}$ ($I_f$<$I_{Ballast}$), and switch 1802 is always switching to maintain this condition. In some embodiments at nominal operation conditions the LED current satisfy $I_f$<0.95 $I_{Ballast}$ or $I_f$<0.9 $I_{Ballast}$ or $I_f$<0.85 $I_{Ballast}$.

There are least four possible advantages of having the switch 1802 and controller 1803:

a. Maintains LED current to a predetermined level even there is a fault or variations in the system, including if the wrong ballast is used to power the LED electronic driver.

b. With an addition of a temperature, the switch can be used to reduce the LED current to maintain a predetermine temperature. This is especially important for example in a fault condition the abnormally raises the system temperature.

c. The switch can reduce current for dimming of the LED output.

d. The switch allows for a less stringent specification of the LED voltage as long as the LED voltage is above a minimum required value.

TABLE 4

| LED Forward Voltage $V_f$ (Volts) | Ballast Current $I_{Ballast}$ (Amps) | Maximum Possible Power to LEDs $I_{Ballast} \cdot V_f$ (Watts) |
| --- | --- | --- |
| 59.1 | 2.66 | 157 |
| 61.8 | 2.61 | 161 |
| 64.8 | 2.60 | 168 |
| 67.7 | 2.58 | 175 |
| 70.7 | 2.55 | 180 |
| 73.6 | 2.55 | 188 |
| 76.7 | 2.53 | 194 |
| 79.8 | 2.53 | 202 |

In some embodiments, the controller unit 1803 also regulates the LED current while improving the PF and/or THD at the input to the ballast.

In various embodiments, the system consists of a HID ballast, an electronic driver, and a LED string. The HID ballast may have a set of inputs powered by an AC voltage source and a set of outputs to power the electronic driver. The ballast sourcing a ballast current $I_{Ballast}$ at its output. The electronic driver having at least a rectifier and a switch. The rectifier inputs are connected to the ballast output and the rectifier output is connected to the LED string. The switch being connected in parallel across the bridge output and across the LED string such when the switch is deactivated, the ballast current $I_{Ballast}$, substantially flows to the LED string and when the switch is activated, the switch substantially shorts the LED so the ballast current $I_{Ballast}$ is diverted through the switch back the ballast thus bypassing LED string. The switch is switched in a pattern to maintain a desired forward current $I_f$ into the LED. The LED forward voltage is set to a minimum value, such that under nominal conditions the average ballast current is always less than the LED forward current, $I_f$>$I_{Ballast}$. In some embodiments, there may also be a temperature sensor and the switch is switched in a pattern to reduce the current into the LED and to maintain a predetermined temperature set point. In further embodiment, there may be a capacitor across the LED to smooth out the current ripple and a diode before the capacitor to block the capacitor current flowing back to the switch.

Figure 19:
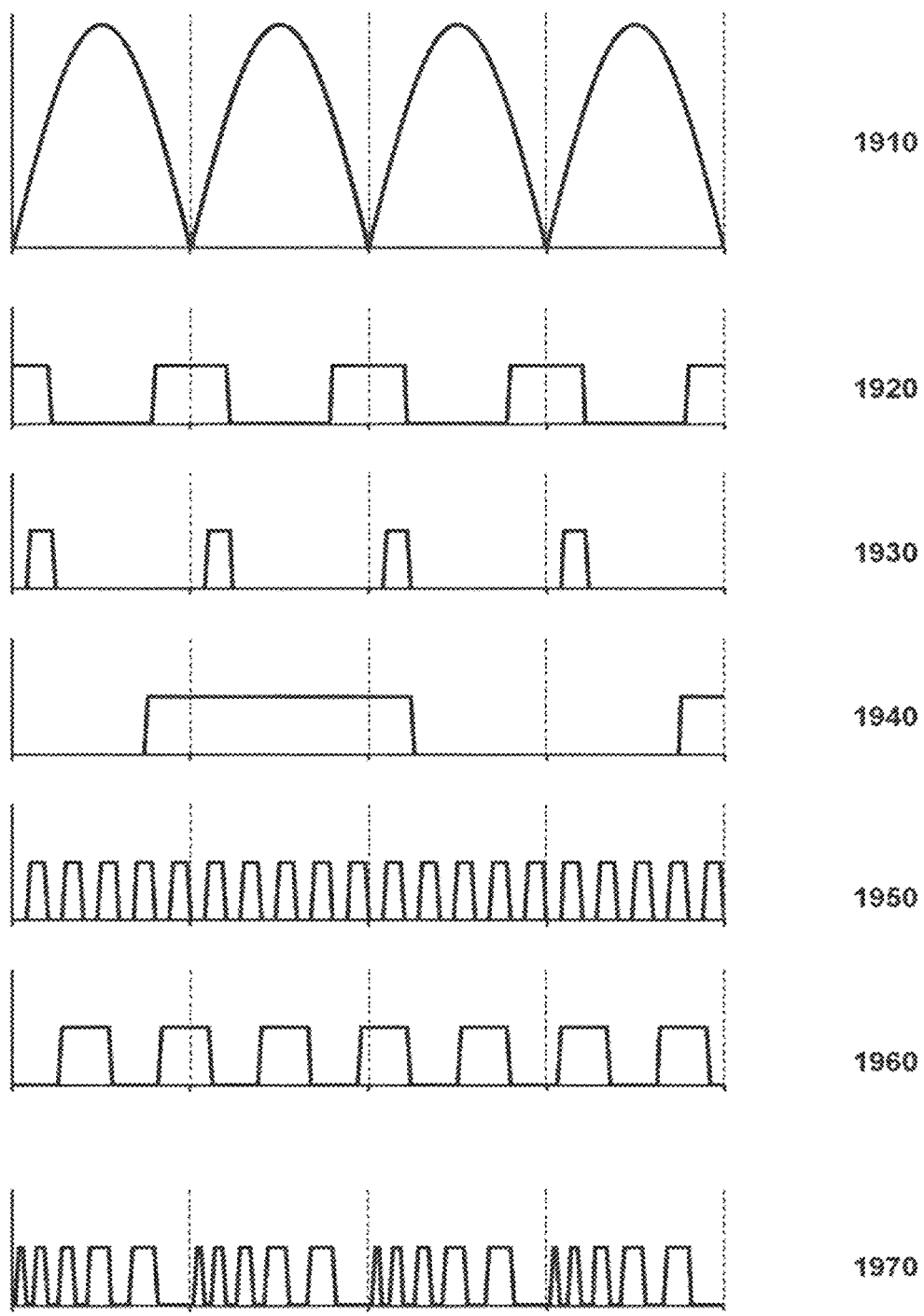
FIG. 19 depicts possible methods by which a controller unit controls a switch.

FIG. 19 depicts possible methods by which a controller unit controls a switch. A scheme 1910 shows the equivalent rectified offline voltage source 1701 or $V_s$. Note the rectified bridge voltage $V_B$, will have same periodicity as the scheme 1910 but may of a different, non-sinusoidal shape due to distortion from a ballast. Nevertheless, the bridge voltage $V_B$ may be used to sense the periodicity of the offline voltage $V_s$ which may be of a fixed phase offset. Schemes 1920-1970 show possible schemes to control the switch 1910 relative in timing to the phase of rectified voltage 1910 to regulate the LED current with possible benefit to improve PF and/or THD at the input to the ballast.

In scheme 1920 and 1930, the switch 1802 is controlled in phase or with a fixed phase offset with rectified voltage $V_B$ 1910, and there is a single on/off cycle within each cycle of the rectified voltage $V_B$ 1910. As such, the frequency of the scheme 1920 is the same as the scheme 1910 which is twice the line voltage frequency $V_S$ 1701. The scheme 1920 is symmetrical within the cycle whereas a scheme 1930 is intended to represent a class of schemes where the pulse of an arbitrary shape need not be symmetrical within the cycle. By intentionally offsetting the pulse from the peak of the voltage, the load can crudely be made to seem to be inductive or capacitive thus such pulse pattern is intended to improve PF or THD at the input to the ballast. The pulse pattern may also be used to simulate a nonlinear load to generate harmonics to cancel out harmonics in the ballast to overall improve THD. In some embodiments, the equivalent impedance, whether linear or nonlinear may vary within the duty cycle. Such control scheme is later described with reference to FIGS. 23-25.

In scheme 1940, the switch 1802 is controlled in phase or with a fixed phase offset with rectified voltage $V_B$, but there is not a full on/off cycle of the switch 1802 within each cycle of the rectified voltage $V_B$, thus the frequency of the scheme 1940 is lower than the scheme 1910.

In scheme 1950, the switch 1802 is controlled in phase or with a fixed phase offset with rectified voltage $V_B$, but there is more than a single on/off cycle of the switch 1802 within each cycle of the rectified voltage $V_B$. Thus, the frequency of 1940 is higher than 1910. In some embodiments, the frequency may be 2×, 4×, 10×, 100×, 1000×, 10,000× that of the rectified line frequency or alternative >10 KHz. One advantage of a higher frequency system is it more regularly charges the capacitor 1708 thus reducing the required capacitance. In various embodiments, the switching frequency may be equal or great than 2× the rectified line frequency but still of a sufficiency low frequency, for example less than <10× rectified line frequency, such that the inductance of the output of the ballast does not impede the shutting of current back to the ballast. For example, a typical inductance of the output winding of a M59 ballast is about 1000 mH. In other words, the ballast output may have sufficient inductance that if the switch 1802 is operated at too high a frequency, it may not effectively shunt the current and power from the ballast back into the ballast.

In scheme 1960, the switch 1802 is controlled out of phase with rectified voltage $V_B$. This scheme 1960 may more broadly encompass the switch patterns and frequency of the 1920-1950 but out of phase with rectified voltage $V_B$ of the scheme 1910. Such a class of asynchronous control include heuristic control, for example only switching as necessary to keep the voltage or current controlled to some predetermined range. Such a control scheme 1960 is simpler in that the complexity of sensing the phase, then syncing to the phase of the input voltage is not needed.

In scheme 1970, the switch 1802 controlled in phase with rectified voltage $V_B$ of the scheme 1910, but the switching pattern is intended to be arbitrary within each period but repetitive in each subsequent period. For example, in the specific scheme 1970, the frequency is higher at the beginning of the cycle and changed smoothly to a lower frequency. Such a scheme will more precisely simulate capacitive or inductive needed to improve PF and THD at the input to the ballast.

FIGS. 20A, 20B, 20C, 20D, 20D, 20E, 20F, 20G, and 20H depict various schematic of an exemplary single LED driver specifically designed to be able to be power by either a magnetic ballast or directly with the offline AC source $V_s$. Such an implementation has the advantage in that a single product can address both types of power sources. However, this increases complexity as the driver must resolve one or more of the following issues:

a. Achieve acceptable PF and low THD for both types of power sources. Acceptable PF for example may be >0.7, >0.8 or >0.9. Acceptable THD for example may be <50%, <32%, <20%.

b. Prevent damage from a ballast containing ignitors that may fire high voltage pulses.

c. Sense the type of power source to configure both in hardware or software the type of control schemes to accomplish #1 or #2 above.

In FIGS. 20A, 20B, 20C, 20D, 20E, and 20F, a set of dotted lines is used to indicate when the AC offline voltage source 1701 is connected to the driver input connection 1703 and a set of solid lines are used to indicate when the ballast 1702 is connected to the driver input connection 1703. Note, it is not intension to connect both the AC Offline voltage source 1701 and the ballast 1702 simultaneously to the driver 2001 input connection 1703.

Figure 20A:
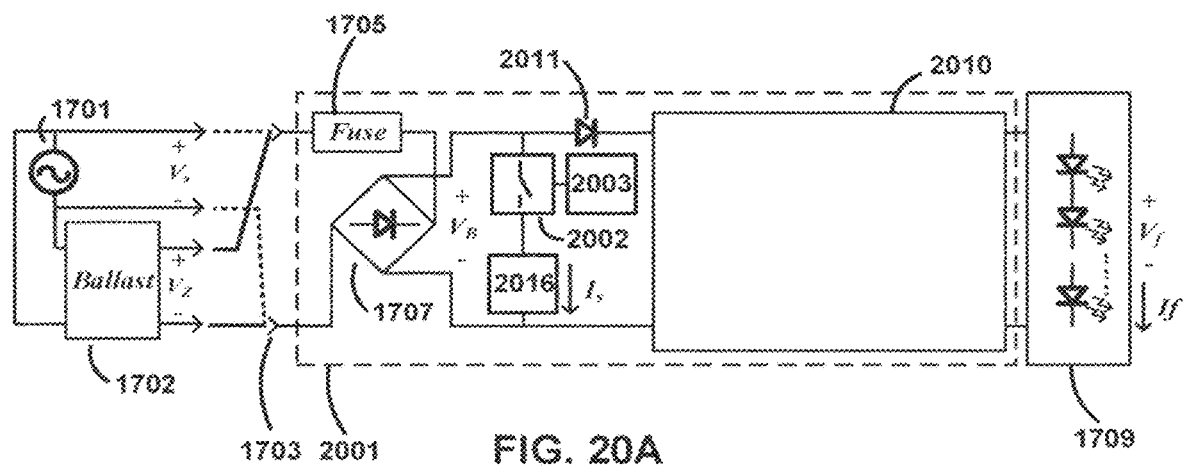
FIGS. 20A, 20B, 20C, 20D, 20E, 20F, 20G, and 20H depict various schematic of an exemplary single LED driver specifically designed to be able to be power by either a magnetic ballast or directly with the offline AC source $V_s$.

In FIG. 20A, the electronic driver 2001 has a switch 2002 that is similar to prior switch 1802, and a controller 2003 that is similar to prior controller 1803 and includes all the control and switching schemes 1920-1970, but this time rather than regulating the current $I_f$ in the LED 2009, the combination of controller 2003 and switch 2002 may be designed to regulate either the voltage or current entering regulator 2010. The regulator 2010 may then be used to regulate the current $I_f$ to LED 2009. A diode 2011 is prevents current from the regulator 2010 flowing backwards through switch 2002. The regulator 2010, for example, can be a switching mode regulator, such as, for example, a buck, boost, buck boost, fly back or combination therefore including multiple switching stages. Alternatively, the current regulator 2010 can be a linear regulator. An optional current sensor 2016 may measure the current going through the switch 2002.

Figure 20B:
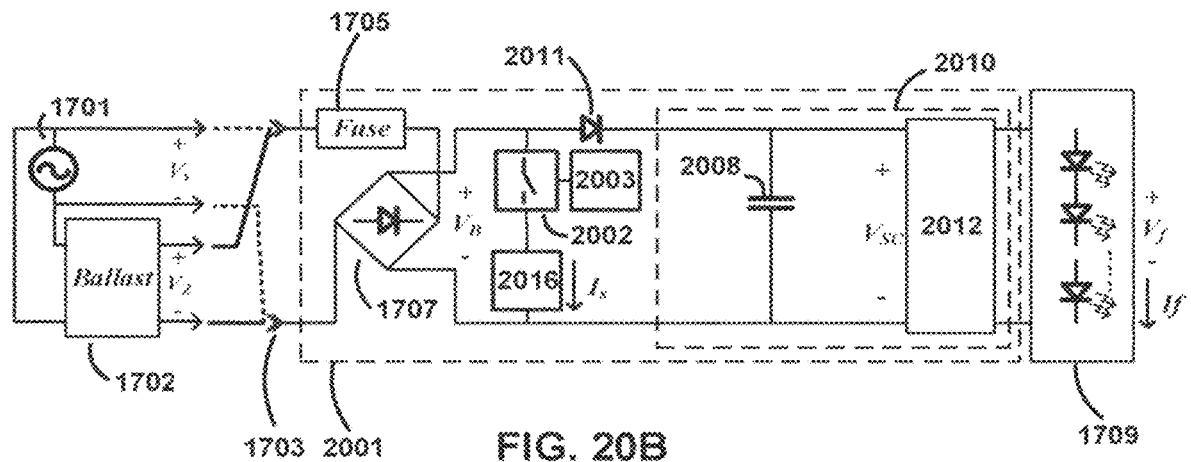

FIG. 20B shows a possible embodiment of FIG. 20A where the regulator 2010 consists of a first stage including a diode 2011, a capacitor 2008 and a second stage regulator 2011. The regulator 2011 has regulated voltage $V_{SC}$ at its input. Controller 2003 regulates voltage $V_{SC}$. By using a two-stage method of 20B, the voltage regulation of $V_{SC}$ need not be very tight. For example, if the regulator 2011 is a buck boost current regulator, the input $V_{SC}$ may vary, for example, either higher or lower than the LED forward voltage $V_f$.

In an embodiment for FIG. 20B, the maximum regulated voltage at $V_B$ should always be less than the ignitor trigger voltage $V_i$, by doing so, the ignitor may be prevented from firing its high voltage pulses. For example, if the controller 2003 senses the bridge output voltage $V_B$ is approaching ignitor trigger voltage $V_i$, then the switch 2002 may be activated to short, for at least a portion of time, in a manner to ensure the $V_B < V_i$. During the portion of time the switch 2113 is activated, the switch 2113 substantially shorts the bridge output voltage $V_B$ to be near 0V which is less than the ignitor trigger voltage.

In some embodiments, the current regulator 2011 is a buck regulator. The voltage $V_{SC}$ across the capacitor 2008 is substantially regulated by the controller 2003 and switch 2002 to be higher than the LED 2009 forward voltage $V_f$ but less then ignitor trigger voltage $V_i$ preventing the ignitor from firing.

In another embodiment of FIG. 20B, the capacitor 2008 is designed to have the necessary capacitance to absorb a sufficient amount of energy from the ignitor pulse to bring down the peak pulse voltage to an acceptable level that do not damage the driver components which is generally below the voltage rating of the components. As an example, we can calculate the necessary capacitance $C_{2008}$ to sufficiently absorb the pulse energy from a M59 ballast ignitor by using the following parameters about the ballast: M59 output winding inductance is about $H_B=1$ Henry or 1H, M59 output short circuit current is about $I_{SC}=4$ A, the maximum voltage at the ballast output is about $V_{Z\_M}=250V$, and the voltage rating of the capacitor 2008 is about $V_R=450V$. Then the necessary capacitance $C_{2008}$ is given by the following formula:

$$C_{2008} \geq \frac{I_{SC}^2 \cdot H_B}{(V_R - V_{Z\_M})^2} \geq \frac{4^2 \cdot 1}{(450-250)^2} \geq 256 \, uF$$

Note the voltage rating of the capacitor 2008 also needs to also be sufficient to accommodate the worst case offline voltage. For example, if offline voltage source has a nominal RMS voltage $V_s=277$ VAC with a maximum 10% over voltage then the voltage rating of the capacitor $V_R$ needs to higher than the peak of this AC line under worse or:

$$V_R \geq 277 \cdot 1.1 \cdot \sqrt{2} \geq 431 V$$

Therefore, a capacitor with a voltage rating of 450V will be suitable for being powered by both an offline voltage source $V_s=277V$ and by a M59 ballast.

In other scenarios, the capacitor 2008 has a capacitance $C_{2008} \geq 100$ uF, $\geq 200$ uF or $\geq 500$ uF with a voltage rating $V_R \geq 200V$, $\geq 450V$ or $\geq 750V$. Such large capacitance values are generally much larger than typically present in EMI filters with capacitance on the order of <10 uF or <1 uF.

One advantage of correctly sizing the capacitor 2008 with sufficient capacitance is it will be able to continuously sustain ignitor pulses, for example in circumstance where controller 2003 or the current regulator 2012 cannot guarantee $V_B<V_i$. Such circumstances may include, if the control circuit is missing, malfunctions, disabled or there is noise, surges in the power line.

In various embodiments, the controller 2003 may be designed to activate the switch 2010 if the rectified bridge 1707 voltage $V_B$ is sensed to be approaching or be above a certain level limit voltage $V_c$, such as, for example, $V_c>200V$, $V_c>250V$, $V_c>300V$. It is desirable the limit voltage $V_c$ is less than the ignitor trigger voltage V, to suppress the ignitor in the ballast from firing. The switch 2002 stays in an activated shunt position until such a time it will not cause the ballast output voltage to rise above the ignitor trigger voltage, $V_i$. For example, an energy storage unit in the regulator 2010, such as the capacitor 2011, may sufficiently drain to a level where the opening of the switch 2008 will cause the charging of the energy storage unit. In such a condition, the charging of the storage unit will result in a relative low impedance in the regulator 2010 resulting in a lower voltage $V_B$ that should be below the ignitor trigger voltage or $V_B<V_i$.

One key issue may be the switch 1705 of FIGS. 20A-20B needs to be deactivated (off) or in a high impedance mode, when the driver 2001 is directly connected to the offline voltage source 1701, otherwise it will short circuit the line voltage and cause the fuse or other components 1705 to exceed their current rating. This can be prevented if the controller 2003 can sense if the driver is connected to ballast 1702 or directly connected to offline voltage source 1701. In some embodiments, this sensing is accomplished by monitoring the current Is, using current sensor 2010. The short circuit current Is will be significantly higher when connected to offline voltage source 1701, $I_s$(offline), than when connected to Ballast, $I_s$(ballast). In other words, $I_s$(offline)>>$I_s$(ballast). For example, the short circuit ballast current $I_s$(ballast) for a M59 ballast $I_{SC}$(ballast) 4A RMS or 7A Peak, whereas, assuming $V_s=120$ VAC and a switch resistance of 5 ohms, the short circuit current of the offline voltage source $I_s$(offline)≈24 A RMS or 32 A peak which is significantly higher than $I_{SC}$(ballast)≈4 A. The sensing should occur within a relatively short time period, for example <0.25 seconds, <0.5 seconds, <1 second, or <2 seconds during the initial power up of the driver to prevent the potential of a short circuit current in switch 2002 from damaging the driver in the case it is connected to offline voltage source 170.

Figure 20C:
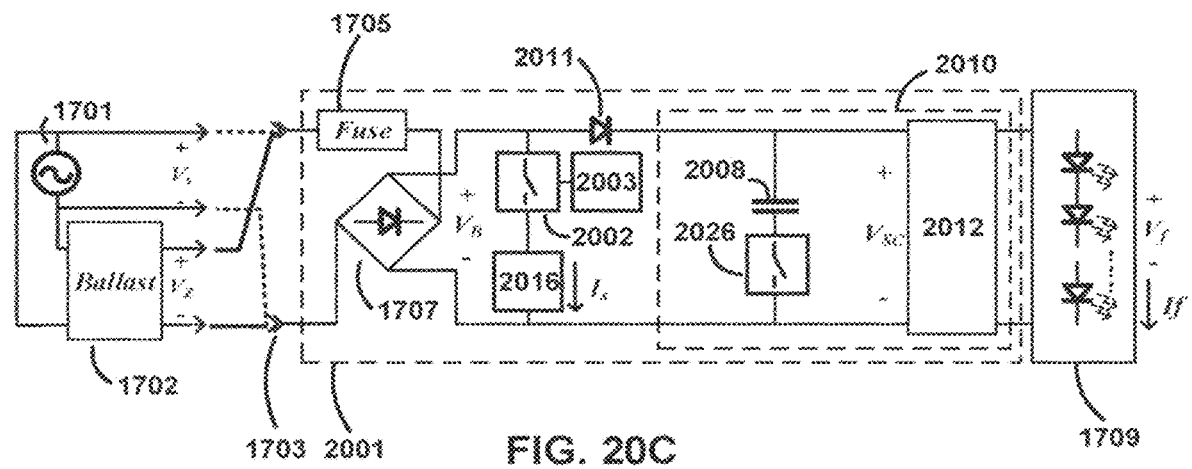

When the electronic driver of FIG. 20B is operated directly from the offline voltage source 1701, the switch 2002 is deactivated and the system is essentially a regulator 2012 with a large capacitor on the front. Generally, such a capacitor on the input side of the driver results in poor PF and poor THD performance. In a further improvement, as depicted in FIG. 20C, the capacitor 2008 has a series switch 2026. The switch 2026 is controlled such that when powered from a ballast 1702, the switch 2016 switches the capacitor in parallel with the regulator 2012. When powered directly from an offline power 1701, the switch 2016 switches out the capacitor to improve PF and THD performance.

Figure 20D:
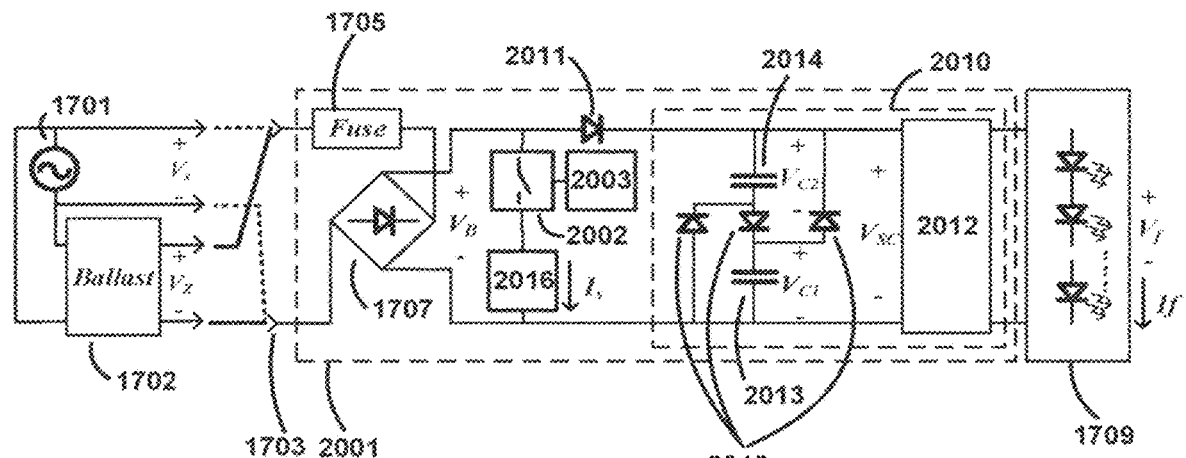

In an alternative embodiment to improve PF and THD, as shown in FIG. 20D, the capacitor 2008 of FIG. 20B is replaced with a Valley Fill capacitor arraignment consisting of capacitors 2014, 2013 and diodes 2015. The advantage of such a system, the switch 2016 may not be required thus reducing complexity. Another advantage may be that total voltage rating for the capacitor 2018 is reduced and split between capacitor 2014 ($V_{C2}$) and 2013 ($V_{C1}$) so each individual capacitor can be of a lower rating. However, the individual capacitance values of the capacitors 2013, 2014 needs to increase such that their combination in series is similar to total required capacitance of the capacitor 2008.

Figure 20E:
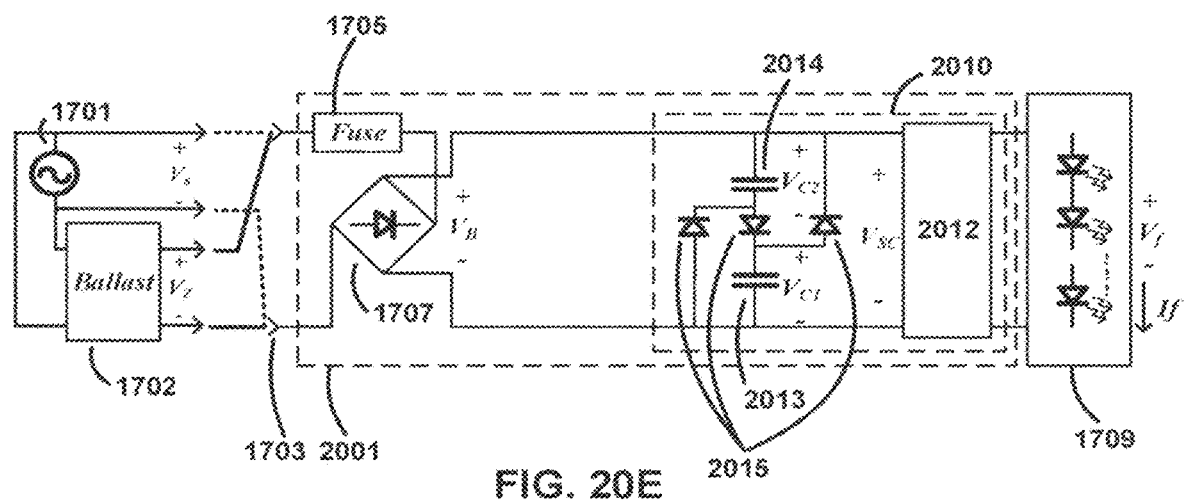

In an alternative embodiment, as shown in FIG. 20E, the switching associated components 2002, 2003, 2010 are intentionally removed such that the system is a regulator 2012 with a valley fill circuit front end. The advantage of such a system may be reduced complexity as no switching (outside of regulator 2012) may be needed and the system does not need to sense if it is powered by a ballast or powered directly to offline voltage source. The disadvantage may be without the switch 2002 to shunt the power, the PF and THD of the system will likely suffer.

Figure 20F:
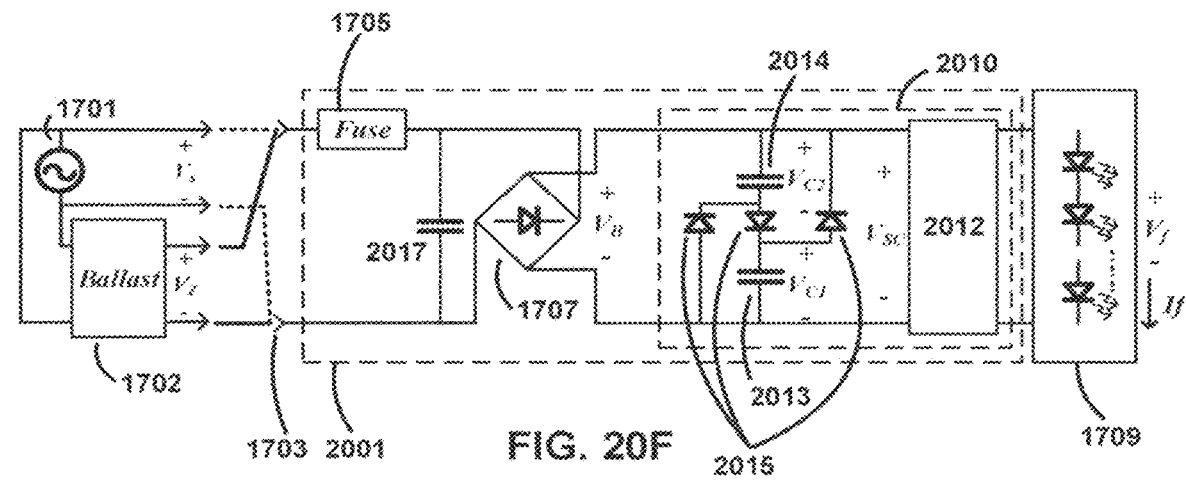

FIG. 20F shows an improvement to 20E, where the capacitor 2017 is placed in front of bridge. The benefits of the capacitor 2017 include improved THD, PF when operating with a ballast, and a reduced peak from the ballast. The capacitor 2017 is similar in specification and performs the same function as already described for the capacitor 1706. For example, the capacitor 2017 needs to be bipolar, such as a film type capacitor, and serves as a partial shunt that diverts some of the output power and current from the ballast 1702 back into the ballast 1702 instead of to the components after the bridge.

Figure 20G:
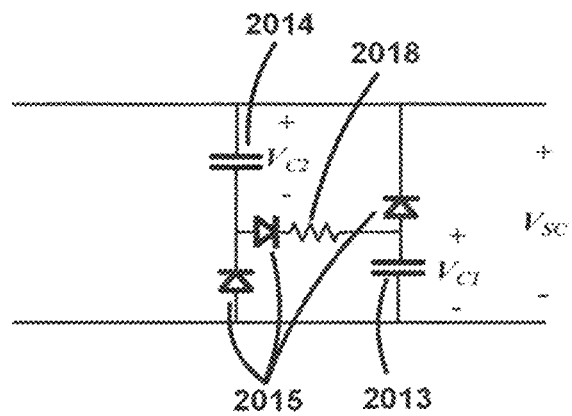
Figure 20H:
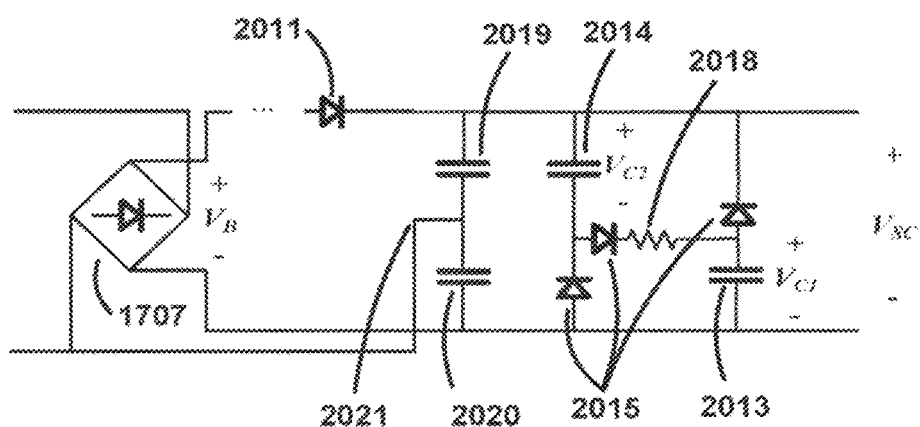

The valley fill circuitry shown in FIGS. 20D-20F, and elsewhere referenced, in this document can be modified further to improve THD and PF by using the modifications shown in FIGS. 20G-20H. A resistor 2018 may be added to the Valley Fill Circuitry. FIG. 20H shows a further improvement of a version of a Valley Fill Circuitry where two additional capacitors 2019-2020 are added with a center tap 2021 that is connected to the input side of the bridge. The capacitors 2019-2020 may maintain current flow during a longer portion of the voltage cross over and thereby improve PF and THD. To fill in the cross over point requires only a very small amount of power so the capacitance value of the capacitors 2019-2020 may be of a magnitude smaller than the capacitors 2013-2014. A resistor 2022 in series with the capacitor 2013 may be added to reduce current spike. Such a circuit may be capable of PF>0.9 and THD<20%.

The function of the Valley Fill circuitry, previously described, to be capable of at least one or more of the following functions:
  a. Sized with sufficient capacitance and voltage rating to absorb the pulses from an ignitor when operated from a ballast, such as ballast 1702.
  b. Sized with sufficient capacitance to smooth out the voltage $V_{SC}$ to the current regulator 2012.
  c. Improve PF and THD operation when operated directly from an offline AC voltage source 1701.

The following summarizes the embodiments of FIGS. 20A-20H. A LED driver that may be powered by least two different external power sources, the first power source being a ballast and the second power source being an AC voltage source. The LED driver including a bridge rectifier, the input of the bridge connected to the external power source, the output of the bridge connected in parallel to a switch, and also in parallel with a regulator. A regulator may be designed to regulate the current to one or more LEDs.

In some embodiments, the sensing the presence of either the ballast or the AC voltage source occurs with a predetermined length of time after the power up of the system. A sensor detects the presence of either the ballast or the AC voltage source. The sensing occurs during the power up of the system. The switch may be deactivated or in a high impedance mode when AC voltage source is detected. If a ballast is detected, the switch periodically activates according a predetermined scheme to regulate the current or the voltage going into the current regulator.

In various embodiments, at least one equivalent capacitor may be connected in parallel with the bridge output. The capacitor may be of sufficient capacitance to absorb the pulses from an ignitor such that the resulting pulse voltage is reduced <500V. The equivalent capacitor may be arranged in a Valley Fill circuit arrangement. In some embodiments, the switch and its associated circuitry may be removed.

The driver 2001 of FIGS. 20A-20H may include further elements, not shown, such as EMI filters, PF correction or THD correction circuitry. For example, a simple EMI filter includes a PI filter having 2 capacitors arranged in parallel to bridge output with either one or both sides of the capacitor connected by one or more inductors. The EMI filter can be placed before and after the bridge rectifier.

FIGS. 21A, 21B, 21C, 21D, and 21E depict various schematics of an exemplary electronic LED driver designed to be powered by a ballast or to be powered directly with the offline AC source. In the prior implementations of FIGS. 20A-20D, the switch 2002 may be designed to deactivate or be in a high impedance when connected directly to the offline AC source 1701 so that the regulation of the LED current $I_f$ is taken over by current regulator 2010, whereas in FIGS. 21A-21D, the switch 2112 in combination with the controller 2113 is implemented to regulate the LED current when powered by ballast 1702 or powered directly by the offline AC source 1701. As such, the switch 2112 may not be deactivated when powered to offline AC source 1701.

Figure 21A:
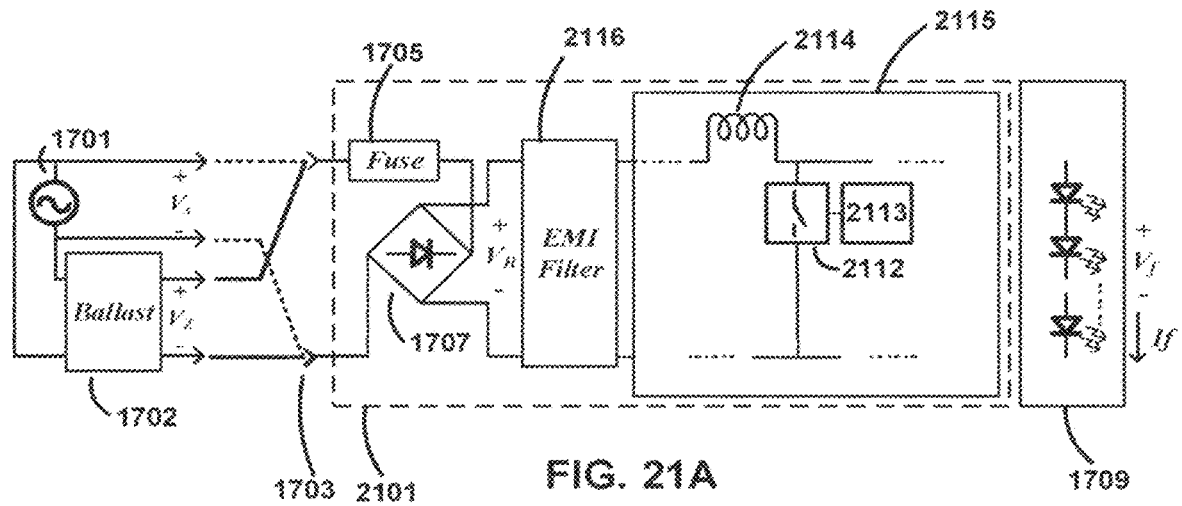
FIGS. 21A, 21B, 21C, 21D, and 21E depict various schematics of an exemplary electronic LED driver designed to be powered by a ballast or to be powered directly with the offline AC source.

FIG. 21A depicts the LED driver 2101 having a switch mode regulator 2115, the bridge 1707, optional temperature and/or the current fuse 1705, a EMI filter 2114. The EMI filter 2114 can be placed after the bridge as shown or before the bridge, or both. The switch mode regulator 2115 regulates the forward current, $I_f$ to LED 1709. The switch mode regulator 2115 includes at least one equivalent inductor 2114 and a switch 2112 controlled by controller 2113. The switch 2112 and the inductor 2114 are connected in such a method that, at low frequency (e.g., DC to 240 Hz), will substantially shunt or short current from the one side of the bridge back to the return side of the bridge. This is necessary in the case of being powered by a ballast and is an example of switching mode topologies (e.g., Boost, Buck-Boost, SEPIC, CUK, Flyback, Forward, Push-Pull, half bridge, resonant LLC) that will shunt the output of the bridge at low frequencies. However, a boost topology will not accomplish this. The combination of the inductor 2114, the switch 2112 and the controller 2113 substantially regulate the current $I_f$ to the LED 1709. In some embodiments, there may be at least two distinct schemes to control the switch 2112. A first scheme when powered with a ballast 1702 and a second when directly power with the offline AC source 170. In various embodiments, there may be a third switching scheme during initial power up of the system. The third switch scheme may be used to achieve at least two functions: The first function may be to detect if the power source may be the ballast 1702 or an offline AC voltage source 1701, and the second function may be to ensure there is not an over current short circuit situation when hooked to the offline AC voltage source 1701 or alternatively an overvoltage situation when powered by ballast 1702. For example, when the system powers up, the system connects to an offline AC voltage source 1701 and switches at a relatively high frequency, for example a switch scheme with substantial frequency content >10 KHz where the inductor 2114 at the frequency content is specified at a value that has non-negligible impedance and served to limit the maximum current. As such, a short circuit current may be prevented, as would be the case with a low frequency switching scheme that would short circuit and damage the system. However, if the detected current, either through the switch 2112 or the controller 2113, is not as would be expected from an offline AC voltage source 1701 then the controller will change the switching scheme to that used for a ballast, such as, for example, a switching scheme with substantial frequency content <10 KHz or <1 KHz or <240 Hz. The lower frequency may be necessary as the ballast output winding will have an impedance value significantly higher than the inductor 2114, for example >10x. As such, the inductor 2114 becomes negligible and the switching frequency content necessary to function with the ballast may be substantially lower, for example, 10x lower than the case with the offline voltage source 1701. The switching scheme both for high and low frequency include those already described in FIG. 19, such as those intended to improve PF and THD.

The EMI filter 2114 includes at least one of the following two functions: a first function of filtering out EMI and EMC noise from a regulator and a second function absorbing the pulses from the ignitor in the ballast such the resulting pulse are at an acceptable value. A portion of the EMI filter may compose of a Valley Fill circuitry.

Figure 21B:
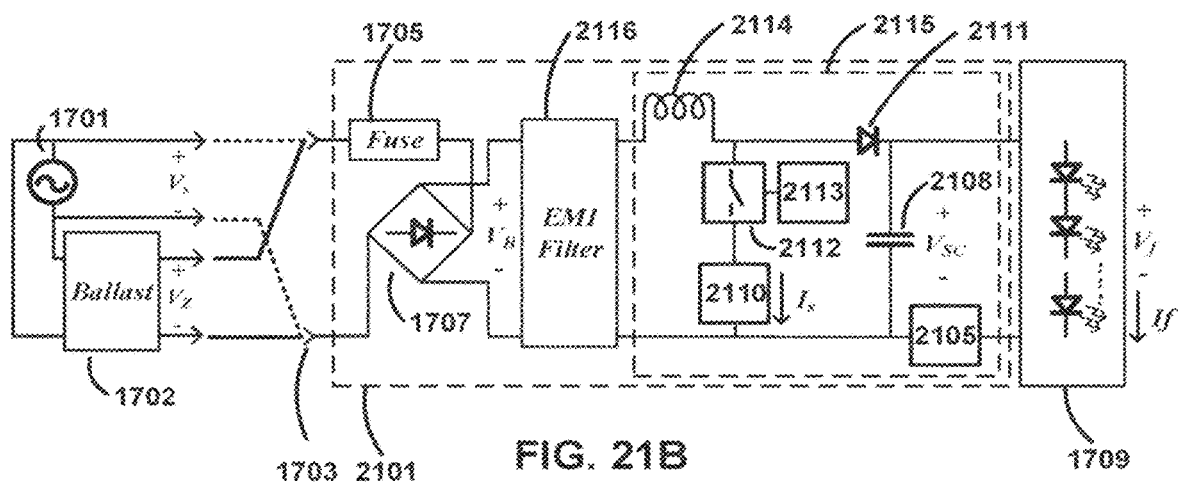

In FIG. 21B, the regulator 2115 is configured in the form similar to a boost converter where the inductor 2114 is connected before the switch 2112. When the controller 2113 senses the electronic driver is directly powered by an offline AC source 1701, it switches the switch 2112 to a high frequency as would be expected in a switching mode power supply, for example >10 kHz. The entire unit performs as a boost converter where the inductor 2114 has non-negligible impedance. However, when the controller 2113 senses it is connected to the ballast 1703, the controller 2113 switches at a much lower frequency, for example <10 KHz, <1 KHz, <240 Hz or for example, at 120 Hz. At this lower frequency, the inductor 2114 is of substantially negligible impedance and the system sustainably operates the same as depicted in FIG. 18. When operating in a boost converter mode the LED voltage must always be higher than the peak voltage of input offline AC source 1701. In the event where the offline voltage source 1701 is $V_S=277$ VAC, the peak voltage is 391V so the LED string must be greater than the voltage which would require many LEDs to be string together. Another issue may be the higher voltage has more stringent component and safety requirement.

Figure 21C:
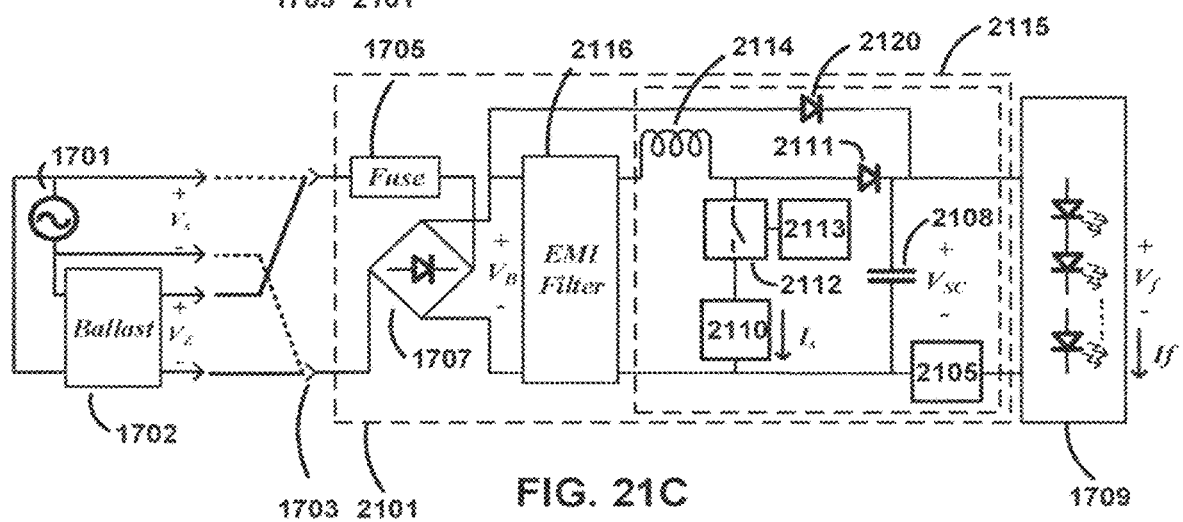

FIG. 21C shows an improvement to FIG. 21B where diode 2120 is added to connect the output of the bridge 1707 to the capacitor 2108 so that in the event that a pulse is generated by the ballast 1702, the diode 2111 conducts this energy to the capacitor 2108 to at least partially absorb the energy to an acceptable level. The calculation for the necessary capacitance for the capacitor 2108 is the same as previously described with reference to FIG. 20B. One advantage of this arrangement may be that the capacitor 2108 is after the switch 2112 and the inductor 2114, rather than directly at the input as in case of FIGS. 20B-20F, and the switch 2112 in combination with the inductor 2114 can be configured to switch in such a manner to optimize for PF.

Figure 21D:
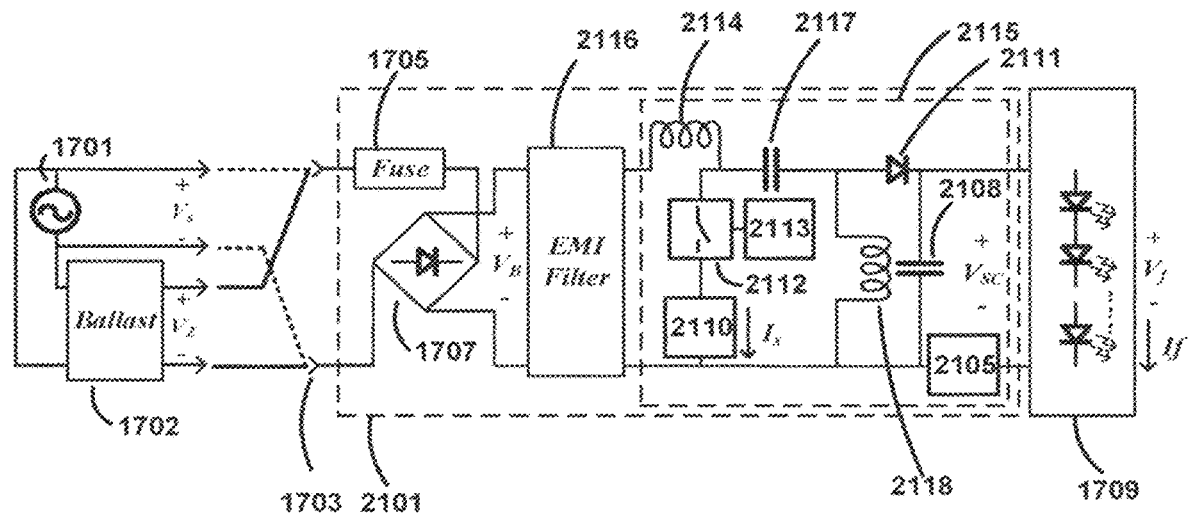
Figure 21E:
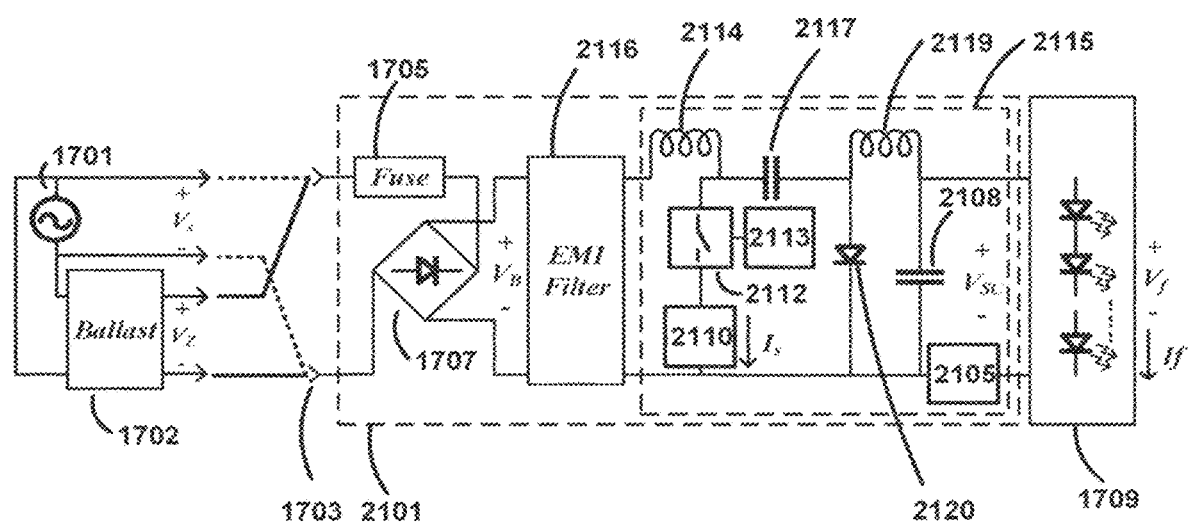

FIG. 21D shows the implementation of the regulator 2115 in the form of a SEPIC with addition of the capacitor 2117 and the inductor 2118. FIG. 21E shows the implementation of the regulator 2115 in the form of a CUK converter with addition of the capacitor 2117, the inductor 2119, and the diode 2111 removed and replaced with diode 2120 in a new position.

Figure 22:
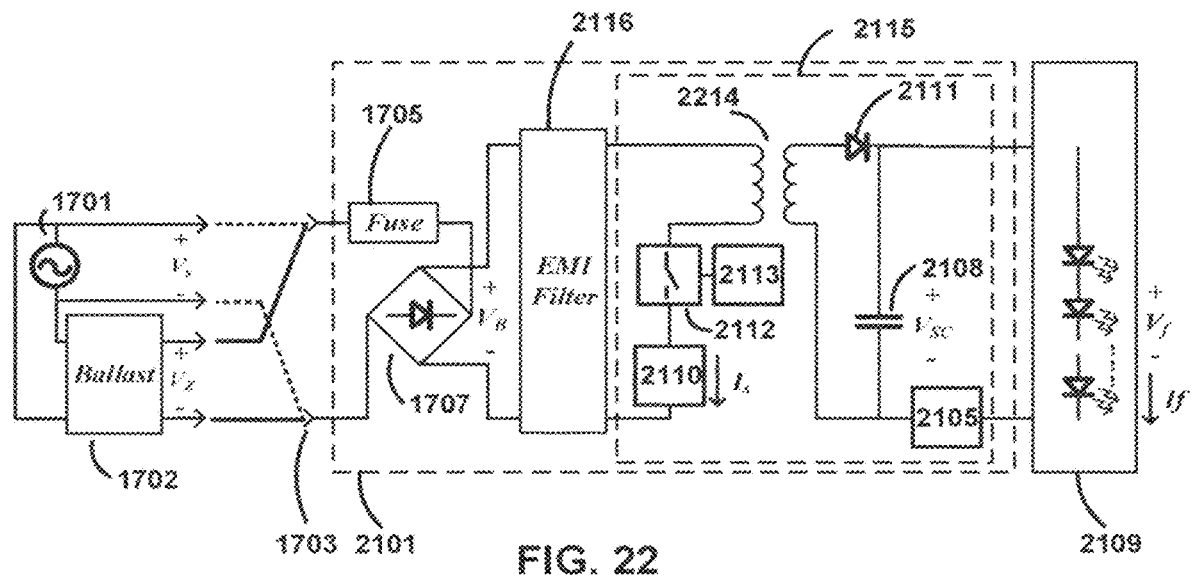
FIG. 22 depicts a schematic of an exemplary electronic LED driver using a fly back topology designed to be powered by a ballast or to be powered directly with the offline AC source.

In FIG. 22, the electronic driver 2101 is configured in the form similar to a fly back converter with the addition of the transformer 2214. The switch 2112 is connected in series with the input winding of the transformer 2214 and connects the transformer output winding to return or ground. The transformer input winding serves a dual function as the inductor 2114 as described previously. When the controller 2113 senses the electronic driver 2101 is directly connected with the offline AC source 1701, it switches the switch 2212 at higher frequency as would be expected in a switching mode power supply, for example >10 kHz. The entire unit performs as fly back converter where the transformer 2214 has non-negligible impedance. However, when the controller 2113 senses to the ballast 1703, the controller 2113 switches at a much lower frequency, for example <10 KHz, <1 KHz, <240 Hz or, for example, at 120 Hz. At this lower frequency, the inductor 2114 may be of a substantially negligible impedance and the system sustainably operates the same as FIG. 18.

In a further embodiment to FIGS. 21A-21E, when connected to a ballast, the controller 2113 controls the switch 2112 in a combination of at least two substantially different frequency content, a higher frequency component 2330, 2332 and a lower frequency component 2331. The lower frequency component 2331 may be sufficient to shunt a portion of the power and current from the ballast back into the ballast thereby bypassing the LED. The lower frequency component 2331, for example, <10 KHz, <1 KHz or at 120 Hz, being such that a lower frequency than the impedance of the inductor 2114, or the equivalent inductor of the first winding of the transformer 2214, may be negligible. The higher frequency component 2330, 2332 is sufficient to effectively transfer power to the LED through the transformer 2214 or the inductor 2114. The higher frequency for example may be >10 kHz. In some embodiments, the controller 2113 ensures the output voltage of the ballast 1703 or that the bridge voltage $V_B$ is always below the voltage that triggers the ignitor in the ballast, for example, <200V, <250V, <300V.

Figure 23:
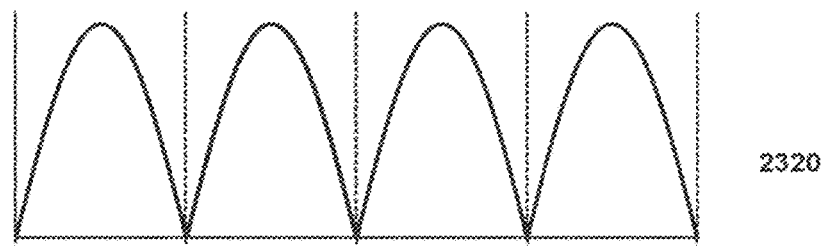
FIG. 23 depicts possible methods by which a controller unit controls a switch with at least two frequency components.
Figure 23:
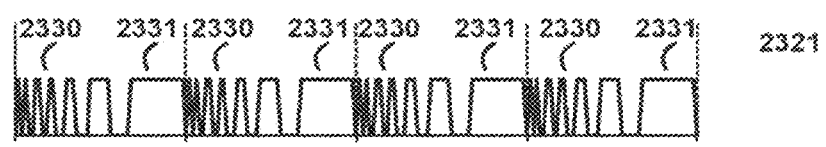
Figure 23:
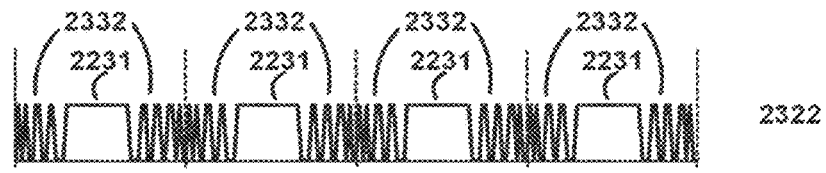

The trace 2320, as depicted in FIG. 23, shows the equivalent rectified offline voltage source 1701 $V_s$ or the rectified ballast output voltage $V_z$. Note the rectified bridge voltage $V_B$, will have the same periodicity the line voltage $V_s$, but may be of a different and non-sinusoidal shape due to distortion from ballast. Nevertheless, the bridge voltage $V_B$ may be used to sense the periodicity of the offline voltage $V_s$. The schemes 2321-2322 are examples of how the controller 2113 may be used to control the switch 2112 in the presence of a ballast 1702. Both schemes 2321-2322 have at least two distant frequency components, a lower frequency component 2231 intended to shunt the power and current from the ballast, and a higher frequency component 2231 intended to transfer power across the transformer 2214 or the inductor 2114.

FIG. 22 depicts a preferred implementation of an electronic driver that is both compatible with an offline voltage source 1701 and with a ballast 1702. A fly back topology provides isolation and a flexible LED forward voltage may not be dependent on the source voltage at the input to the driver.

The following summarizes the illustrations depicted in FIGS. 21A-21E and FIGS. 22-23. A LED driver that can be powered by least two different external power sources, a first external power source being a ballast and a second power source being an AC voltage source. The LED driver includes a bridge rectifier, the input of the bridge connected to the external power source, the output of the bridge connected switch in series with an inductor. A sensing mechanism that detects the presence of either the ballast or the AC voltage source. The sensing occurs during the power up of the system. A switch may be activated by at least two different switching patterns, a first switching pattern when powered by a ballast and a second switching pattern when powered by an AC voltage source. The switch activation pattern shorts the inductor to the bridge return and may be designed to regulate the current into the LED for both power sources. The first switching pattern to have a lower frequency content than content than the second switching pattern.

Figure 24A:
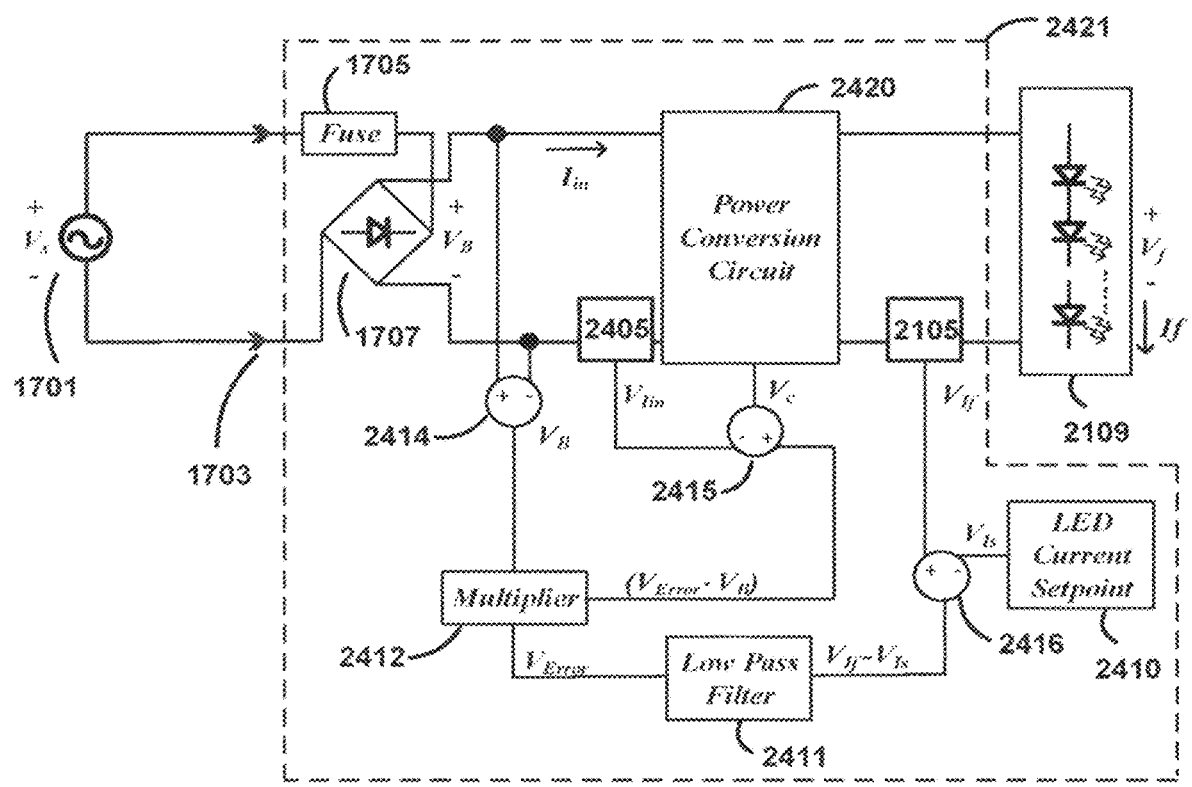
FIGS. 24A and 24B depict control scheme schematics that allow for improved power factor and harmonic distortion.

FIG. 24A depicts a control arrangement for an LED driver 2421 that incorporates power factor correction. The power conversion circuit 2420 is constructed such that its input current $I_{in}$ is forced to be substantially proportional to the signal $V_c$. In this case the signal $V_c$ is created by the multiplication between the rectified voltage $V_B$ and the error signal $V_{Error}$ or $V_c=(V_B \cdot V_{Error})$ or $I_{in}\alpha$ $(V_B \cdot V_{Error})$. The equivalent resistance RD the driver presents to the AC source 1701 is $R_D$ $\alpha V_B/I_{in}$ which simplifies to $R_D \alpha 1/V_{Error}$. The $V_{Error}$ signal can be kept to a relatively constant average value by filtering its frequency content with a low pass filter 2411 such that it changes at a rate that is much lower than the AC input frequency (bandwidth of the filter 2411<60 Hz/10 for example). If $V_{Error}$ is kept relatively constant, then the equivalent resistance RD will also be relatively constant. The output current feedback 2116 adjusts the $V_{Error}$ Signal to keep the LED string current $I_f$ at a constant value as set by the LED current set point 2410 or $V_{IS}$. Some other components in the system include 2414 a sensor detect the rectified line voltage, a multiplier 2412, an input current sensor 2405 and a LED current sensor 2105. The power conversion circuit may have energy storage components such capacitors that is used to store input current $I_{in}$ for a portion of the AC line voltage cycle, then later releasing the stored energy to the LED in another portion of the AC line voltage cycle. The power conversion circuit may be capable to present very high impedances similar to an open circuit or very low impedance such a short circuit.

Figure 24B:
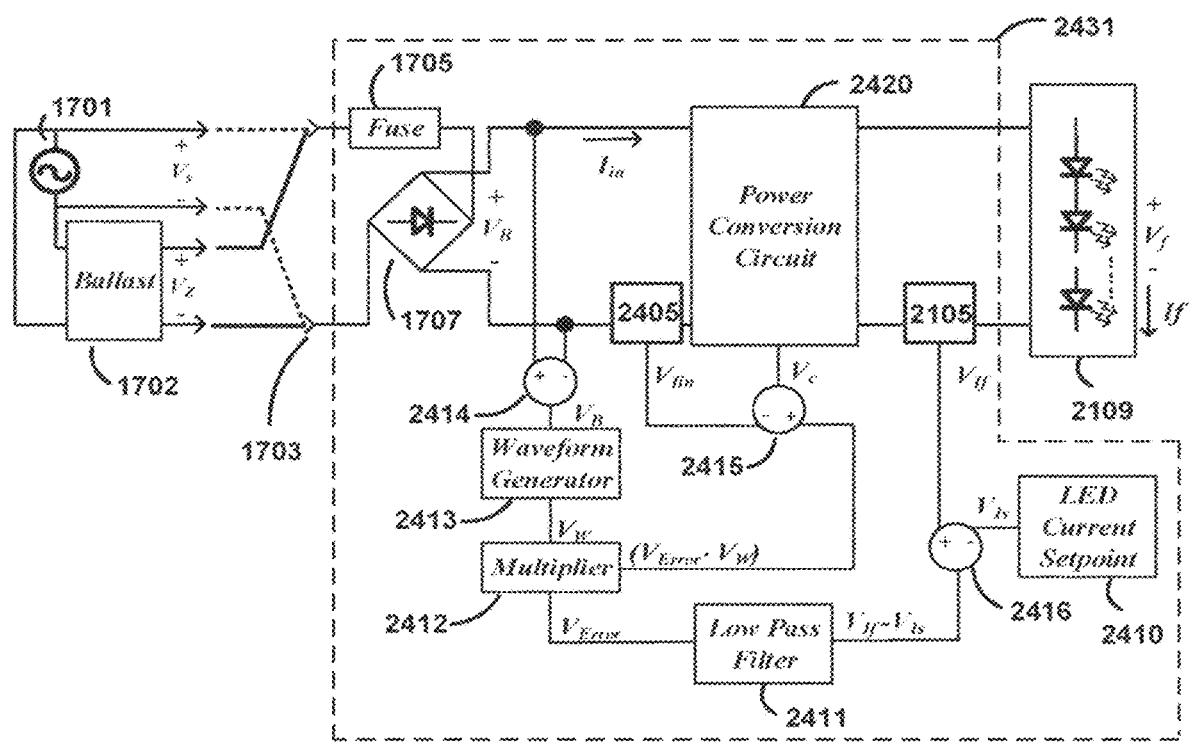

In FIG. 24B the inclusion of a waveform generator 2413 is used affect the signal $V_c$. In such an arrangement, the control arrangement becomes capable of presenting real and reactive and non-linear impedances to at the electronic driver 2431 input 1703. For example, the input current $I_{in}$, may be shifted in phase with respect to the input voltage $V_B$, making the driver appear as a parallel combination of capacitance or inductance and resistance to the ballast. The waveform generator can also generate harmonics of the power line frequency resulting in a nonlinear load. This allows the input current to be any wave shape by summing the correct harmonics components. This may be advantageous when the electronic driver 2431 is connected to a ballast as the ability to present an inductive, capacitor or nonlinear to load may be used to improve power factor or THD at the input to the ballast. To further improve PF and THD, the impedance, linear and/or nonlinear need not be constant but change within a half cycle of the line frequency. The higher harmonic nonlinear load presented to the ballast may be necessary to cancel out the harmonic distortion created by the ballast which may not be possible purely linear reactive, capacitive or resistive impedances.

The control scheme described for driver 2431 may be implemented using topologies similar to electronic driver 2001 or 2101 where the power conversion circuit composes of at least a switch similar in function as switch 2002 or 2112 and where the waveform generator 2413 may result in power conversion circuit 2420 to switch with waveforms similar to FIG. 19.

The optimal current wave shape or non-linear impedance to optimize the input power factor and distortion of the ballast may be set by the waveform generator. If the waveform generator is configured to provide the input voltage or a scalar multiple of the input voltage to the multiplier the control arrangement of FIG. 24B, it then may become functionally equivalent to the control arrangement of FIG. 24A. This arrangement can therefore be configured to operate from a ballast or directly from the AC line.

Figure 25:
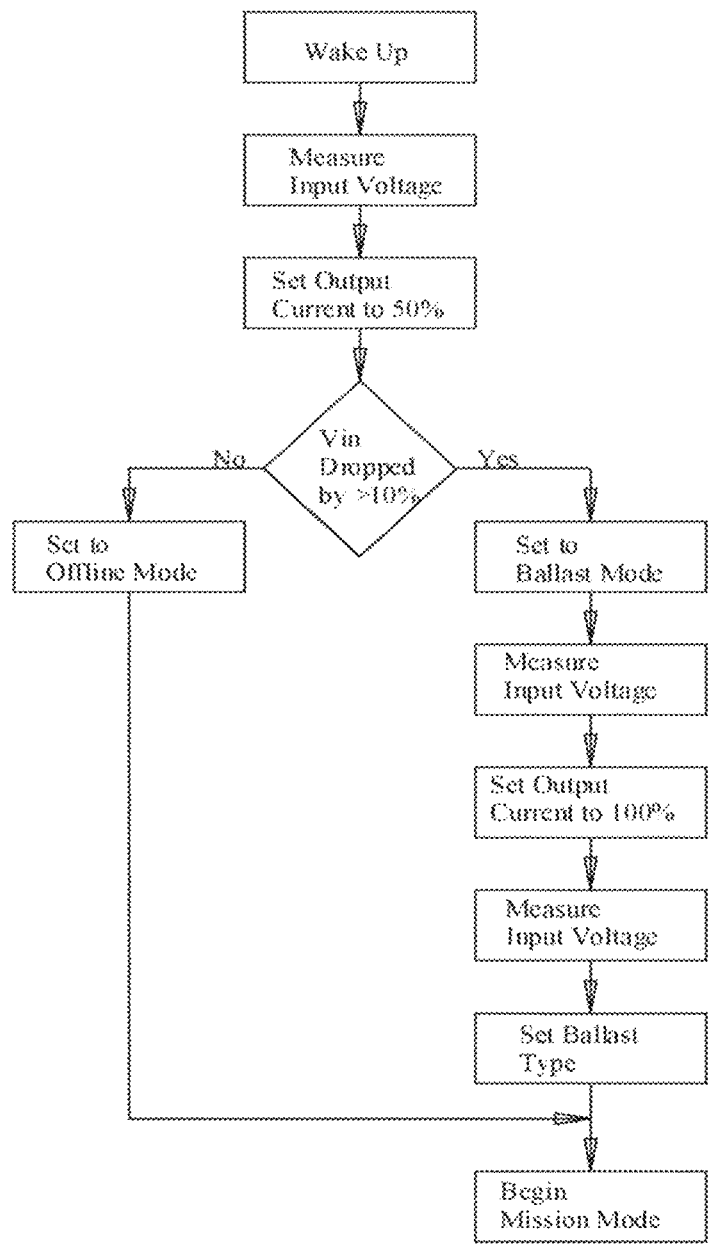

FIG. 25 shows a process for selecting the operational mode of the driver and for configuring the control circuit for optimal ballast input power factor and harmonic distortion for multiple ballast types. When the driver first wakes up after application of input power it begins by testing the input impedance of the AC source to determine if it connected to the AC grid (low impedance) or to a ballast (high impedance). If input power is determined to be provided by a ballast the configuration is set for a typical ballast. Further testing of the ballast impedance is then done to determine which ballast type is present. The ballast type is then used to set the specific transfer function for optimal power factor and distortion at the ballast input.

Electronic Accessory

In one embodiment of the LED system, there is an Electronic Accessory located in the front center portion of the LED system, an optimum location for the Electronic Accessory as:

a. This is at airflow inlet thereby experiencing the coolest air.

b. The front surface generally has unobstructed view of the area of interest which is useful if the electronic accessory is, for example, a visible or infrared camera. The front also allows unobstructed emitting and receiving of wireless signals, for example, radio frequency such as WiFi, Bluetooth, Z-Wave, Thread, Zibgee or other wireless signals. The front surface is also particularly advantageous for unobstructed optical communication signals such as LiFi to and from the lighting system.

c. The center location allows for an optical accessory with a center opening to be easily placed over the electronic accessory and rotate around the accessory without interference.

In some embodiments, the electronic accessory has electrical connections to draw power from the main lighting unit including 12V, 5V or 3.3V. Another set of electrical connections may send a dimming signal, for example 0-10V, PWM back to dim the main LED system. There may also be data communication lines using protocols such as SPL, I2C, SPI in order for the electronic accessory to communicate with the main lamp assembly. The electronic accessory further has wireless communication capabilities to receive data to dim the light. The wireless unit may also emit data signals to communicate with other lighting system as well to a control unit.

In other embodiments, the electronics accessory may also contain one more sensors such as day light sensors, occupancy, temperature, GPS location, world clock, altitude, humidity, vibration, acceleration.

A further embodiment of the GPS may include high sensitivity or ultra-sensitivity that allows for an accurate location within buildings. A GPS sensor may be highly advantageous in combination with wireless communication as it allows the LED system to report back its position. This may be highly advantageous for occasions such as in initial setup or commissioning of the systems where the location of the lamps is needed, for example, identifying certain lamps controlled within which zones. This may be also paired with other remote sensors in addition to an optional GPS sensor to more easily determine for which sensors control which lights and within which zones. Without GPS, the location of every sensor and led system must be manually recorded during the initial installation and marked onto some floor plan. With the proposed GPS sensor, both the lighting locations and or other optional sensors can be automatically generated.

In some embodiments, the electronics accessory may contain one or more display lights. Such display lights may communicate some information, such as, for example, need for maintenance, replacement, fault condition, availability of a parking spot, location of an item in a warehouse etc.

In various embodiments, the electronics accessory may contain one or more audio elements, such as, for example, speakers, microphones, or buzzers. Such audio elements may be useful, for example, in a public announcement (PA) system.

In some embodiments, the electronic accessory may be stackable so that additional electronic functions may be added. In such a stacked arrangement, it may be advantageous that the electrical interconnections are arranged so they also be easily stacked like a LEGO block.

LED System and Driver Assembly

Figure 26A:
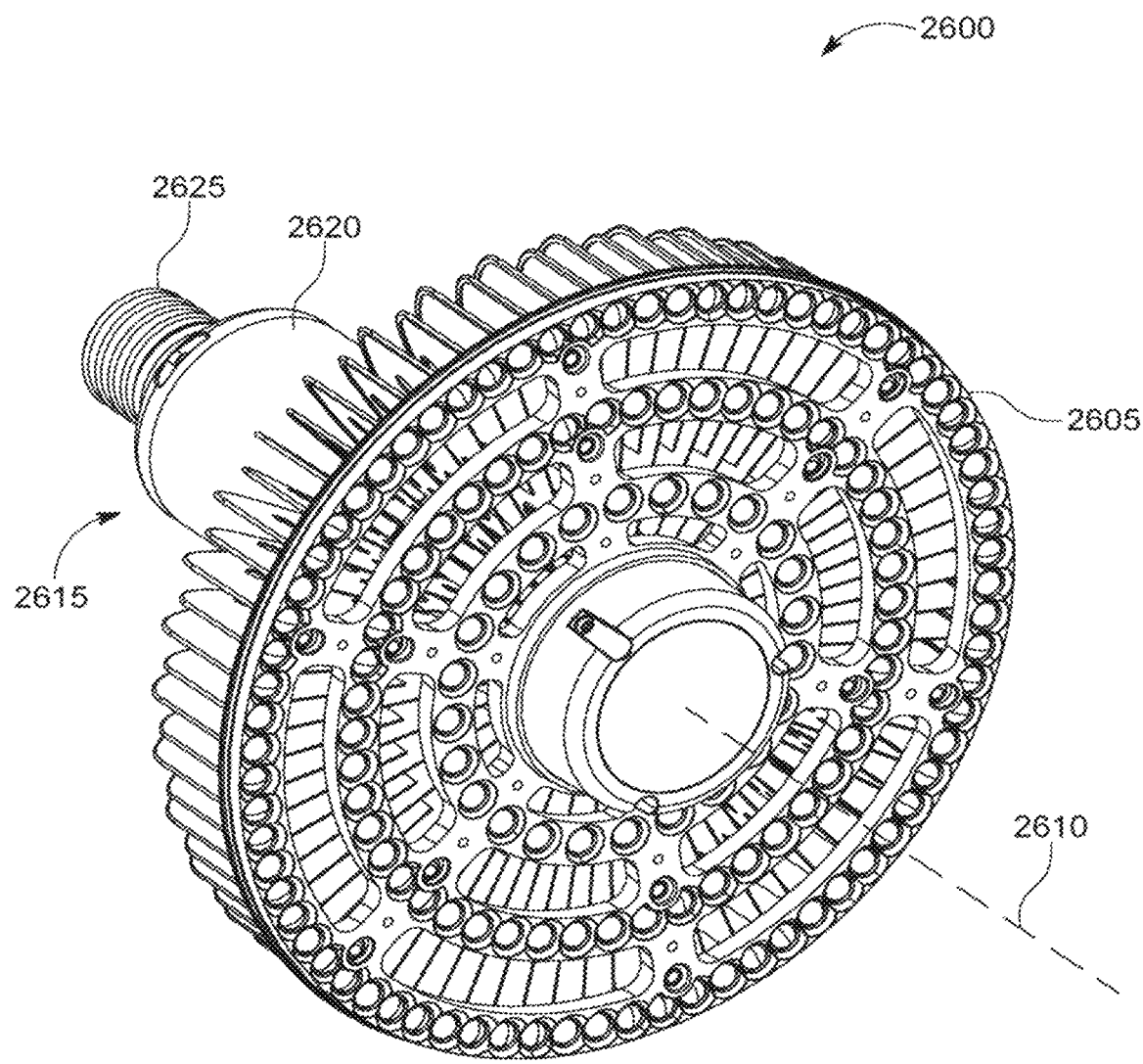
FIG. 26A depicts a front perspective view of an exemplary LED system.

FIG. 26A depicts a front perspective view of an exemplary LED system. An LED system 2600 includes at a first proximal end an LED support structure 2605. The LED support structure 2605 is generally circular in shape, exhibits rotational symmetry about a longitudinal axis 2610 of the LED system 2600, and includes a plurality of LEDs located on a front surface of the LED support structure 2605. The LED system further includes a driver assembly 2615. The driver assembly 2615 includes an enclosure 2620 that houses various components of the driver assembly 2615. As shown in this exemplary depiction, the enclosure 2620 extends along the longitudinal axis 2610 and is generally tubular/cylindrical in shape. The enclosure 2620 may be exposed to ambient air surrounding the LED system 2600, such that enclosure 2620 may serve as a heatsink to dissipate heat generated within the enclosure 2620 to the ambient air. At a proximal end, the driver assembly 2615 is fixedly coupled to the LED support structure 2605. At a distal end, the driver assembly 2615 is fixedly coupled to a threaded end 2625. The threaded end 2625 is configured to couple to a current source that provides operating power to the driver assembly 2615 and to the LEDs of the LED support structure 2605. The threaded end 2625 may securely support the LED system 2600 within an electrical source unit (e.g., a lamp or a light fitting).

Figure 26B:
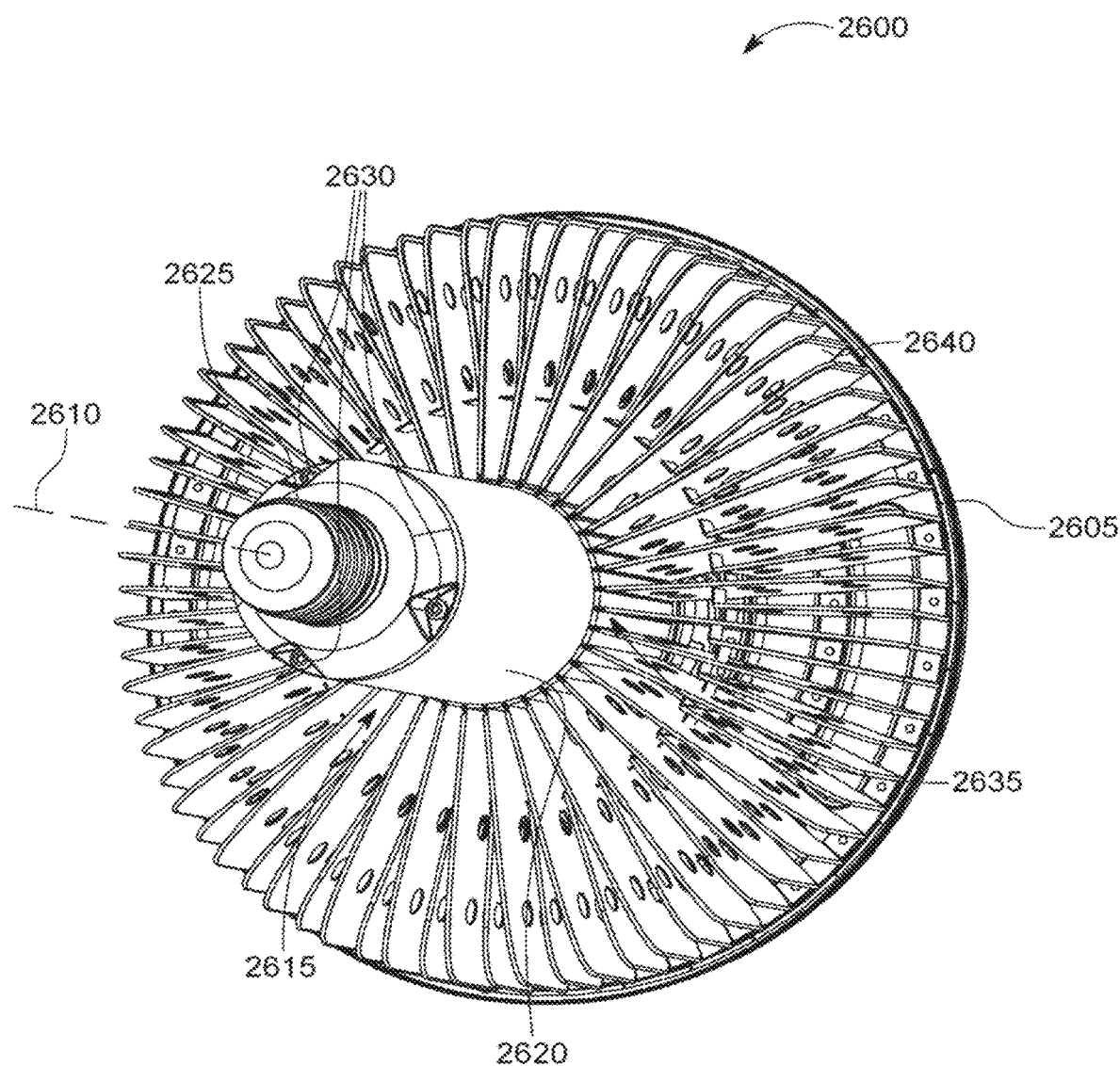
FIG. 26B depicts a back perspective view of an exemplary LED system.
Figure 26C:
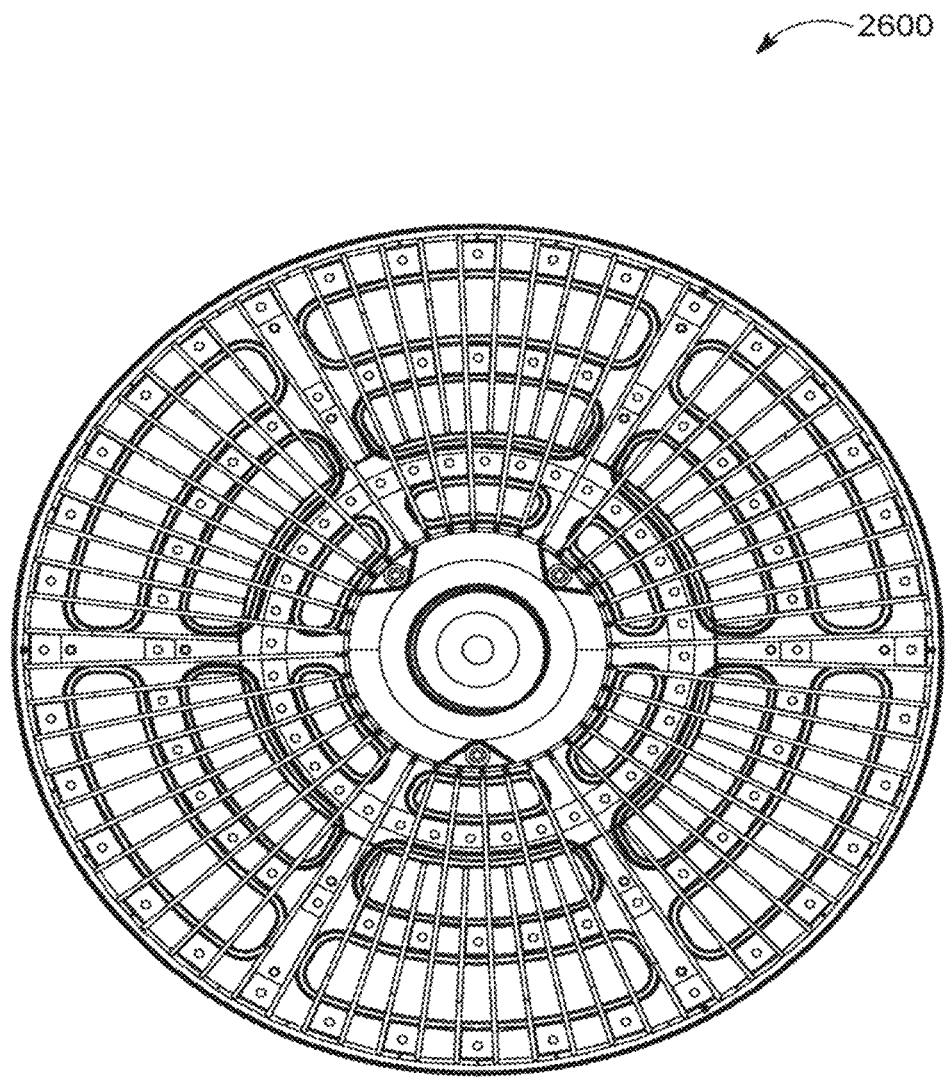
FIG. 26C depicts a back elevational view of an exemplary LED system.
Figure 26D:
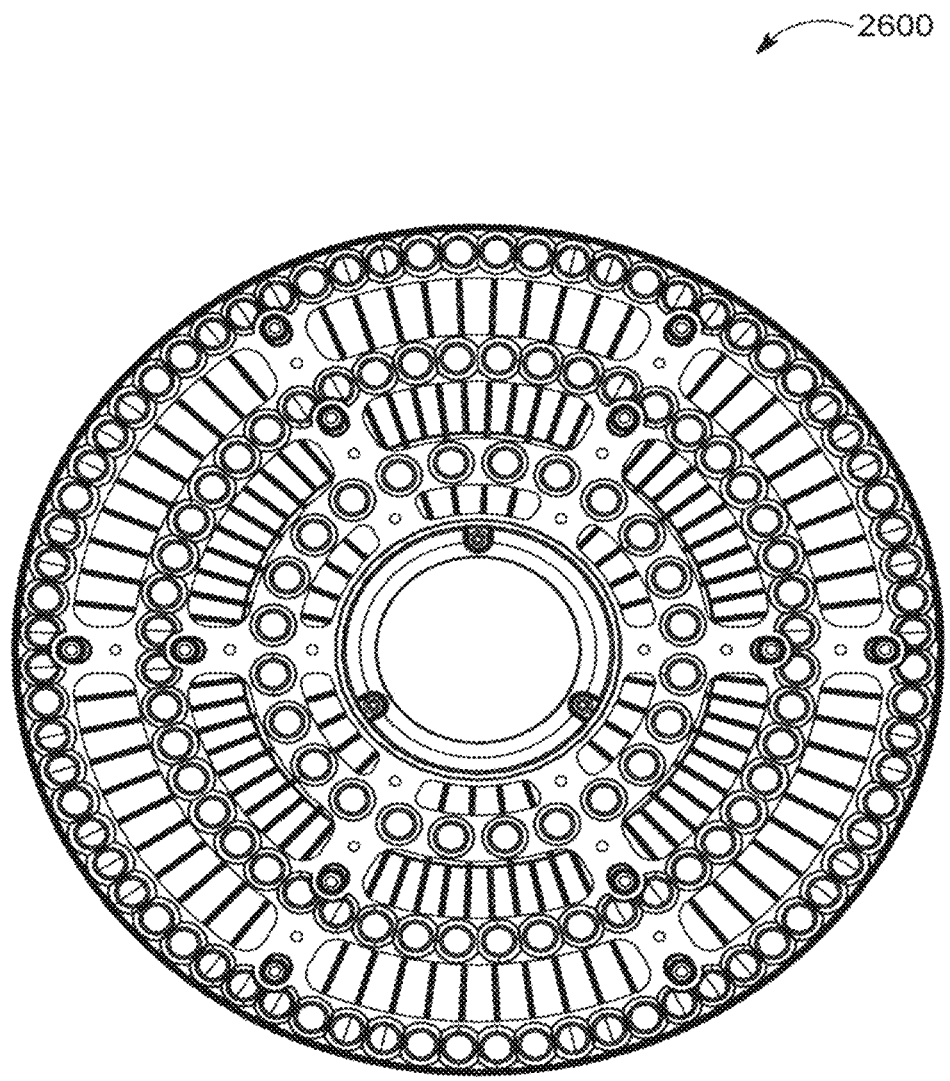
FIG. 26D depicts a front elevational view of an exemplary LED system.
Figure 26E:
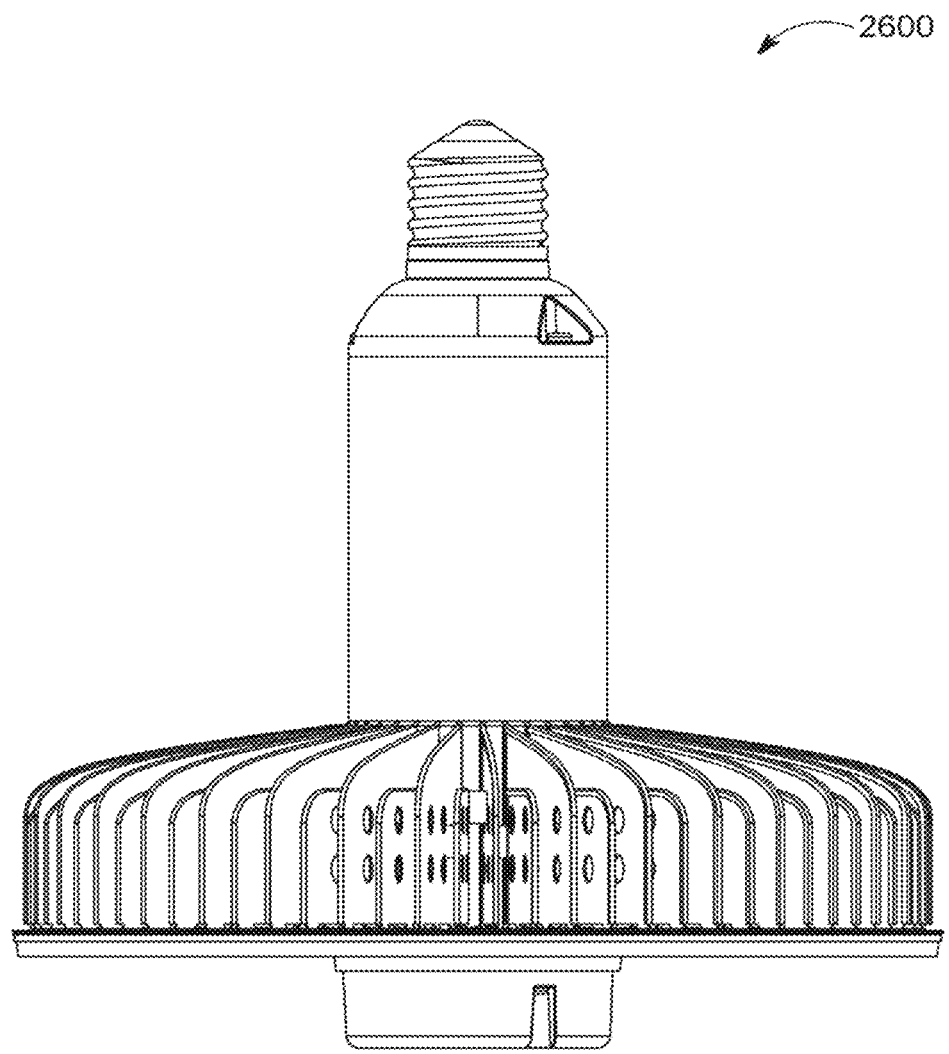
FIG. 26E depicts a right elevational view of an exemplary LED system.
Figure 26F:
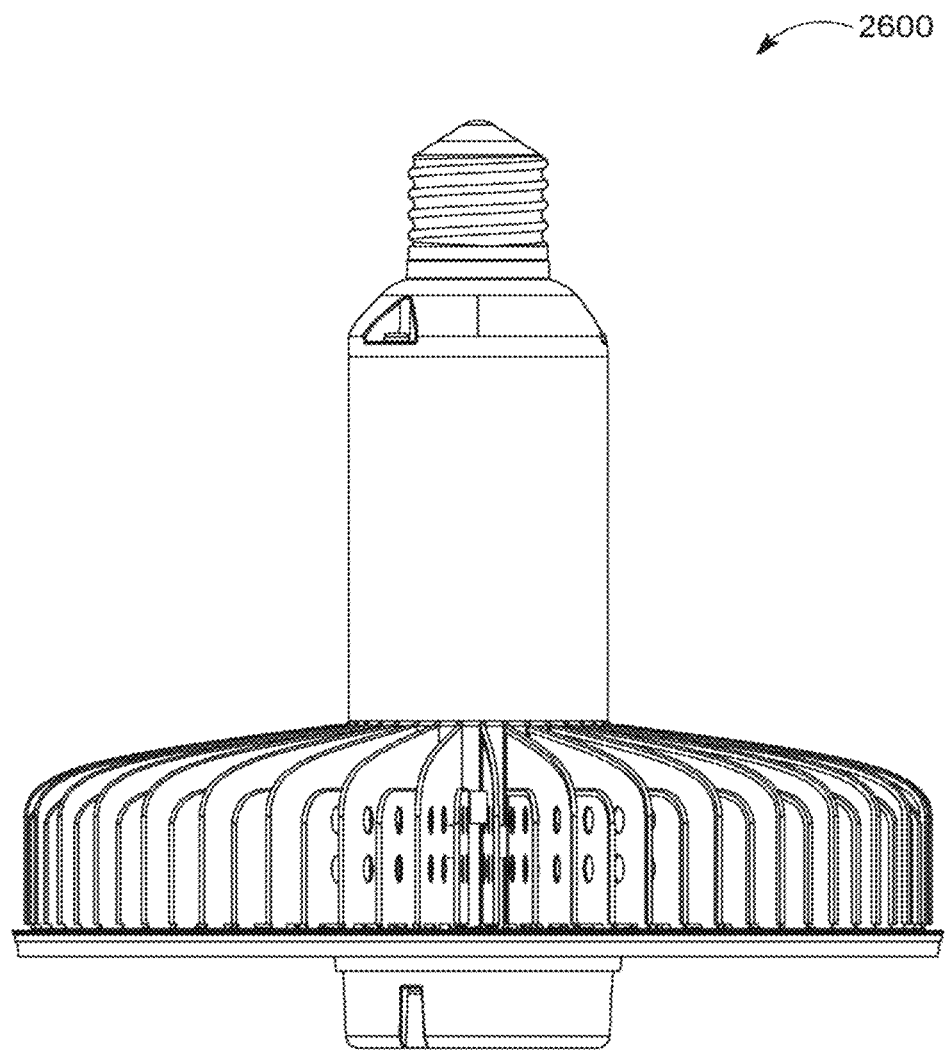
FIG. 26F depicts a left elevational view of an exemplary LED system.
Figure 26G:
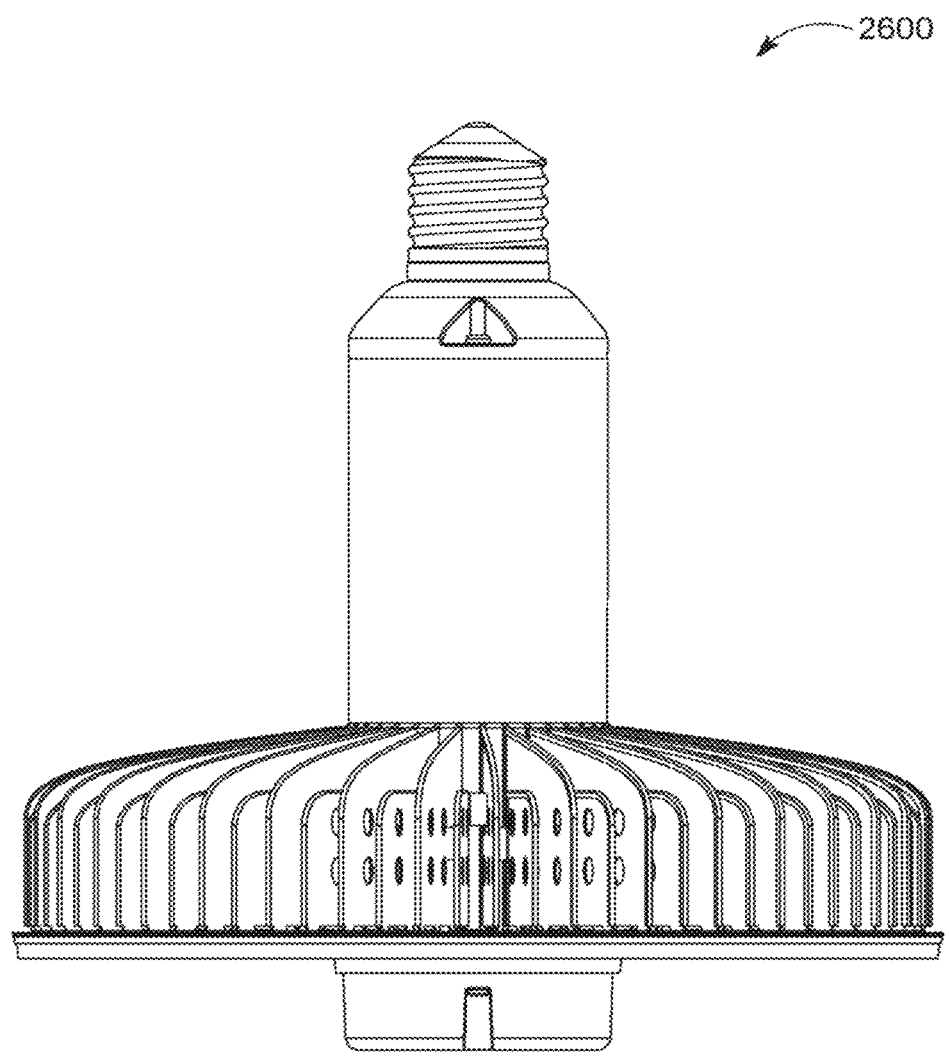
FIG. 26G depicts a front elevational view of an exemplary LED system.
Figure 26H:
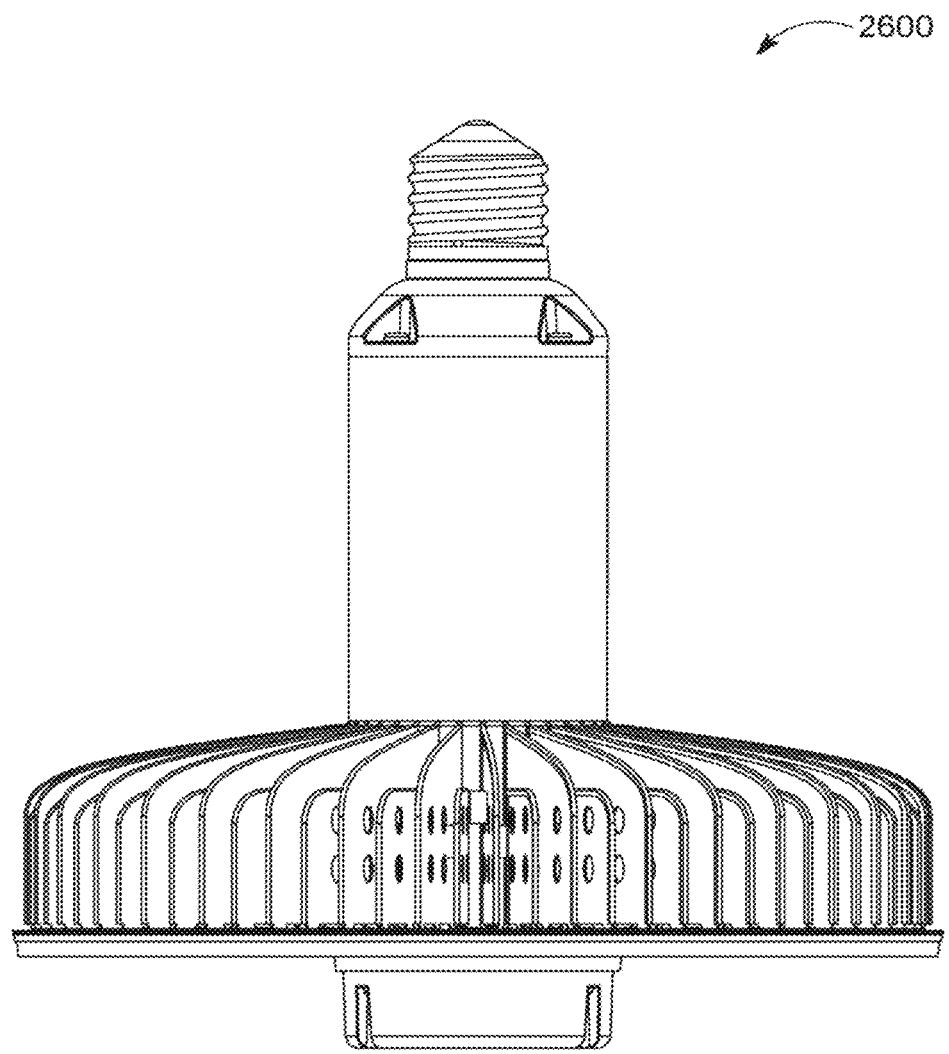
FIG. 26H depicts a back elevational view of an exemplary LED system.

FIG. 26B depicts a back perspective view of an exemplary LED system. The enclosure 2620 as illustrated is fixedly coupled at a distal end to the threaded end 2625 via fasteners 2630 (e.g., screws). Located at a proximal end of the enclosure 2620 are grooves 2635. The grooves 2635 are configured to mate with cooling fins 2640 that are thermally coupled to the LEDs of the LED support structure 2605, such that the cooling fins 2640 aid in dissipating heat generated by the LEDs of the LED support structure 2605. As depicted, the cooling fins 2640 extend radially away from the longitudinal axis 2610 of the LED system 2600. The cooling fins 2640 include apertures through which air can flow, to facilitate the dissipation of heat energy away from the LEDs of the LED support structure 2605. In various embodiments, the cooling fins 2640 may be thermally coupled to the enclosure 2620. In some embodiments, cooling fins 2640 may not be in direct mechanical and thermal connection to grooves 2635.

FIGS. 26C-H depict various elevational views of an exemplary LED system.

Figure 27A:
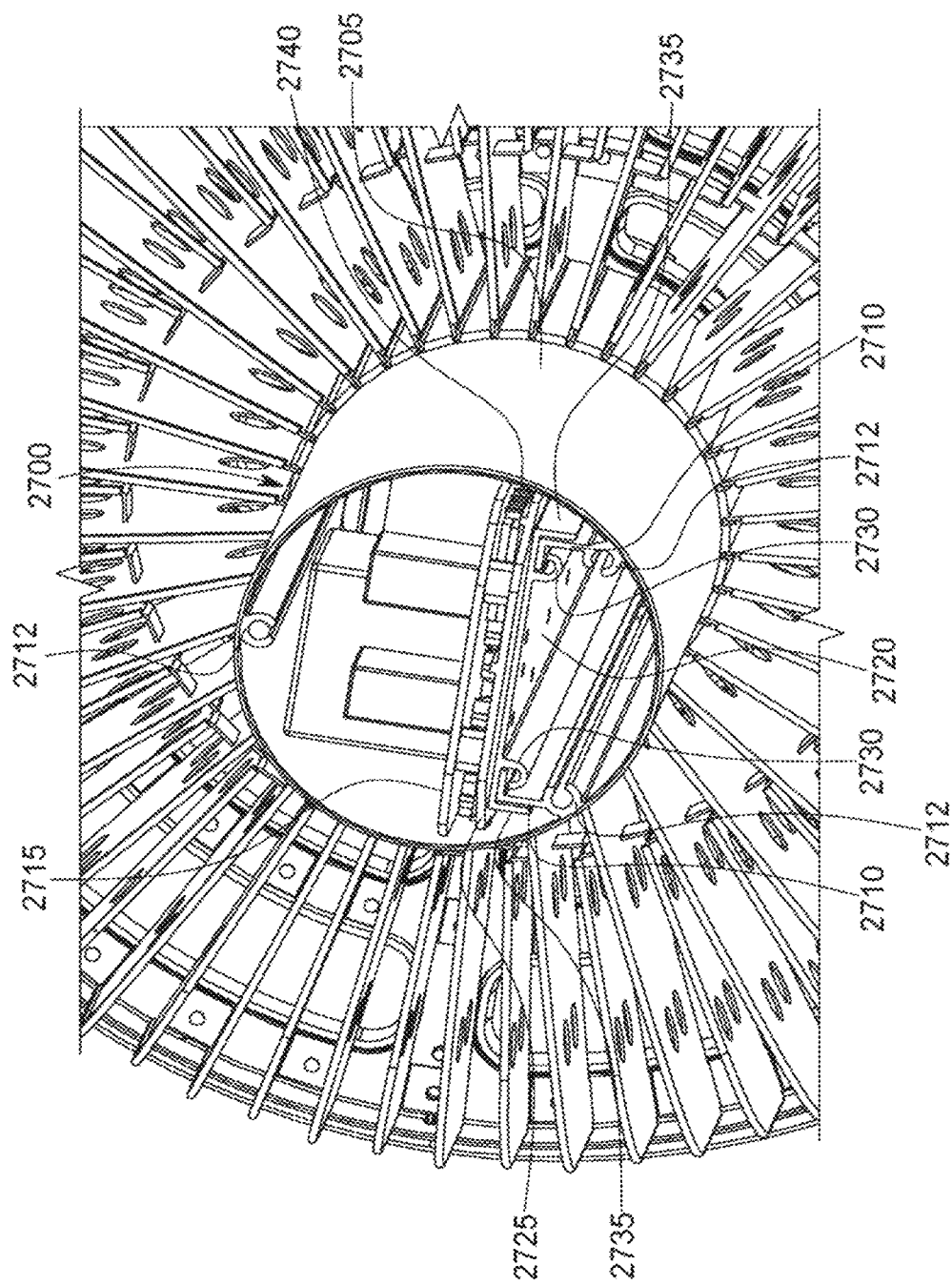
FIGS. 27A and 27B depict perspective views of an exemplary driver assembly.
Figure 27B:
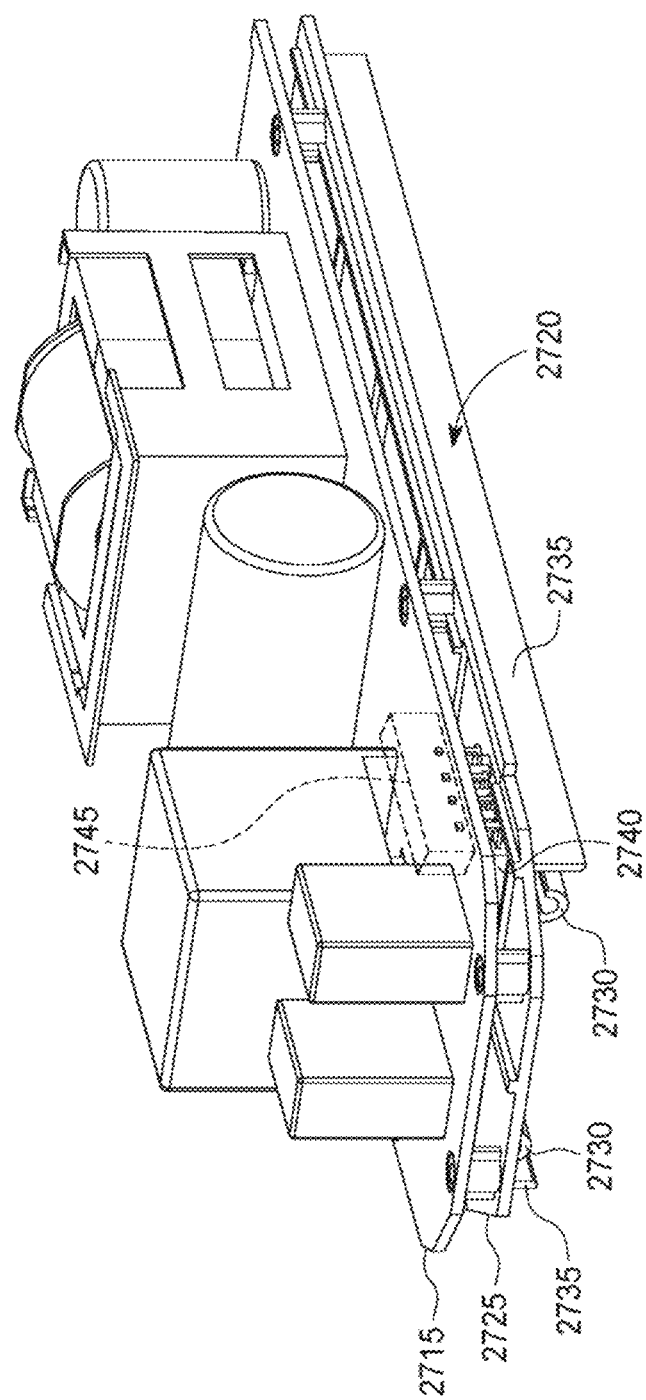

FIGS. 27A and 27B depict perspective views of an exemplary driver assembly. A driver assembly 2700 includes an enclosure 2705 (not present in FIG. 27B). The enclosure 2705 includes enclosure attachment features 2710 located within the hollow space inside of the enclosure 2705. In the depicted example, the enclosure attachment features 2710 are L-shaped flanges that extend longitudinally along an interior surface of the enclosure 2705. The enclosure attachment features 2710 may be used to mechanically mount and thermally connect various components within the hollow interior of the enclosure 2705. The threaded end 2625 (shown in FIG. 26B) of the driver assembly may be attached to the enclosure 2705 using fasteners 2630 that mate with fastener couplers 2712 (e.g., threaded screw holes). As shown in this exemplary embodiment, each fastener coupler 2712 is integrally formed with a respective attachment features 2710.

Located inside of the enclosure 2705 are a driver printed circuit board (PCB) 2715, a heat sink 2720, and an electrical insulator 2725. In this exemplary depiction, the driver printed circuit board (PCB) 2715, the heat sink 2720, and the electrical insulator 2725 all include planar surfaces that extend longitudinally inside of the enclosure 2705, and include a width-wise dimension sized to fit inside of the hollow interior of the enclosure 2705.

The driver PCB 2715 may include a driver circuit that may drive various functions of the LED system 2600. For example, the driver PCB 2715 may regulate the amount of current/power provided to the LEDs of the LED system 2600, consequently controlling the brightness of the LEDs. In some embodiments, the driver PCB 2715 may control circuits or components of the LED system 2600. For example, the driver PCB 2715 may control a DC level, duty cycle, and/or peak of a pulse-width modulated (PWM) current provided to the LEDs.

The heat sink 2720 includes heat sink attachment features 2730 that cooperate with the enclosure attachment features 2710 to mount and thermally connect the heat sink 2720 inside of the enclosure 2705. The attachment features 2710, 2730 may advantageously provide a mechanism for mechanically and thermally coupling the heat sink 2720 to the inside of the enclosure 2705. As shown in this exemplary illustration, the heat sink attachment features 2730 are curved flanges that extend longitudinally along a bottom surface of the heat sink 2720. The heat sink attachment features 2730 are configured to longitudinally align with the enclosure attachment features 2710 when the heat sink 2720 is longitudinally inserted inside of the enclosure 2705. In this exemplary depiction, the curved flanges of the heat sink 2720 are configured to receive a portion of the L-shaped flanges of the enclosure 2705, such that the heat sink 2720 is supported by the L-shaped flanges of the enclosure 2705. Located on the widthwise (e.g., lateral) ends of the heat sink 2720 are end flanges 2735. The end flanges 2735 are configured to limit the lateral movement of the heat sink 2720 inside of the enclosure 2705 by abutting up against associated outer surfaces of the L-shaped flanges of the enclosure 2705.

In the exemplary embodiment shown in FIGS. 27A and 27B, the electrical insulator 2725 is located between the driver PCB 2715 and the heat sink 2720. The electrical insulator 2725 is fixedly coupled to the driver PCB 2715 (e.g., by fasteners, clips, PEMs, clips, or glue). The electrical insulator 2725 is fixedly coupled to the heat sink 2720 (e.g., by fasteners, clips, glue, or pressure welding). The electrical insulator 2725 electrically isolates the driver PCB 2715 from the heat sink 2720, which may advantageously mitigate the potentially dangerous transfer of electrical charge between the driver PCB 2715 and the heat sink 2720.

In some embodiments, the insulator 2725 may be a thin insulating layer (such as, for example, polyamide tape). In various examples, the PCB 2715, the insulator 2725 and the heatsink 2720 may be combined as a single part (such as, for example, a metal core printed circuit board (MCPCB), where the metal substrate of the MCPCB serves as the heatsink 2720 and the insulating layer on the MCPCB is the electrical insulator 2725, and there may be an electrical circuit layer on top of the insulator typical that of a PCB).

Included in the driver assembly 2700 is a heat conducting component 2740 that is thermally coupled with both: (1) a heat generating element 2745 located on the driver PCB 2715 and (2) the heat sink 2720. The heat conducting component 2740 provides a thermal pathway (e.g., thermal communication) between the heat generating element 2745 located on the driver PCB 2715 and the heat sink 2720. In operation, the heat generating element 2745 (e.g., a CPU, microprocessor, resistor, power handling semiconductor, MOSFET, diode, transformer, or inductor) may generate heat energy. Accordingly, the heat conducting component 2740 may advantageously facilitate the transfer of heat from the heat generating element 2745 located on the driver PCB 2715 to the heat sink 2720. In the depicted example, the heat conducting component 2740 extends from the driver PCB 2715 to the heat sink 2720 through an aperture in the electrical insulator 2725. In such a construction, the driver PCB 2715 may be "heat sinked" (e.g., with the heat sink 2720). Examples of the heat conducting component 2740 may include thermal grease, a thermal pad, thermal adhesive, thermal silicone, or thermal epoxy.

In various embodiments, the heat generating element 2745 may be in thermal communication with the electrical insulator 2725, and electrical insulator 2725 may be in thermal communication with the heatsink 2720. There may be a mechanical coupling and thermal path that facilitates heat flow from the heat generating element 2745, through the heatsink 2720, to the enclosure 2720, where heat may be dissipated to the ambient air.

FIGS. 28A, 28B, 28C, 28D, 28E, and 28F depict back elevational views of exemplary driver assemblies having various types of mechanical retention couplers. In various embodiments, the driver PCB 2715, the heat sink 2720, and the electrical insulation 2725 may be assembled together (separate from the rest of the LED system 2600), and then slid longitudinally into the enclosure 2705. The attachment features 2730 of the heat sink 2720 may then be fixedly attached to the attachment features 2710 of the enclosure 2705 using a variety of different mechanical retention coupler types. Mechanical retention couplers for fixing the heat sink 2720 to the enclosure 2705 may advantageously provide for a quick, straight-forward, and secure method to slide the driver PCB 2715 into the enclosure 2705 and to mechanically attach (and thermally couple) the driver to the enclosure 2705. Mechanical retention couplers located at a distal end of the enclosure 2705 and heat sink 2720 may also permit straight-forward installation and removal of a driver in/from the rest of the LED system 2600. Mechanical retention couplers may provide for a clamping force to increase the thermal coupling between the thermal element located on the driver PCB and the enclosure.

Figure 28A:
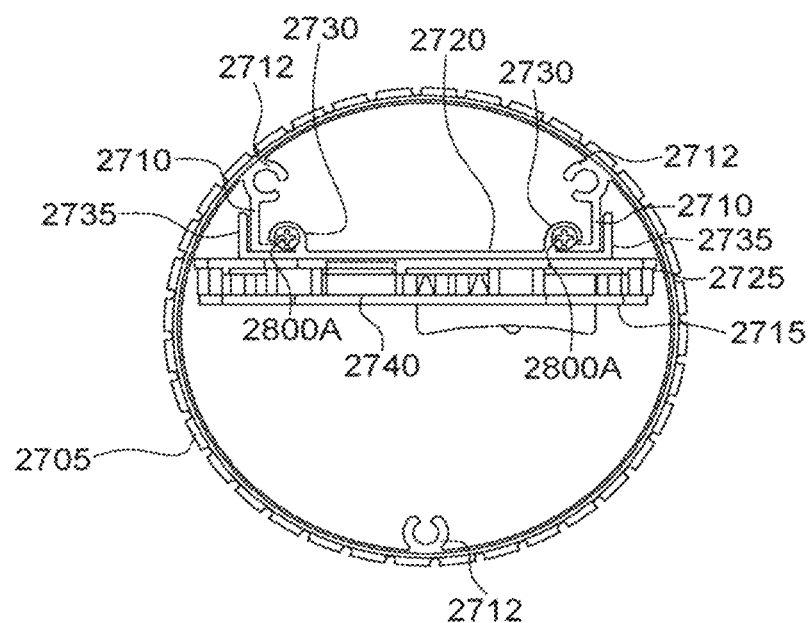
FIGS. 28A, 28B, 28C, 28D, 28E, and 28F depict back elevational views of exemplary driver assemblies having various types of mechanical retention couplers.

In the exemplary embodiment depicted in FIG. 28A, the attachment features 2710, 2730 fixedly couple the heat sink 2720 to the enclosure 2705 by employment of screw-type fasteners 2800A. The screws 2800A are screwed longitudinally into the space formed between the attachment features 2710, 2730. In some examples, the mechanical retention coupler(s) (such as the screw fasteners 2800A, for example) and attachment features 2710, 2730 may be designed in such an arrangement to not only form an interference fit with the attachment features 2710, 2730, but also an arrangement that forces the attachment feature 2710 into physical contact with the heat sink 2720. Physical contact between the attachment feature 2710 and the heat sink 2720 may advantageously increase dissipation of heat energy from the heat sink 2720 via the enclosure 2705. In some embodiments, the attachment features 2710, 2730 may be threaded to allow for the screws 2800A to fixedly attach to the attachment features 2710, 2730. In some examples, the mechanical retention couplers may be press-fitted with the attachment features 2710, 2730. In some examples, the mechanical retention coupler(s) is/are inserted from the enclosure end opening in a direction along a secondary axis, the secondary axis being parallel to the enclosure longitudinal axis. The insertion of the mechanical retention coupler(s) results in a force perpendicular to secondary axis (e.g., a lateral force) that improves the thermal communication of the driver assembly to the enclosure. In some embodiments, the force is also perpendicular to a planar surface of the PCB or the heatsink.

Figure 28B:
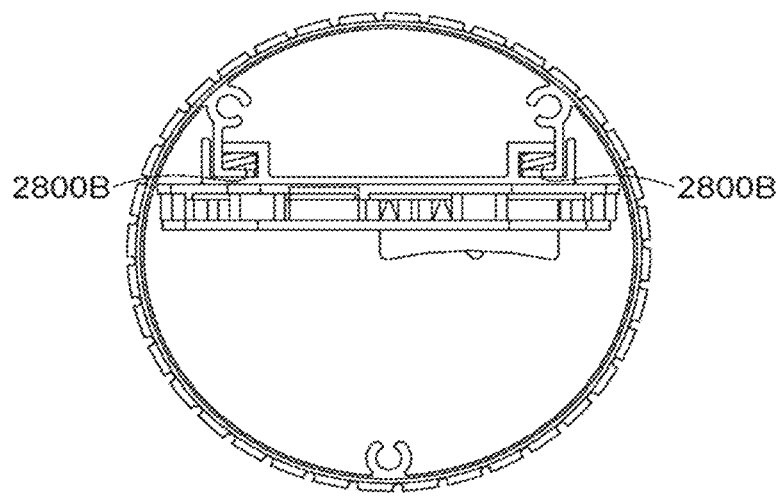

In the exemplary embodiment depicted in FIG. 28B, the attachment features 2710, 2730 fixedly couple the heat sink 2720 to the enclosure 2705 by employment of spring-type fasteners 2800B. In this exemplary embodiment, the attachment features 2710, 2730 are two opposing L-shaped flanges with springs 2800B in the middle of the two opposing L-shaped flanges. The springs 2800B are located in the space between the flanges of the attachment features 2710, 2730, such that the spring bias of the springs 2800B forces the attachment features 2710 into physical contact with the heat sink 2720. The springs 2800B may pull the heat sink 2720 onto the attachment features 2710, which keeps the heat sink 2720 and attachment features 2710 in mechanical contact (and thermally coupled) with one another. In some embodiments, the flanges of the attachment features 2710, 2730 may include holes or grooves that may retain the springs 2800B between the flanges of the attachment features 2710, 2730.

Figure 28C:
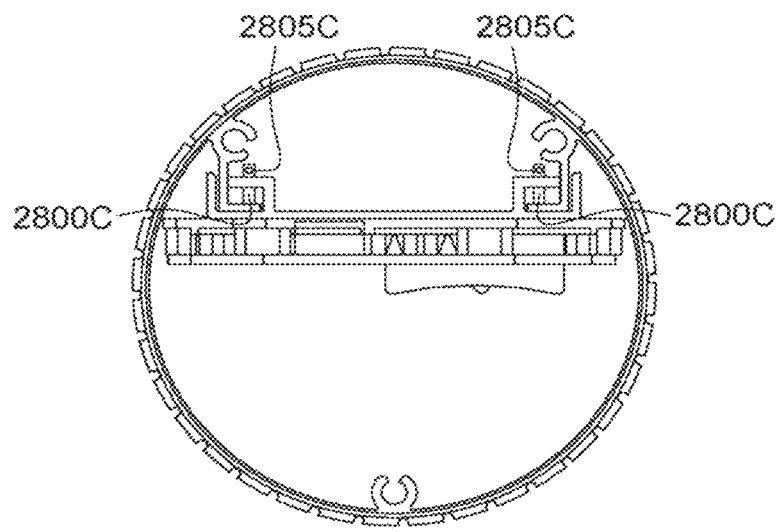

In the exemplary embodiment depicted in FIG. 28C, the attachment features 2710, 2730 fixedly couple the heat sink 2720 to the enclosure 2705 by employment of pin-type fasteners 2800C. In this exemplary embodiment, pins 2800C are inserted laterally through the L-shaped flanges of the attachment features 2710, 2730. A set of fasteners 2805C (e.g., split/cotter pins or R-clips) are inserted into the pins 2800C. The fasteners 2805C abut a surface of the L-shaped flanges of the attachment features 2730, such that the heat sink 2720 is forced into physical contact with the attachment features 2710.

Figure 28D:
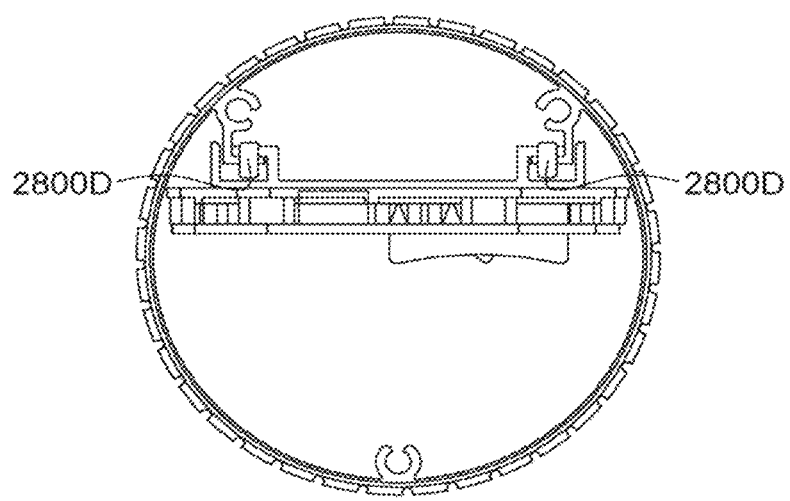

In the exemplary embodiment depicted in FIG. 28D, the attachment features 2710, 2730 fixedly couple the heat sink 2720 to the enclosure 2705 by employment of clip-type fasteners 2800D. In this exemplary embodiment, the L-shaped flanges of the attachment features 2710 are clipped together with the L-shaped flanges of the attachment features 2730 by use of clips 2800D. When installed, the clips 2800D put the opposing L-shaped flanges of the attachment features 2710, 2730 into physical contact with one another, which facilitates the transfer of heat away from the heat sink 2720 via the enclosure 2705.

Figure 28E:
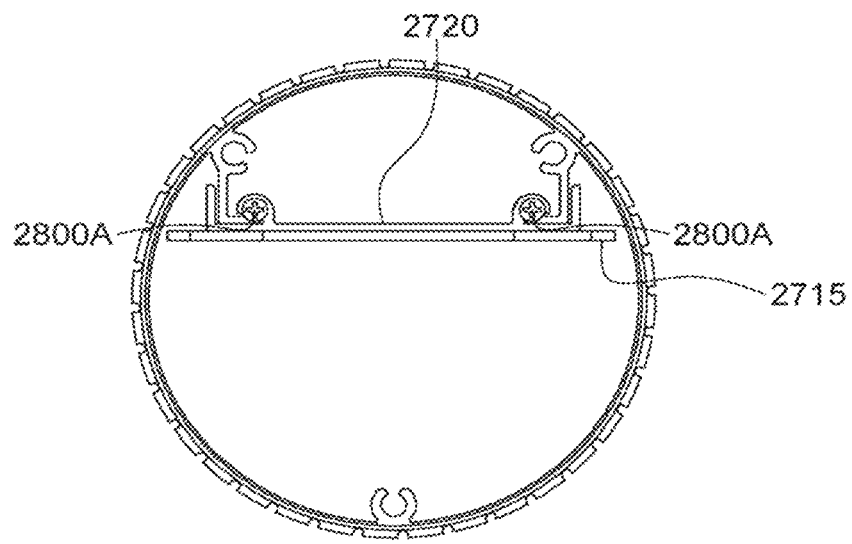
Figure 28F:
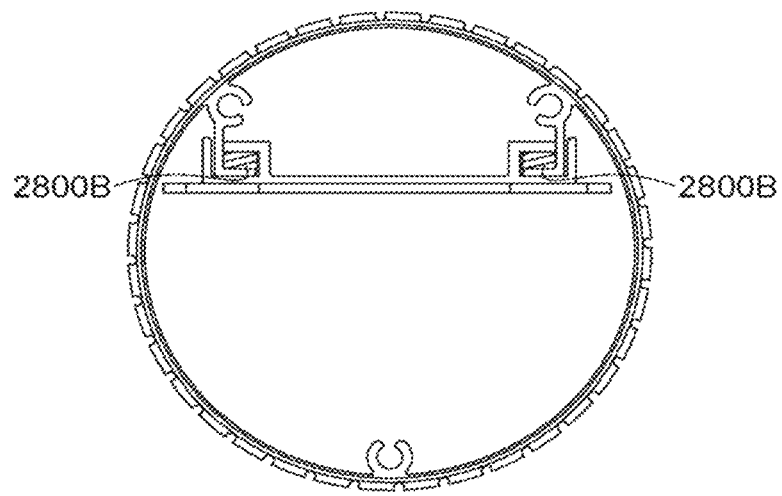

The exemplary embodiments depicted in FIGS. 28E and 28F are similar to the embodiments shown in FIGS. 28A and 28B, respectively, except that the driver PCB 2715 is fixedly coupled (e.g., mounted) directly to the heat sink 2720. For example, there may be no electrical insulation 2725 located between the driver PCB 2715 and the heat sink 2720. While mechanical retention coupler(s) of FIGS. 28E and 28F may only depict two types of fasteners (e.g., screws 2800A and springs 2800B, respectively), other types of fasteners may be used (e.g., pins 2800C and clips 2800D in FIGS. 28C and 28D, respectively).

Figure 29A:
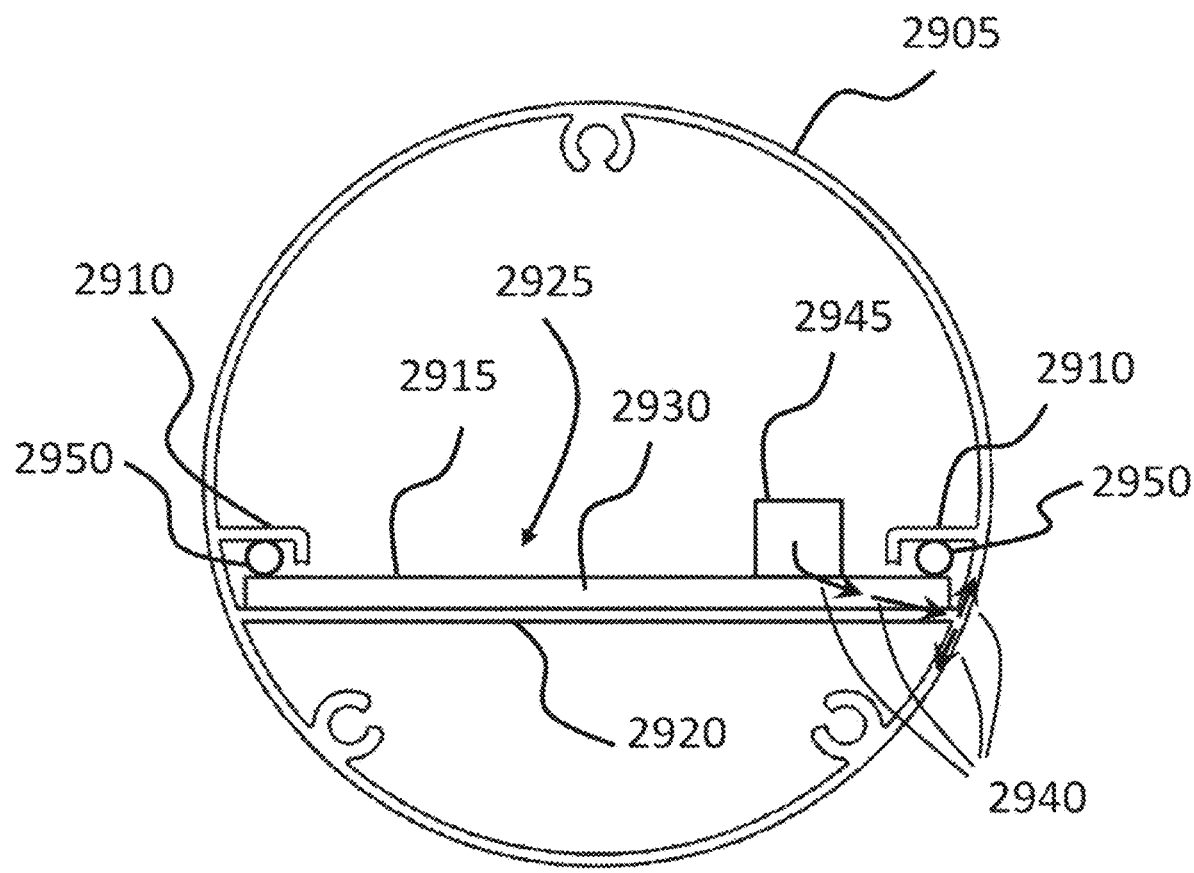
FIG. 29A depicts a back elevational view of an exemplary driver assembly with a driver PCB directly mounted inside of an enclosure.

FIG. 29A depicts a back elevational view of an exemplary driver assembly with a driver PCB directly mounted inside of an enclosure 2905. The driver assembly includes a driver PCB 2925, which includes an electrical heat generating component 2945. The driver assembly also includes an enclosure 2905 inside which the driver PCB 2925 is mounted. The enclosure 2905 includes attachment features 2910 (e.g., flanges), which facilitate mounting of the driver PCB 2925 inside of the enclosure 2905. The enclosure 2905 also includes a heat spreading element 2920 (e.g., heat sink plate, heat conducting plate). The heat generating component 2945 is in thermal communication with the driver PCB 2925, and the driver PCB 2925 is in thermal communication with heat sink plate 2920. The heat flows 2940 from the heat generating component 2945, through the PCB 2925, through the heat conducting plate 2920, to enclosure 2905. From the enclosure 2905, the heat energy may then be dissipated to the ambient air.

In some embodiments, there may be mechanical force/pressure created by mechanical coupler(s) 2950 that improves the mechanical and thermal contact between PCB 2925 and heat sink plate 2920. In this illustrative depiction, the mechanical coupler(s) 2950 are interference fitted rod(s) or screws located between the flange(s) 2910 and the driver PCB 2925. The mechanical coupler(s) 2950 are wedged between flange(s) 2910 and presses the driver PCB 2925 onto heat sink plate 2920. In some examples, the mechanical coupler(s) 2950 may be a spring, a fastener, or a threaded rod.

In some examples, the driver PCB 2925 may be a metal core printed circuit board (MCPCB) consisting of an electrically insulating layer 2915 and metal core 2930. The heat generating component 2945 may be mounted on top of, and in thermal communication with, the electrically insulating layer 2915, such that the heat generating component 2945 may be electrically isolated from the metal core 2930, the heat sink plate 2920, and the enclosure 2905.

Figure 29B:
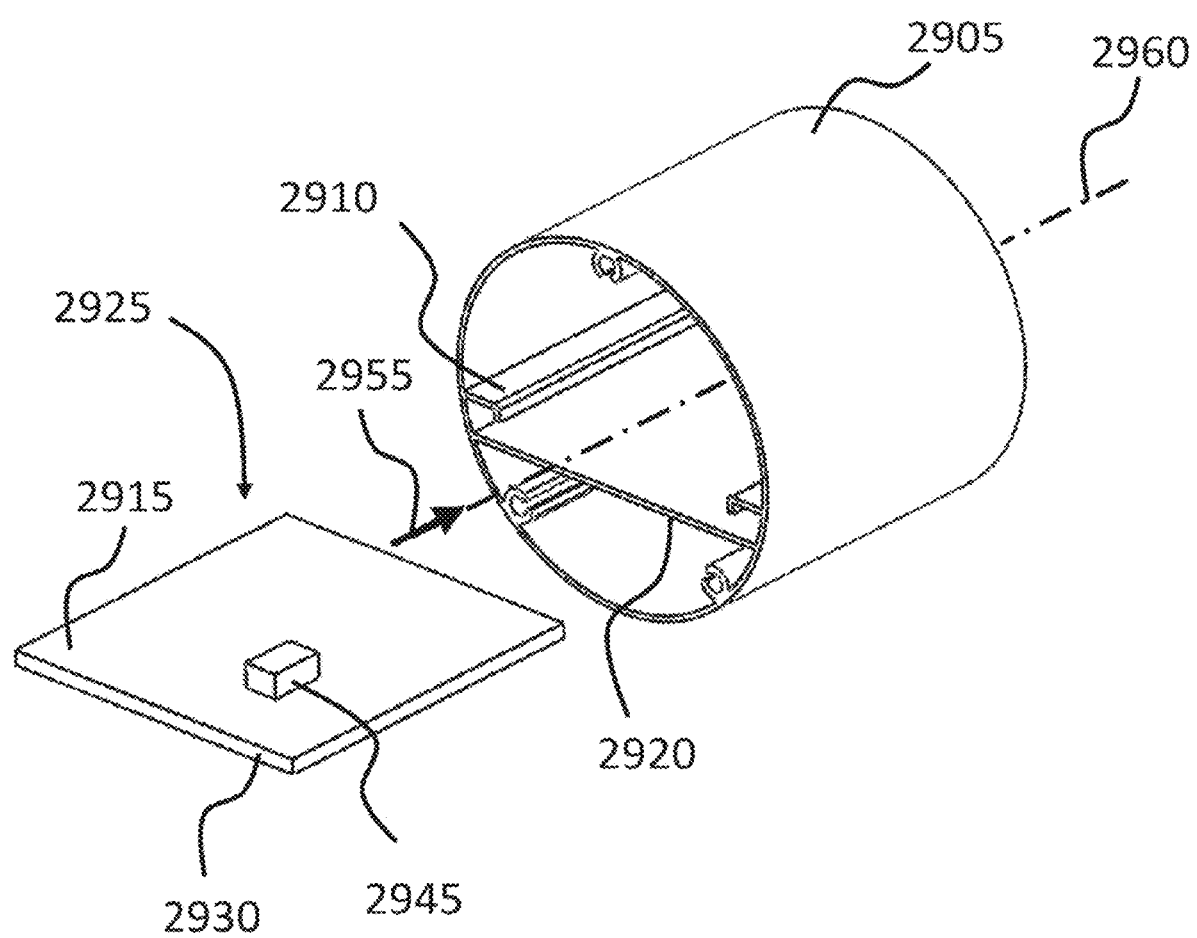
FIGS. 29B and 29C depict back perspective views of an exemplary driver assembly with a driver PCB directly mounted inside of an enclosure.
Figure 29C:
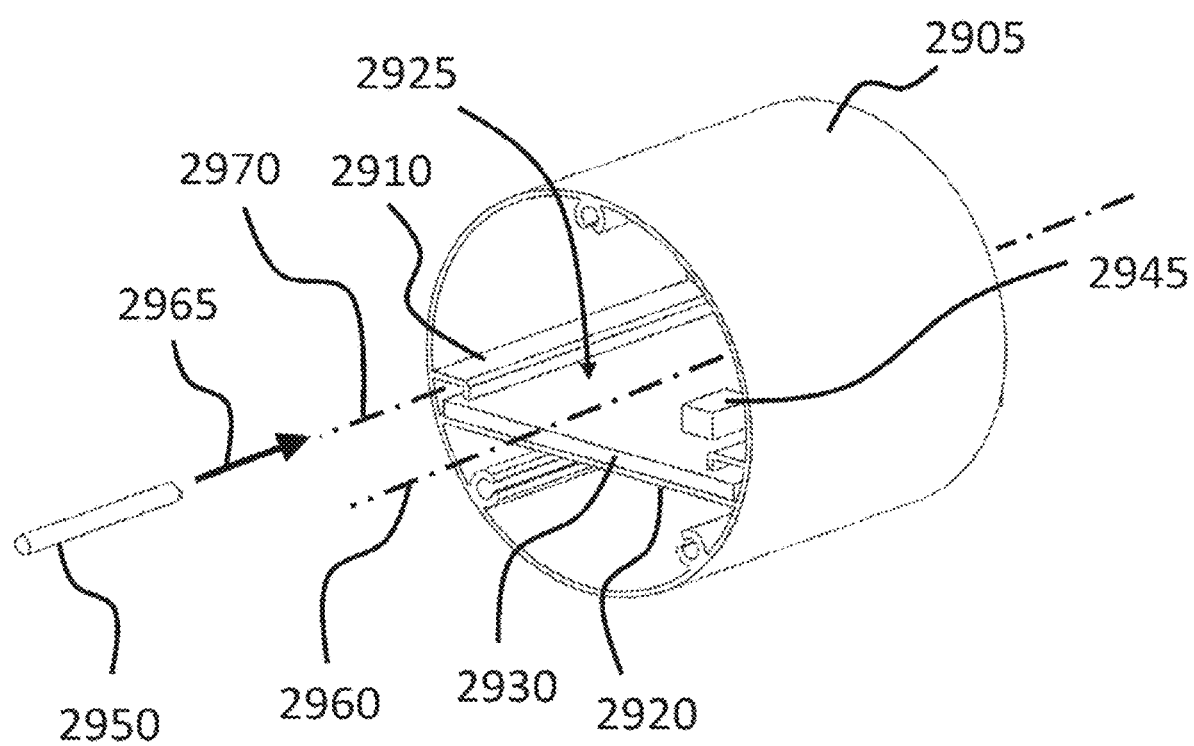

FIGS. 29B and 29C depict back perspective views of an exemplary driver assembly with a driver PCB (being) directly mounted inside of an enclosure. In FIG. 29B, the driver PCB 2925 is being inserted into the enclosure 2905 along a direction 2955 that is parallel to a longitudinal axis 2960 of the enclosure 2950. In FIG. 29C, the driver PCB 2925 has been inserted into the enclosure 2905. A mechanical coupler 2950 (e.g., rod, screw, flat spring) is being inserted between a top surface of the driver PCB 2925 and the attachment feature 2910. The mechanical coupler 2950 is being inserted in a direction 2965 that is along a secondary axis 2970 parallel to the longitudinal axis 2960 resulting in a force perpendicular to the secondary axis. This force forces the PCB 2925 against the heatsink plate 2920 and thus improves the thermal communication of the heat generating component 2945 to the enclosure 2945. The force, in some embodiments, is perpendicular to the PCB 2925 surface. The insertion of the mechanical coupler 2950 is from the end openings of the enclosure.

In some examples, the mechanical retention coupler 2950 may be a flexible, compressible insert. The mechanical retention coupler 2950 may be made of a spongy material or a metal spring such a long linear leaf spring. In various embodiments, the mechanical retention coupler is a stiff, hard pin. In various examples, the mechanical retention coupler 2950 may be press-fit between the attachment feature 2910 and a surface of the driver PCB 2925.

In some examples, the enclosure may have a non-cylindrical shape. For example, the enclosure may have a lateral cross-sectional shape of a rounded square or a triangle, which may provide for increased rotational torque when screwing the LED system 2600 into a socket. In some examples, the enclosure may have a frusto-conical shape (e.g., with a larger proximal end and a smaller distal end).

In various embodiments, the enclosure may act as an additional heat sink for the LED system 2600. Fasteners 2800A-D installed in-line with the sliding direction of the driver PCB (e.g., longitudinally) may advantageously provide for a quick method to fixedly couple the driver PCB 2715 inside of the enclosure without the use of fasteners on the outside of the enclosure. This attachment solution may save time and effort, versus bolting the heat sink 2720 to the attachment from a direction orthogonal to the longitudinal direction (the longitudinal direction being defined by the longitudinal axis 2610) of the driver assembly 2700. Fasteners 2800A-D may be used as a substitute for potting compound. Eliminating potting compound may advantageously remove a lengthy manufacturing step, and may result in a low-cost, light-weight LED system 2600.

In some embodiments, the heat sink 2720 or 2920 may be a heat-conductive metal (e.g., formed using a mechanical extrusion process). The thermal conductivity of the heat sink may be about 10, 50, 100, 200, 300, or 400 watts per Kelvin per meter (W/(mK)) or more. Aluminum and alloys have a thermal conductivity between 60-240 W/(mK). In various embodiments, the heat sink may have a thermally conductive and electrically insulating material layered on a surface of the heat sink to restrict transfer of electrical charge between the heat sink 2720 and the enclosure 2705. One example of such a material may be a metal core PCB.

In various examples, the electrical insulation 2725 may be at least partly formed of a plastic material (e.g., formed using an injection molding, extrusion, or 3D printing process). In some examples, the electrical insulation may be a layer of electrical insulating material located between the driver PCB 2715 and the heat sink 2720. In some embodiments, the electrical insulation may be a thin sheet or tape (such as, for example, made from polyimide or other insulating plastic).

The heat generating component 2740 or 2945 may be, for example, metal oxide semiconductor field-effect transistor (MOSFET), diode, inductor, driver IC, or transformer. The heat conducting component 2740 may be, for example, a heat pipe or metal oxide semiconductor field-effect transistor (MOSFET).

In some embodiments, mechanical retention couplers 2800A-D, 2950 may apply a compressive force to promote thermal communication between the thermal element and the enclosure. The mechanical retention couplers 2800A-D, 2950 may be insertable (via the opening at the longitudinal distal end of the enclosure) parallel to the longitudinal axis of the enclosure, such that the applied compressive force is perpendicular to the longitudinal axis of the enclosure.

In various examples, a driver assembly may be used for driving an illumination module. The driver assembly may include, for example, a longitudinally extending enclosure may have a longitudinal distal end and a longitudinal proximal end. The enclosure may include, for example, a longitudinally extending cavity defined by an interior surface of the enclosure, an opening at the longitudinal distal end of the enclosure, and a pair of laterally opposing enclosure attachment flanges in thermal communication with, and extending longitudinally along, the interior surface of the enclosure.

The driver assembly may include, for example, a heat sink module. The heat sink module may include a pair of laterally opposing heat sink attachment flanges extending longitudinally along the heat sink module. The heat sink attachment flanges may be configured to thermally engage with the enclosure attachment flanges when the heat sink is inserted into the longitudinally extending cavity via the opening.

The driver assembly may include, for example, a driver printed circuit board (PCB). The driver PCB may include a thermal element configured to generate heat. The driver PCB may be supported by the heat sink module. The thermal element may be thermally coupled to the heat sink module such that the heat sink module is configured to conduct heat energy generated from the thermal element to the enclosure.

In some examples, the heat sink module and the driver PCB may be configured to be retained by one or more mechanical retention couplers in the cavity of the enclosure (such as one or more fasteners). The one or more mechanical retention features may be configured to firmly couple the enclosure attachments flanges with the heat sink attachment flanges at the longitudinal distal end of the enclosure.

In some examples, the heat generating component may be in thermal contact with a heatsink. There may be mechanical coupler(s) by which the heatsink is forced against a mating feature on the enclosure to improve the mechanical and thermal contact between the heatsink and the enclosure. Such mechanical coupler(s) may include spring(s), fastener(s) or interference fit rods.

In some examples, the enclosure may be a single-piece mechanical part with an opening, such that access to the internal cavity of the enclosure may only be from longitudinal end openings of the enclosure. The mechanical coupler(s) by which the heatsink module is forced again a mating feature on the enclosure may be inserted from the longitudinal end(s) of the enclosure along a direction parallel to the longitudinal axis of the enclosure.

The enclosure may be, for example, a tubular cylinder. The driver assembly may include, for example, an electrical insulator disposed between the driver PCB and the heat sink module. The electrical insulator may have a first surface that couples to the driver PCB, and a second surface that couples to the heat sink module, such that the electrical insulator electrically isolates the driver PCB from the heat sink module. The electrical insulator may be biaxially-oriented polyethylene terephthalate. The electrical insulator may be a metal core PCB having an electrical insulation layer.

In some examples, the fasteners may be a pair of screws configured to be longitudinally screwed into respective spaces formed between the enclosure attachment flanges and the heat sink attachment flanges. The fasteners may, for example, be a pair of springs configured to compressingly fit between respective spaces formed between the enclosure attachment flanges and the heat sink attachment flanges, such that the heat sink module is mechanically biased against the enclosure attachment flanges when the fasteners firmly couple the enclosure attachment flanges with the heat sink attachment flanges. The fasteners may, for example, be a pair of clips configured to physically press together the enclosure attachment flanges and the heat sink attachment flanges.

In some examples, the thermal coupling between the thermal element and the heat sink module may be enabled by a heat conducting component that may be thermally coupled with the thermal element and the heat sink module, such that the heat conducting component promotes thermal communication between the thermal element and the heat sink module. In various embodiments, when the heat sink attachment flanges are firmly coupled to the enclosure attachment flanges, there may be intimate physical contact between the heat sink attachment flanges and the enclosure attachment flanges that promotes thermal communication between the heat sink module and the enclosure.

In various embodiments, a driver assembly may include a longitudinally extending enclosure having a longitudinal axis, a longitudinal distal end, and a longitudinal proximal end. The enclosure may include a longitudinally extending cavity defined by an interior surface of the enclosure. The enclosure may include an opening at the longitudinal distal end of the enclosure. The driver assembly may include a driver printed circuit board (PCB). The driver PCB may include a thermal element configured to generate heat, such that when the driver PCB is longitudinally inserted into the cavity via the opening, the thermal element may be thermally coupled to the enclosure. The enclosure may be configured to conduct heat energy generated by the thermal element from the thermal element to the enclosure. The driver assembly may include a mechanical retention coupler that provides for a clamping force to promote increased thermal coupling between the thermal element and the enclosure. The mechanical retention coupler may be installed in the enclosure via the opening and from a direction parallel to the longitudinal axis, such that the clamping force may be perpendicular to the longitudinal axis of the enclosure.

Smart Electronic Accessory

Figure 30:
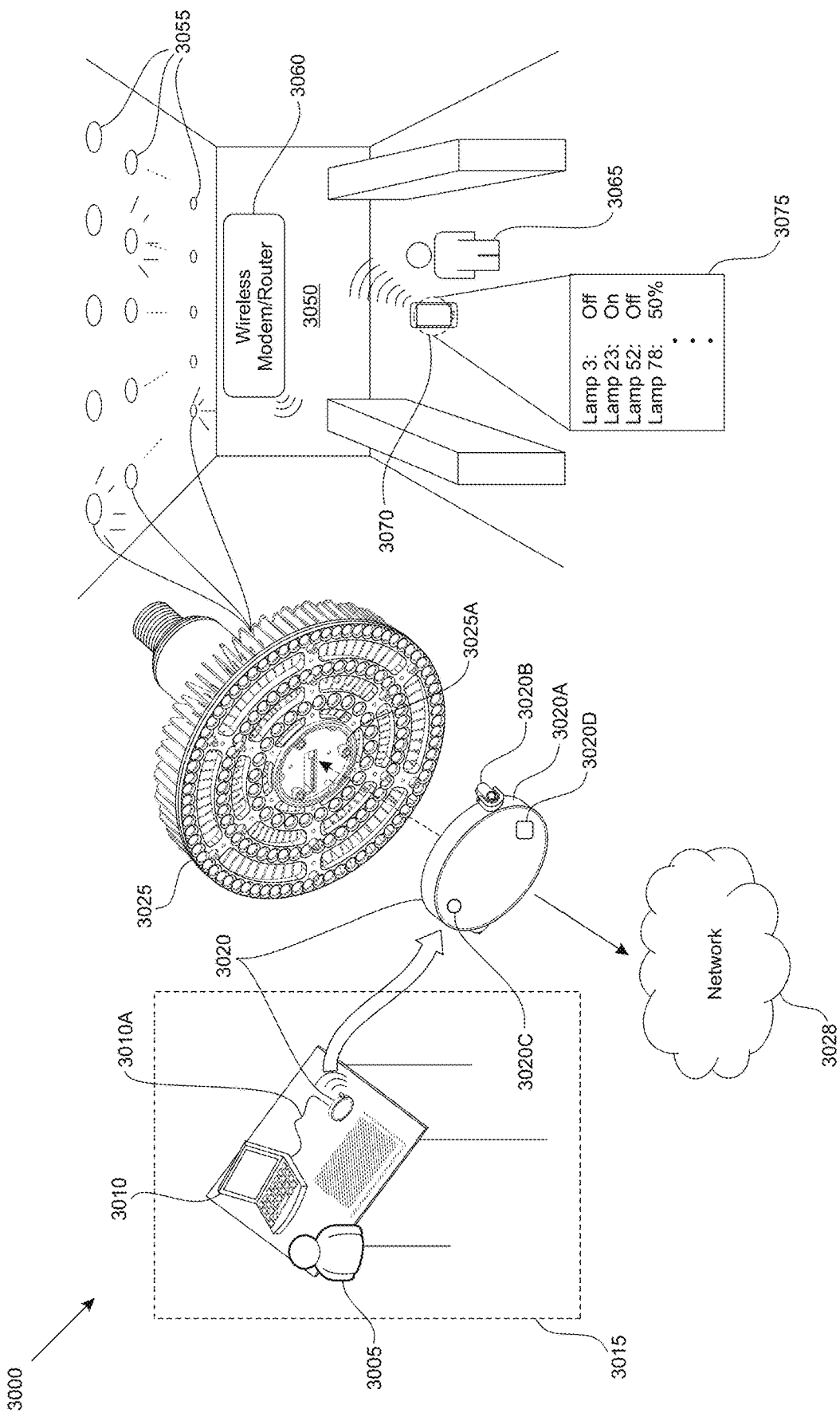
FIG. 30 depicts a top-level exemplary schematic illustrating an operational relationship of the LED system and an electronic accessory in a system environment.

FIG. 30 depicts a top-level exemplary schematic illustrating an operational relationship of the LED system and an electronic accessory in a system environment. The term "LED system" may be interchangeably referred to a "lighting system" or "LED lamp," in various implementations. As used herein, "electronic accessory" may also be interchangeably referred to as "electronic device" or "electronic module." The electronic accessory discussed with regards to FIGS. 30-34 includes many of the same characteristics and features of the electronic accessory depicted in FIG. 1B (reference number 105) and discussed in the "ELECTRONIC ACCESSORY" section several paragraphs above in this specification.

As shown in FIG. 30, an exemplary scenario 3000 shows a user 3005. The user 3005 is interfacing with the user's computing machine 3010 (e.g., a laptop computer, smartphone, or other electronic device) in the user's office 3015. Operably coupled to the user computing machine 3010 via a data connection 3010A (e.g., a USB cable, serial communication wire, or wireless connection) is an electronic accessory 3020. In the user's office 3015 (or other remote location), the user 3005 may setup, configure, and/or calibrate the electronic accessory 3020, using the computing machine 3010, to fit a specific set of lighting, commissioning, or configuration requirements. Once the electronic accessory 3020 is configured (e.g., back at the office 3015), it may then be deployed in the field by operably coupling the accessory 3020 with a LED lamp 3025. When a pre-configured accessory 3020 is coupled to a given LED lamp 3025, the accessory 3020 may augment the functionality of the lamp 3025. For example, one accessory 3020 may be assigned a unique identifier, such that when a given lamp 3025 is coupled to the one accessory 3020, the lamp 3025 is then associated with the unique identifier and will respond to commands addressed to the one accessory 3020 with that unique identifier. By performing lighting assignment operations for each accessory 3020, a full set of lamps 3025 may be customizably configured and commissioned to meet the requirements and needs of a specific lighting application.

As shown in this exemplary depiction, the electronic accessory 3020 is electrically and mechanically coupled at a front center area 3025A of the LED lamp 3025, which may allow the front surface of the electronic accessory 3020 to be unobstructed by any other object. Coupling the electronic accessory 3020 at the front center location 3025A of the LED lamp 3025 may also allow for natural cooling of the electronic accessory 3020.

The accessory 3020 includes a body or housing 3020A. The accessory 3020 is coupled to the LED lamp 3025 using a pair of couplers 3020B, which are attached to the body 3020A. The accessory 3020 also optionally includes at least one sensor 3020C, and optionally include at least one actuator 3020D. In the depict example, the sensor 3020C is a sound sensor (e.g., microphone), which allows the accessory 3020 to detect certain audio or acoustic sounds, while the actuator 3020D is an indicator light, which may visually indicate to a user whether the accessory 3020 is powered on or is properly coupled to the lamp 3025. In some embodiments, 3020C may be other forms of sensors such as light, motion, or temperature sensors, for example. In some embodiments, the sensor 3020C may include one or more of the passive infrared occupancy sensor, camera, a daylight sensor, temperature sensor, RF occupancy sensor, an IR receiver, a near-field communication (NFC) device, RFID sensor, and/or other such sensing devices. In other embodiments, the actuator 3020D may include one or more of the sounds generating device, IR transmitter, Near field communication device.

The various components of the electronic accessory 3020 may be configured by remote programming (e.g., at a remote location 3015). The electronic accessory 3020 may be inserted into LED system 3025 after being programmed. In various embodiments, the electronic accessory 3020 may be a "smart" module that is configured to wirelessly transmit and receive data or information. For example, the electronic accessory 3020 may be configured with a network interface card (I/O) and wireless antenna to communicate with other devices (e.g., controllers) within a network 3028, which may be a local area network (LAN), in many implementations, Bluetooth mesh network, Wifi network or other wireless networks. The network 3028 could also be a cloud server or remote network (e.g., WAN), in other embodiments. The lamp 3025 may be configured to transmit and/or receive data to/from the network 3028 (and to other devices connected to the network 3028), via the accessory 3020. In various examples, the network 3028 may be formed by other devices 3025, 3002 in the network 3028. For example, multiple pairs of lamps 3025 and associated devices 3002 may be wirelessly configured with one another, but without other external components (e.g., such as a modem or a router that may connect to the outside world or the Internet). In such an example, each lamp/device pair may store wireless network configuration data for the network 3028, such that the network 3028 may operate with each lamp/device pair forming a redundantly supporting (sub-)unit of the network 3028. In various examples, the accessory 3020 may receive operating power from the lamp 3025. In one or more embodiments, the electronic accessory 3002 may have electrical connections and draw power from the LED system 3014 including, for example, 48V, 24V, 12V, 5V or 3.3V. In some examples, the accessory 3020 may receive operating power from the lamp 3025, but not be configured with (wireless) communication capability.

In the illustrative depiction of FIG. 30, one or more LED lamps 3025 (and associated accessories 3020) may be installed in a facility 3050, such as a grocery store, factory building, warehouse, retail store or shipping center, for example, to provide improved lighting functionality for the facility 3050. For example, one or more LED systems 3055 (each system including a lamp and associated accessory) may be installed in a ceiling of the facility 3050. Based on the programming performed back at the office 3015, a user 3065 may wirelessly control one or more of the LED systems. For example, user 3065 may wirelessly control each LED system 3055 installed in the ceiling through a wireless device 3070. In at least one embodiment, the facility may include a wireless device 3060, such as a wireless modem or router. The wireless device 3060 may host a WiFi, Bluetooth, ZigBee, Z-wave, or other wireless network, for example, to which each accessory 3020 and the user device 3070 may be wirelessly connected. The user 3065 may therefore transmit commands to, and receive data from, each of the accessories 3020 deployed in the facility 3050, via the user device 3070 and/or the wireless router 3060. In the illustrated example, the user 3065 is using the user interface of mobile device 3070 to control or monitor the status of parameter(s) associated with each lamp 3025. Specifically, the user device 3070 includes an interface display which indicates that: the lamp assigned to unique ID 3 is OFF, the lamp assigned to unique ID 23 is ON, the lamp assigned to unique ID 52 is OFF, and the lamp assigned to unique ID 78 is at 50% brightness. The user 3065 may also set (in real time) the various parameters of the lamp, via the device 3070 and accessory 3020, to, for example, change lamp 78 from 50% brightness to 75% brightness. In at least one example, the lamp systems are controllable directly by the user device 3070 (e.g., through Bluetooth, Zigbee, WiFi, other wireless protocol).

On some modern systems, no user or "host" may be used (e.g., the network may be formed within only devices themselves). For example, in various implementations, the user scenario described above may instead be part of an automated system that dims up and down the light autonomously based on input from outside the network (e.g., such as building automation system, or based on a set of presets pre-programed into the system, or based on a set of sensors within the network). Accordingly, some examples may involve operation of systems disclosed herein in the absence of an active (human) user 3065, and may instead rely on automated, interconnected, and/or intelligent systems for operation.

In some embodiments, the electronic accessory 3020 may include electrical connections to draw power from the main lighting unit including 48V, 24V, 12V, 5V or 3.3V. Another set of electrical connections may send a dimming signal, for example 0-10V, PWM back to dim the main LED system. There may also be data communication lines using protocols such as SPL, I2C, or SPI, in order for the electronic accessory to communicate with the main lamp assembly. The electronic accessory 3020 further has wireless communication capabilities to send and receive data to the light, perform other parameter adjustments, or simply to monitor the status to an associated lamp 3025. In a further embodiment, the electronic accessory 3020 has further wireless communication capabilities including Infrared, Near field communications, RFID, etc. (as mentioned above).

In various examples, the electronic accessory 3020 may emit data signals to communicate with other lighting system, as well to a control unit. In the depiction of FIG. 30, the electronic accessory 3020 is being programmed at remote office 3015. In some embodiments, an accessory configuration device 3010 may be operated by a user located remotely from the facility in which LED systems are deployed. Such remote configuration may advantageously allow for batch "commissioning" of each electronic accessory, such that a user may easily set up many accessories in the comfort of the office and without the hassle of configuration in the field (which may be time consuming, stressful, and potentially hazardous).

Figure 31:
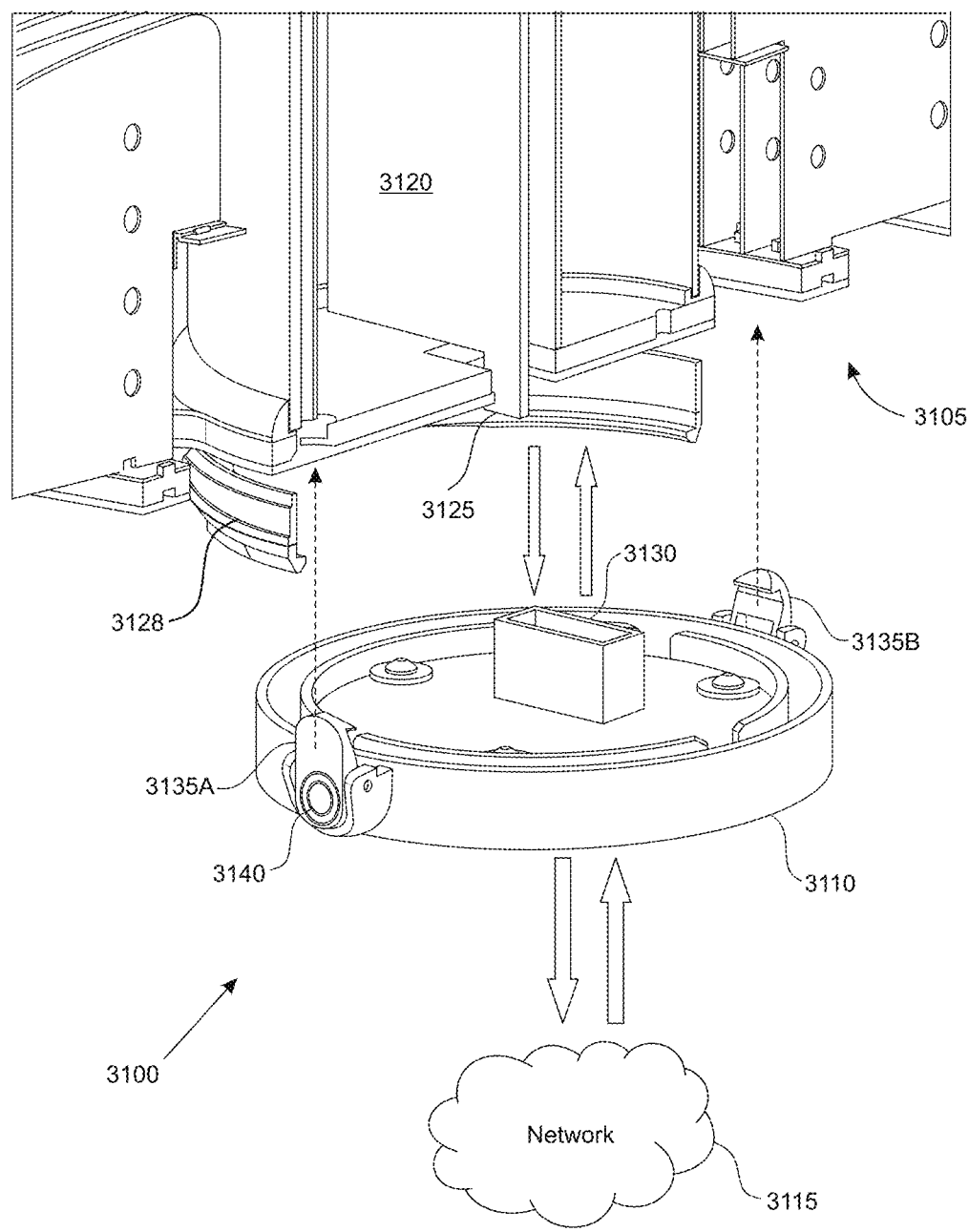
FIG. 31 depicts a semi-exploded view of an exemplary system including electronic accessory being coupled to the LED system and driver assembly.

FIG. 31 depicts a semi-exploded view of an exemplary system including electronic accessory being coupled to the LED system and driver assembly. An LED system 3100 includes an LED lamp assembly 3105 and an electronic accessory assembly 3110. The term LED lamp may also be referred to as a lighting system, a light assembly, or light engine. The electronic accessory 3110 includes wireless data transmission/reception capabilities to wirelessly communicate with a network 3115 (e.g., a private LAN network, a Bluetooth network, a mesh network). The LED lamp 3105 includes an electronic driver 3120, which may be a printed circuit board (PCB) having various electronic components. The driver 3120 includes a mechanical and electronic driver interface 3125 (e.g., for mating to an edge connector 3130). The driver interface 3125 is configured to transmit and/or receive data to/from (as well as transmit operating power to) the accessory 3110, via the accessory interface 3130 (e.g., a complementary edge connector). The driver interface 3125 may also referred to as a driver connector. In various examples, the interfaces 3125, 3130 may be electrical interfaces, such as serial data interface, SPI, I2C, PCI or USB interfaces. The accessory 3110 further includes a pair of mechanical couplers 3135A, 3135B configured to couple at a perimeter ridge or shoulder 3128 (also referred to as a circumferential or annular lip 3128) at the front center area of the LED lamp 3105 to fixedly couple the accessory 3110 to the lamp 3105. Each coupler 3135A, 3135B may include a user pressing area 3140, which may allow the user to release the accessory 3110 from the lamp 3105. As shown in this exemplary embodiment, the accessory 3110 is a puck-shaped module that has the couplers 3135A, 3135B at opposite lateral ends of the body of the accessory 3110 (e.g., around a horizontal perimeter or circumference of the accessory 3110).

In various embodiments, the driver 3120 may be a "smart" driver configured to transmit lamp operating parameter information to the accessory 3110 once the accessory is operably coupled to the LED lamp 3105. For example, the driver 3120 may transmit the following operating parameters to the accessory: time on (e.g., in hours on; for warranty concerns), power consumer (e.g., in kWH), power level (e.g., in volts), LED current, (e.g., in amperes), and driver temperature (e.g., in degrees Celsius). In many examples, the driver 3120 may provide electrical power to the module, for example, 3.3 V or 12V or power, with a ground (GND) connection.

In various implementations, the accessory 3110 may transmit command, control signal, request, and/or data signals to the driver 3120. For example, one or multiple control signals transmitted to the driver 3120 may include: control or monitor lighting status (e.g., on/off), dimming (e.g., 0-10V, PWM), sophisticated controls (e.g., query power levels, dimming levels, serial numbers, model number, time on, total power consumed, hours on, temperature excursions, and other data the driver 3120 may contain), and UART serial communications (Tx/Rx).

Figure 32A:
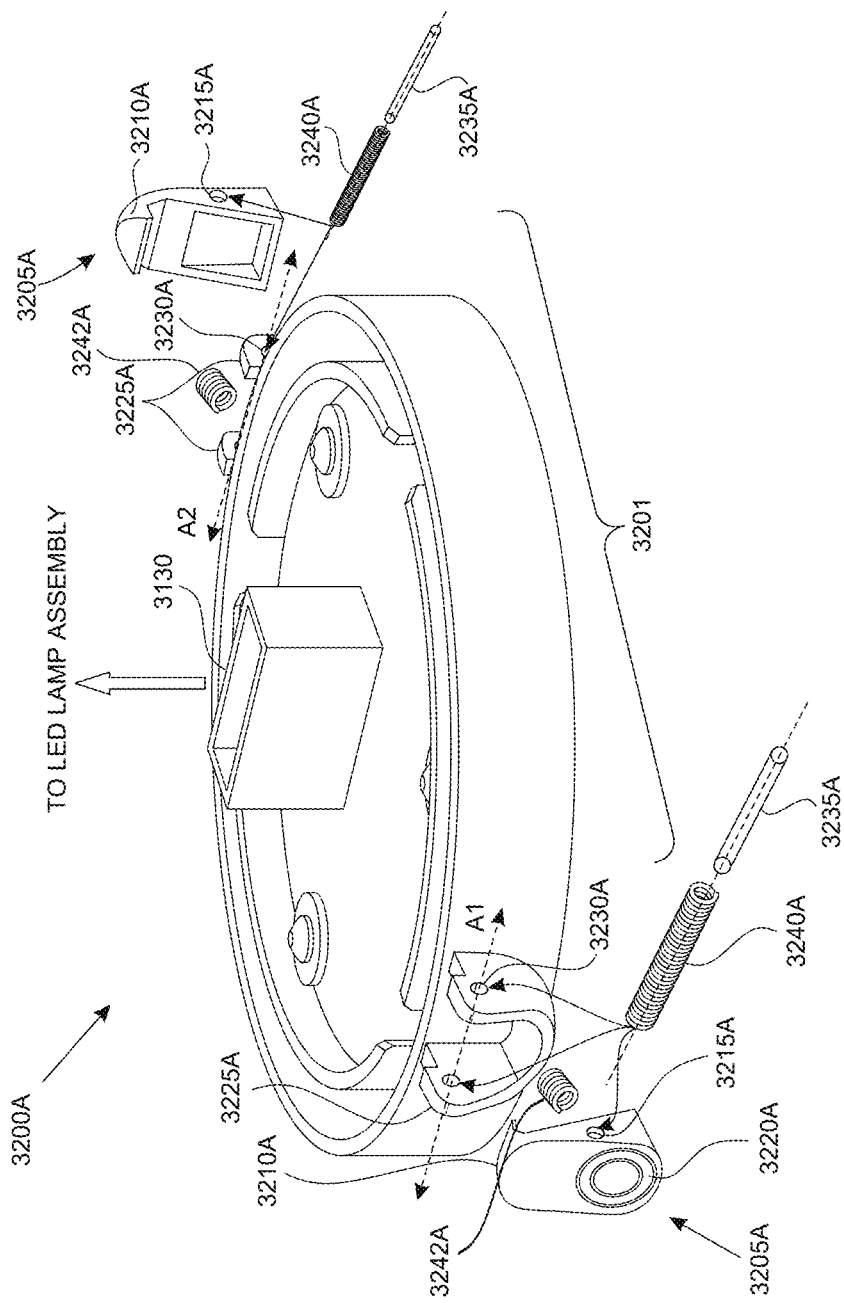
FIG. 32A depicts a semi-exploded perspective view of an exemplary electronic accessory having releasable couplers.

FIG. 32A depicts a semi-exploded perspective view of an exemplary electronic accessory having releasable couplers. An electronic accessory 3200A includes an accessory body 3201. The accessory 3200A includes at least one releasable coupler 3205A. Each coupler 3205A includes a retention member 3210A (also referred to as a hook or ear 3210A). Each coupler 3205A includes at least one first pivot aperture 3215A. Each coupler 3205A includes a pressing area 3220A. The accessory 3200A further includes at least one pivot member coupler 3225A protruding from the body 3201 of the accessory 3200A. Each pivot member coupler 3225A includes at least one second pivot aperture 3230A. Each coupler 3205A is rotatably/pivotably coupled to an associated pivot member coupler 3225A. Specifically, a pivot pin 3235A may be inserted through the apertures 3215A, 3230A, to allow the couplers 3205A to rotate about an associated (horizontal) rotational axis (e.g., axes A1, A2 respectively). The pivot pin 3235A may be included with a spring 3240A to bias the couplers into a "closed" position, such that the hooks 3210A of the couplers 3205A may be forced inward (toward the center point of the accessory 3200A) to retain the accessory 3200A to an associated LED lamp.

In the depicted embodiment of FIG. 32A, the springs 3240A are torsion-type springs with tangential alignment relative to the accessory body 3201, the springs 3240A being biased along an axle defined by the pivot pins 3235A. In various examples, radially extending/compressing springs 3242A may be used to radially bias a retention member 3210A of an associated releasable coupler 3205A. In various embodiments, leaf and/or coil springs may be used. In some implementations, the radially aligned springs 3242A may be coupled below the pivot point 3215A, closer to the lower/proximal end of the coupler 3205A. In this proximal coupling configuration, the springs 3242A may be configured under compression (radially biased outward) to exert a torque at the bottom/proximal end of the coupler 3205A to cause the retention member 3210A (at the upper/distal end of the coupler 3205A) to deflect radially inward, while the lower/proximal end of the coupler 3205A is deflected outward. In some implementations, the radially aligned springs 3242A may be coupled above the pivot point 3215A, closer to the upper/distal end of the coupler 3205A. In this distal coupling configuration, the springs 3242A may be configured under extension (radially biased inward) to exert a torque at the upper/distal end of the coupler 3205A to cause the retention member 3210A (at the upper/distal end of the coupler 3205A) to deflect radially inward, while the lower/proximal end of the coupler 3205A is deflected outward. In both cases, the coupler 3205A is biased radially inward on the coupler's 3205A upper/distal end, to facilitate a secure yet releasable coupling between the accessory 3200A and associated LED lamp.

In various examples, the (releasable) accessory 3300A may be removable without need for a tool, and only require the use of a person's hand (therefore being "toollessly-removable" or "hand-removable").

Figure 32B:
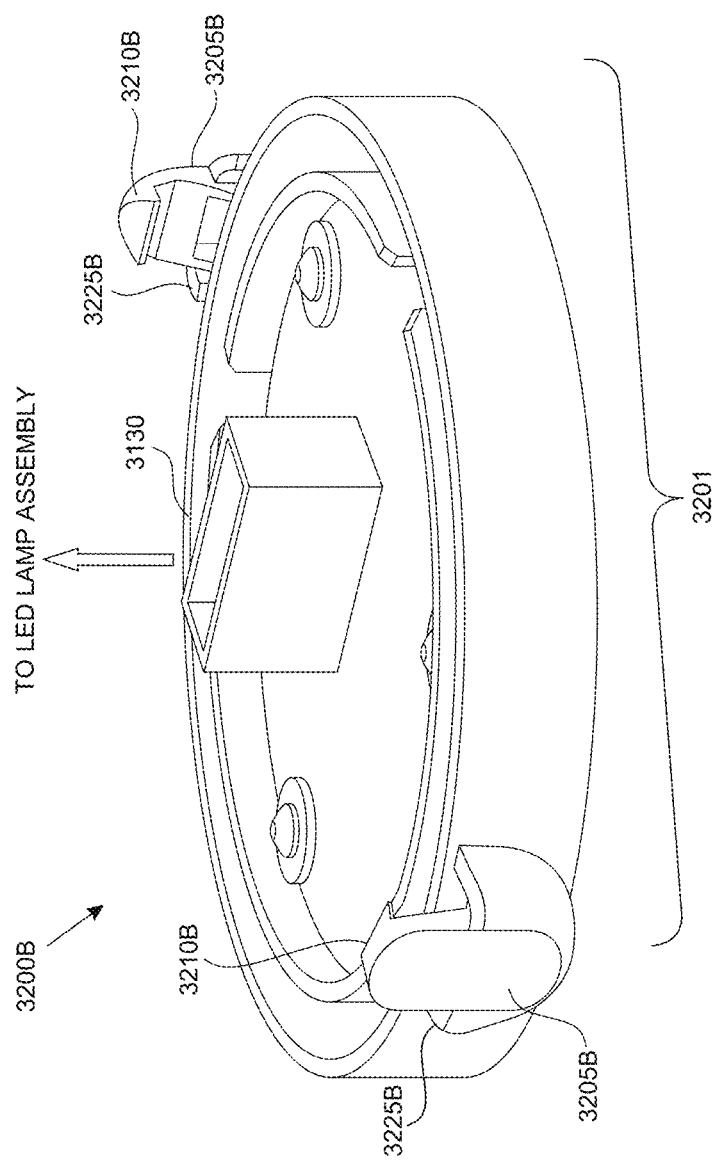
FIG. 32B depicts a semi-exploded perspective view of an exemplary electronic accessory having non-releasable couplers.

FIG. 32B depicts a semi-exploded perspective view of an exemplary electronic accessory having non-releasable couplers. Similar to the electronic accessory 3200A, an electronic accessory 3200B includes an accessory body 3201. The accessory 3200B includes at least one non-releasable coupler 3205B. Each non-releasable coupler 3205B includes a retention hook/ear member 3210B. Each coupler 3205B is fixedly coupled to the accessory body 3201. For example, in at least one embodiment, the couplers 3205B may be integrally and unitarily formed with the body 3201 (e.g., at fixed member couplers 3225B, using an injection molding process). In some embodiments, the couplers 3205B may be welded to the body 3201 and/or the fixed member couplers 3225B. In contrast with the couplers 3205A, the couplers 3205B are not configured to freely rotate about a rotational axis. Rather, the couplers 3205B may undergo slight elastic deformation as the accessory 3200B is assembled with a lamp, such that once the accessory 3200B is coupled to the lamp, the accessory 3200B is not removable/releasable from the lamp without mechanical damage or breakage of parts of the LED system (in such a case, the accessory 3200B is "permanently installed" into its associated lamp).

In some implementations, the (non-releasable) accessory 3300B may unremovable by hand, and may only be removed through the use of specialized mechanical tools (therefore being only "toolably-removable").

Figure 33A:
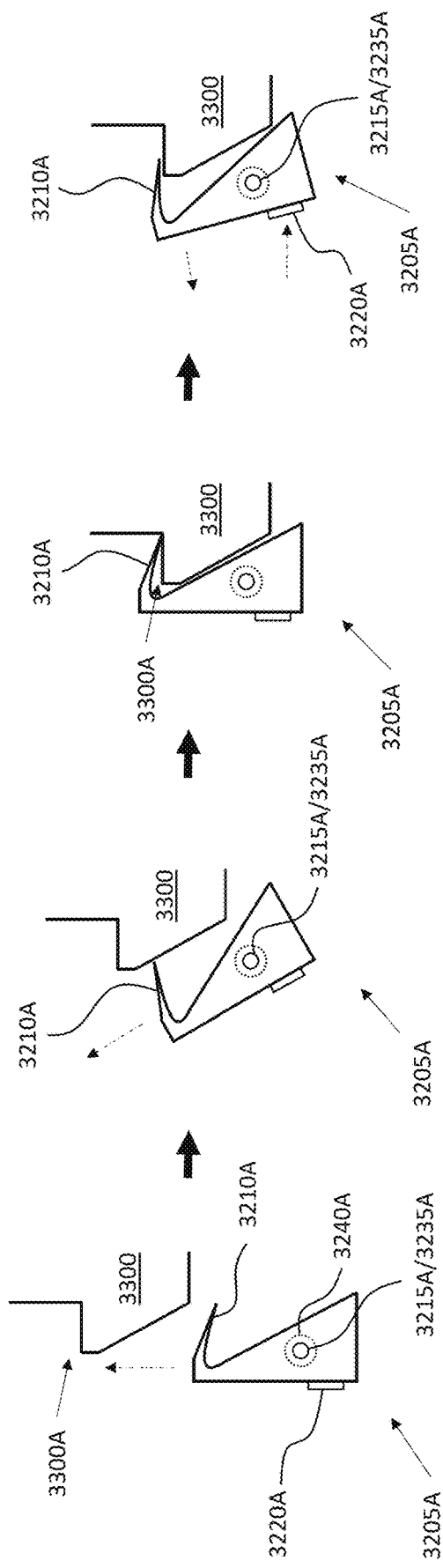
FIG. 33A depicts a side elevation view of an exemplary releasable coupler coupling to a lamp assembly.

FIG. 33A depicts a side elevation view of an exemplary releasable coupler coupling to a lamp assembly. A releasable coupler 3205A includes a hook/ear member 3210A, a pressing area 3220A, and pivot point 3215A (occupied by a pivot pin 3235A). As shown in the left side of FIG. 33A, the coupler 3205A is translating upward towards a portion of a lamp assembly 3330, but has not yet engaged any part of the lamp assembly 3330 (this configuration may be referred to as a disengaged or decoupled state). The lamp assembly 3300 includes a shoulder or lip 3300A. As shown in the left-center of FIG. 33A, the coupler 3205A has translated further up toward the lamp assembly 3330. As the coupler 3205A translates upward, the coupler 3205A may be rotated about its rotational axis, such that the hook 3210A may be able to move past the assembly 3300 without undue stress or bending (this configuration may be referred to as an intermediate, transitional, or deflected state). As shown in the right-center of FIG. 33A, the coupler 3205A has translated far enough so that the hook 3205 passes past the shoulder, such that the hook 3205 is able to engage shoulder 3300A, to mechanically, yet releasably couple the electronic accessory to the LED lamp (this configuration may be referred to as a coupled or engaged state). As shown in the right side of FIG. 33A, the accessory may be removed by a user pressing on the pressing area 3220A, which causes the coupler 3205A to rotate about the pivot point 3215A, thus allowing the hook 3210A to move off of the lip 3300A and off of the LED lamp assembly 3300 to decouple/release the accessory from the lamp (this configuration is also a form of intermediate/transitional/deflected state).

Figure 33B:
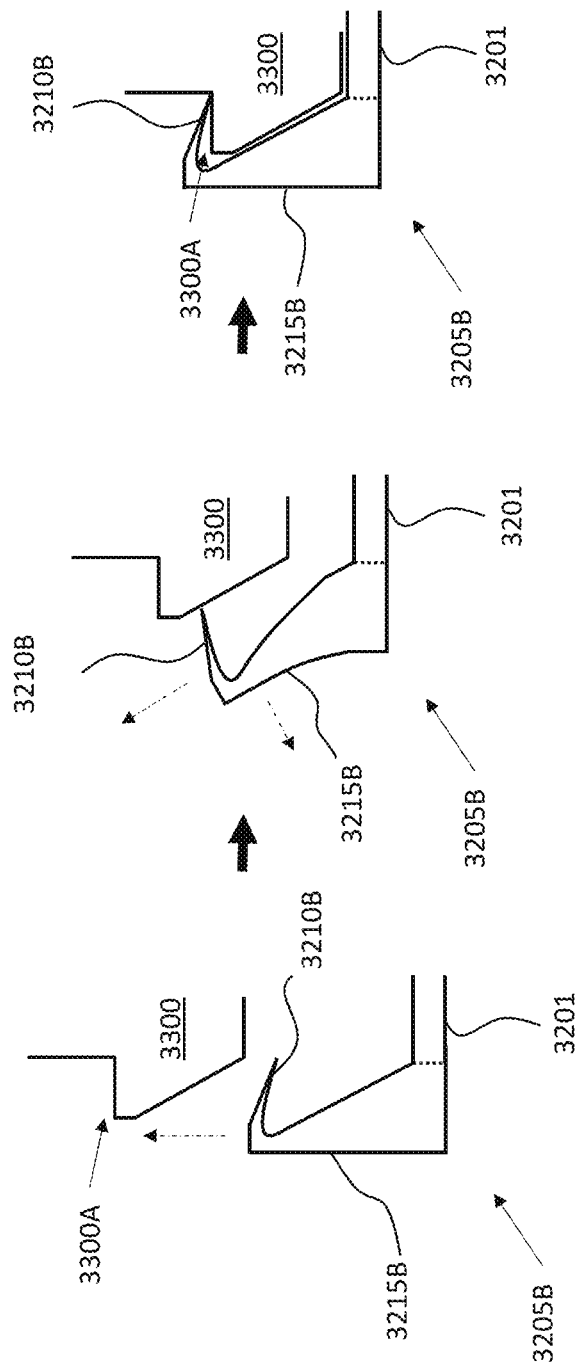
FIG. 33B depicts a side elevation view of an exemplary non-releasable coupler coupling to a lamp assembly.

FIG. 33B depicts a side elevation view of an exemplary non-releasable coupler coupling to a lamp assembly. A non-releasable coupler 3205B includes a hook member 3210B, and a bridge 3215B. In this exemplary embodiment, the coupler 3205B is fixedly coupled to the electronic accessory body 3201 (e.g., via welding or unitary injection molding process). As shown in the left side of FIG. 33B, the coupler 3205B is translating upward towards a portion of a lamp assembly 3330, but has not yet engaged any part of the lamp assembly 3330 (this configuration may be referred to as a disengaged or decoupled state). The lamp assembly 3330 includes a shoulder or lip 3300A. As shown in the center of FIG. 33A, the coupler 3205A has translated further up toward the lamp assembly 3330. As the coupler 3205B translates upward, the coupler 3205B does not freely rotate about a pivot point (in contrast with the coupler 3205A), but rather will bend (elastically) along the bridge 3215B, due to the physical surface contact between the hook 3210B and a surface of the lamp assembly 3330 (this configuration may be referred to as an intermediate, transitional, or deflected state). As the coupler 3205B continues the translate upward, the coupler 3205B will continue to bend until the hook 3210B reaches the lip 3300A, at which point the hook may "snap" into place and engage the shoulder 3330A (this configuration may be referred to as a coupled or engaged state). Now if a user were to attempt to decouple an accessory having couplers 3205B from a lamp 3300, the user will not be able to remove the accessory without inflicting significant damage and breakage to various parts of the system (e.g., possibly breaking off the hooks 3210B and/or the bridge 3215B. In this sense, the coupler 3205B may be a non-releasable coupler that disallows a user from decoupling the accessory from the lamp. Put another way, once the coupler 3205B transitions to the engaged state to lock into the LED lamp, the non-releasable coupler 3205B is not capable of transitioning back to either the intermediate or the disengaged states (it is a "one-way" coupling).

In various examples, the distal ends of the couplers 3205A, 3205B may rotate or translate radially outward instead of radially inward. For example, in the mirror image of the illustrations of FIGS. 33A-33B, the ears/hooks 3210A, 3210B may snap radially outward relative to the electronic accessory to which the couplers 3205A, 3205B are attached. In such examples, the shoulder 3300A may also be reversed to face radially inward (as opposed to facing outward, as shown in FIGS. 33A-33B).

Figure 34:
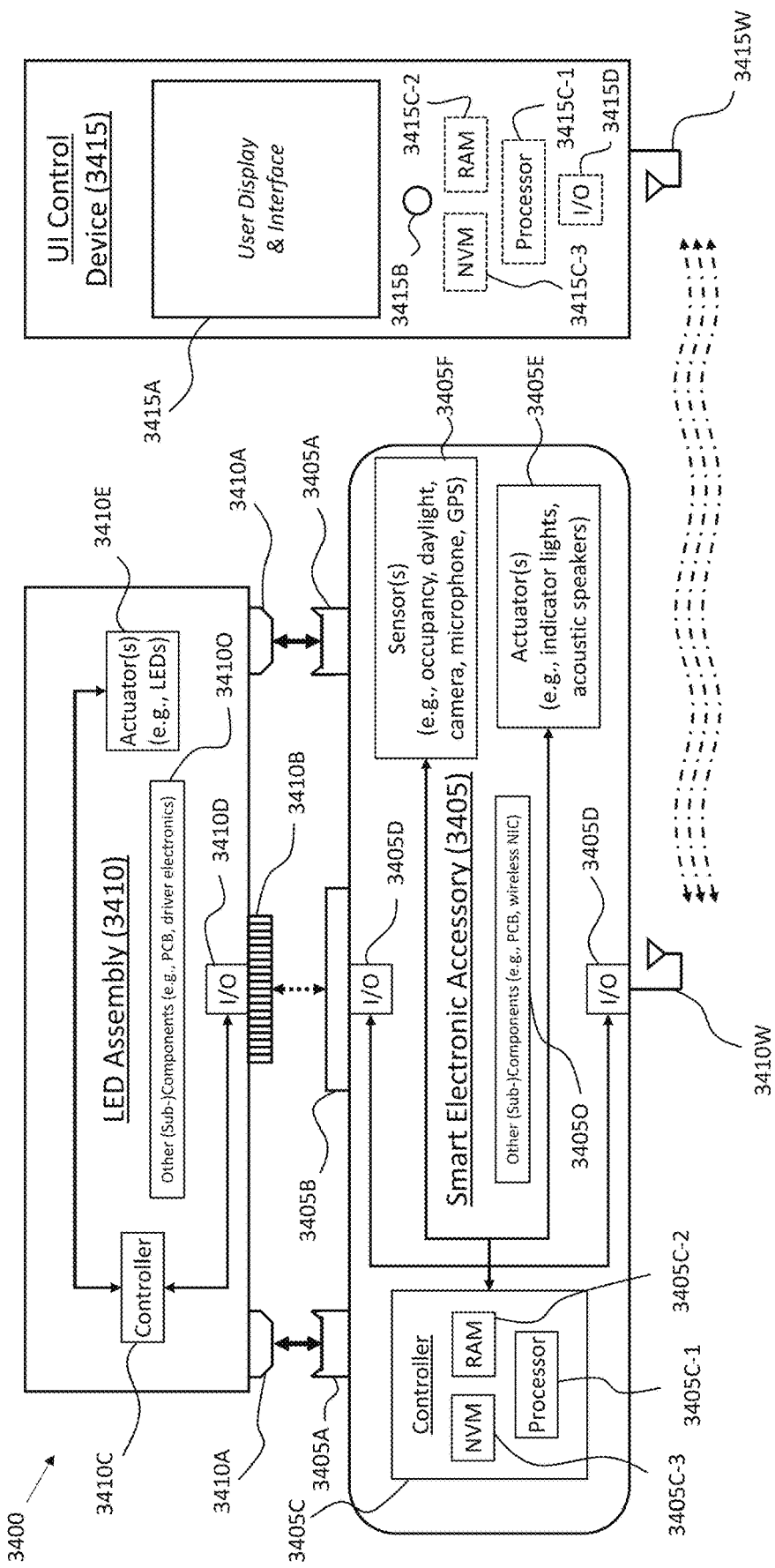
FIG. 34 depicts a block diagram view of an exemplary system including electronic accessory being coupled to the LED system and driver assembly.

FIG. 34 depicts a block diagram view of an exemplary system including electronic accessory being coupled to the LED system and driver assembly. A shown in FIG. 34, a wireless lighting control system 3400 includes a smart accessory 3405 (e.g., similar to the electronic accessory 3020 of FIG. 30), an LED lamp assembly 3410 (e.g., similar to the LED lamp 3025 of FIG. 30), and a user interface (UI) control device 3415 (e.g., similar to the user device 3070 of FIG. 30). The smart accessory 3405 includes at least one coupler 3405A configured to operably couple (releasably or non-releasably) to complementary couplers 3410A of the LED assembly 3410. The smart accessory 3405 includes a data, control, and power interface 3405B configured to operably couple to a complementary data and power interface 3410B of the LED assembly 3410. The accessory 3405 also includes a controller 3405C having a processor 3405C-1, volatile memory 3405C-2, and non-volatile memory 3405C-3. The accessory 3405 also includes inputs/outputs (I/O) 3405D (e.g., I/O for the data and power interface 3405B and I/O for a wireless signal antenna 3410W). The accessory 3405 further includes at least one actuator 3405E (e.g., similar to actuator 3020D), which may be an indicator light, acoustic speaker, or other actuators already described with respect to actuator 3020D. The accessory 3405 further includes at least one sensor 3405F similar to sensor 3020C, which may be an occupancy sensor, microphone, GPS, or other sensor already described with respect to sensor 3020C.

When the accessory 3405 is operably coupled to the LED assembly 3410, the accessory 3405 may control the function and adjust the operating parameters of the assembly 3410 via the interfaces 3405B, 3410B. The LED assembly 3410 may include its own controller 3410C (including a processor and memory), as well as at least one actuator 3410E, which may be an array of LEDs, for example.

The functioning of the LED assembly 3410 is wirelessly controlled and monitored by the UI control device 3415 via wireless data signals. In the depicted example, the device 3415 is a smartphone device having a user display and interface 3415A (e.g., a touchscreen display). The device 3415 also includes a user input 3415B (e.g., such as a press button switch). The device 3415 further includes a processor 3415C-1, volatile memory 3415C-2, non-volatile memory 3415C-3, and I/O 3415D. The device 3415 may communicate wirelessly with the accessory 3405 via a wireless signal antenna 3415W to send commands to the accessory and/or receive data from the accessory.

The accessory 3405 may further include other components 3405O, such as a PCB and/or a wireless network interface card (NIC), for example. The assembly 3410 may further include other components 3410O, such as a PCB and/or driver electronics, for example.

In various examples, the accessory 3405 may include various options and combinations of sensors/actuators/other components to facilitate different applications and use-cases. For example, electronic accessory options may include some or various combinations of the following: wireless antenna communication, light output level sensors, occupancy sensors, daylight sensors, cameras, lights, acoustic speakers, microphone, GPS sensor, wireless repeater, thermometer, and/or fire alarm. Possible wireless transmission capabilities may include Bluetooth, Xicato, Casambi, AviON, Silvair, Zigbee, GE Daintree, nLight, Lutron, or proprietary (e.g., Luxon/NEDAP).

FIG. 35 depicts a side cross-sectional view of an exemplary electronic accessory configured to couple with an LED system, including a mechanically floating printed circuit board (PCB) in one plane. Mounted to the accessory body 3201 is a printed circuit board (PCB) 3505. The PCB 3505 mounts to the body 3201 via at least one fastening pin 3510 (two depicted in FIG. 35). Each fastening pin 3510 includes a pin extension section 3510A terminating in a pin head section 3510B. The fastening pins 3510 are shown as being mechanically fixed to the body 3201. The PCB 3505 includes at least one fastening aperture 3515 having a cross-sectional area slightly larger than the cross-sectional area of the pin extension section 3510A (as depicted in FIG. 35) such that the pin head 3510B captures PCB 3505 from moving vertically but allows for horizontal motion. For example, a diameter of the fastening aperture 3515 may be sized about 0.1, 0.2, 0.5, 1, 1.5, 2, 3, 4, or about 5 millimeters larger than a diameter of the pin extension 3510A. Each fastening aperture 3515 includes an elastic grommet (also indicated by 3515) that occupies the space between the surface of the aperture 3515 and the surface of the pin extension 3510A. The elastic grommet 3515 may be formed of an elastic material (e.g., rubber, silicone) that undergoes elastic deformation when put under force or pressure. Each elastic grommet 3515 is shown encircling an associated pin extension 3510A and being encircled by an associated aperture 3515. Since the elastic grommets 3515 elastically yield under force, movement of the pin extensions 3510A in the apertures 3515 may be permitted, yet spatially limited by the presence of the grommets 3515. Furthermore, the grommets 3515 may act to bias the pin extensions 3510 in an equilibrium position relative to associated apertures 3515, such that the PCB 3505 is capable of limited horizontal translational movement (e.g., "floating") relative to the accessory body 3201. The vertical translational movement of the PCB 3505 is also limited by the presence of the pin heads 3510B, which are sized larger than the apertures 3515 to prevent the PCB 3505 from being released from the fastening pins 3510. For example, a diameter of the fastening aperture 3515 may be sized about 0.1, 0.2, 0.5, 1, 1.5, 2, 3, 4, or about 5 millimeters smaller than a diameter of the pin heads 3510B. Using the structures 3510 and 3515, the PCB 3505 may therefore be able to advantageously self-adjust to interface with the driver 3125, as misalignment of the accessory interface 3130 and the driver interface 3125 may be rectified by the PCB 3505 floating and spatially adjusting (ever so slightly) relative to the body 3201 to properly engage the two interfaces 3125 and 3130.

To provide additional alignment functionality between the interfaces 3125 and 3130, the accessory interface 3130 includes an electrical connection point 3130A integrated with an interface guider 3130B. The interface guider 3130B, in this exemplary depiction, is a chamfered structure located at a distal end of the interface 3130, and configured to guide the driver interface 3125 towards electrical contact with the electrical connection point 3130A. The interface guider 3130B may therefore cooperate with the floating PCB 3505 to yield even more effortless alignment of the interfaces 3125 and 3130 as the electronic accessory 3100 is brought into mechanical and electrical engagement with the LED system 3105.

In an illustrative aspect, a light emitting diode (LED) system may include a lighting system (e.g., 3105). The lighting system may include a front lighting area of the lighting system, and at least one LED disposed at the front lighting area, the at least one LED being oriented to radiate light away from the front area in operation (e.g., as seen in FIG. 30). The lighting system may include an electronic driver (e.g., 3120) configured to deliver operating power in operation. The LED system may include an electronic accessory (e.g., 3110). The LED system may include at least one coupler (e.g., 3135A, 3135B) configured to fixedly and releasably couple the electronic accessory to the lighting system. The at least one coupler may be configured to: (1) toolessly couple the electronic accessory at the lighting system by hand, and (2) toolably decouplable the electronic accessory from the lighting system using only tools. The at least one coupler may be included with the lighting system or the electronic accessory. The LED system may include an electrical connection configured to deliver the operating power to the electronic accessory from the electronic driver.

In various examples, the at least one coupler may include at least one snap fit member configured to snap-couple the electronic accessory to the lighting system, where when the electronic accessory is fixedly and mechanically snap-coupled to the lighting system, the electronic accessory may be releasably coupled to the lighting system via the snap fit member. The LED system may include a data connection configured to perform at least one of: (1) transmit a first data connection signal to the electronic accessory from the lighting system, and (2) transmit a second data connection signal the lighting system from the electronic accessory. In some examples at least one operating parameter of the lighting system may be controllable by the electronic accessory via the data connection. In some embodiments, the at least one operating parameter of the lighting system may include a light output level parameter associated with a lighting intensity of the at least one LED of the lighting system. The electronic accessory may, in various implementations, be configured to transmit a control signal from the electronic accessory to the lighting system using at least one of: (1) a pulse-width modulated (PWM) control signal, (2) a 0-10V electrical signal, and (3) a serial data communication protocol.

The electronic accessory may include, for example, a wireless interface configured to perform at least one of: (1) receive a first wireless data signal at the electronic accessory from a wireless device, and (2) transmit a second wireless data signal to the wireless device from electronic accessory. At least one operating parameter of the lighting system may be configured to be controlled in response to a wireless control signal transmitted from the wireless device to the electronic accessory via the wireless interface when the electronic accessory is operably coupled at the lighting system. The electronic accessory may include, for example, a non-transitory data store storing a unique lamp identification code, such that when the electronic accessory is operably coupled at the lighting system, the lighting system is configured to respond to a wireless command signal transmitted to the electronic accessory, the wireless command signal being associated with the lamp identification code. The lamp identification code may be hardware-based code (rather than programable), such as MAC address, for example. In some embodiments, the electronic driver may be configured to transmit operating parameter data associated with operation of the lighting system to the wireless device via the data connection, the electronic accessory, and the wireless interface, when the electronic accessory is operably coupled at the lighting system.

The electronic accessory may include at least one sensor that may include at least one of a motion sensor, sound sensor, temperature sensor, camera, infrared (IR) camera, smoke sensor, microphone, location sensor, GPS sensor, temperature sensor, RF occupancy sensor, directional motional sensor, humidity sensor, gas sensor, chemical analyzer, or gas analyzer, for example. The electronic accessory may include at least one actuator that may include at least one of an indicator light, acoustic speaker, visual display, wireless router, wireless switch, or wireless extender, for example.

Although various embodiments have been described with reference to the Figures, other embodiments are possible. For example, in the embodiment of FIGS. 8A-8F, the heatsink base 802 may thermally connect to the pins 803 to define a thermally conductive path extending proximally along a heat transfer axis that defines an axial fluid communication path (e.g., airflow paths 831) to conduct heat generated by the LED source substantially proximally to exhaust to ambient atmosphere. In the embodiment of FIGS. 9A-9B, the elongated sheet metal fins 901 thermally attach to the heatsink base 902 to define a thermally conductive path extending proximally along a heat transfer axis defining an axial fluid communication path (e.g., vertical air flow from the front 906 of LED system to the interior 907 of the elongated fins and exiting above the elongated fins 910) to conduct heat generated by the LED source substantially proximally to exhaust to ambient atmosphere.

In the embodiment of FIGS. 10A-10F, spacing between the fins 1001, 1006 at an outer perimeter 1004 is larger than the spacing of fins 1001, 1006 near the center region 1008 to define a thermally conductive path extending proximally along a heat transfer axis that defines an axial fluid communication path to conduct heat generated by the LED source substantially proximally to exhaust to ambient atmosphere. In the embodiment of FIGS. 10C-10D, the first fin 1001 has a first radial length and a second fin 1010 has a shorter radial length. The fins 1001, 1010 are arranged to define a thermally conductive path extending proximally along a heat transfer axis defining an axial fluid communication path to conduct heat generated by the LED source substantially proximally to exhaust to ambient atmosphere.

In FIGS. 11A-11E, the fins 1101, 1102 thermally connect thermally and mechanically to either the central column 1103 and/or to the base 1104 such that one or more thermally conductive paths extend proximally along a heat transfer axis that defines an axial fluid communication path to conduct heat generated by the LED source substantially proximally to exhaust to ambient atmosphere.

In some embodiments, the construction of a heatsink, such as the heatsink of FIGS. 8A-11E, may require less metal thereby reducing the weight of a LED system. The heatsink may, advantageously, have more airflow passageways when compared to a conventional LED system to minimize impedance. In various embodiments, the heatsink may increase the operating life of a LED system because of the heatsink may lower the operating temperature of the LED system. In some embodiments, the LED system may be optimized for vertical orientation by providing a substantially straight path for air to flow.

In various embodiments, with reference to FIG. 2C, the outer perimeter 216 may define a first polygon and the inner perimeter 226 may define a second polygon such the first polygon encompasses the second polygon. In some embodiments, the outer perimeter 216 may share a portion of the outer perimeter 216 with a portion of the inner perimeter 226 such that the first polygon shares a boundary with the second polygon, for example, as depicted in FIGS. 8D and 9A.

In some embodiments, a first plurality of LEDs may be projected unto a first plane while a second plurality of LEDs may be projected unto a second plane. In various embodiments, the first plane and the second plane may be the same plane. In various embodiments, the first plane and the second plane may be substantially parallel to each other and may not intersect each other such that when viewed from a top perspective, the LEDs defining the first plane encompass the LEDs defining the second plane.

In various embodiments, an LED-based lighting system with enhanced convective through-flow in an approximately vertical orientation may include a light generation module comprising a plurality of LED sources arranged to illuminate along an optical axis in a distal direction. The plurality of LED sources may be spaced apart from each other by one or more open regions. For each one of the plurality of the LED sources of the light generation module may include a heat transfer member in substantial thermal communication with the LED source such that the heat transfer member has a thermally conductive path extending proximally along a heat transfer axis that is substantially parallel to the optical axis. When in operation, the heat transfer member conducts heat generated by the LED source substantially proximally. The LED-based lighting may further include an optic module having a plurality of optics spaced apart from each other by one or more optic open regions such that each optic corresponds to at least one of the LED sources. Each optic open region may correspond to one of the open regions when the optic module is aligned with the light generation module. The open regions defining at least one or more apertures such that the at least one or more optic apertures defined in the one or more optic open regions aligns with a corresponding one or more apertures in the open region to define an axial fluid communication path through the one or more apertures and the one or more optic apertures, the axial fluid communication path parallel to the optical axis to remove heat from one or more of the heat transfer members, wherein each of the axial communication paths extends proximally to the exhaust to ambient atmosphere.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A light emitting diode (LED) system comprising:
 a lighting system comprising:
  a front lighting area of the lighting system;
  at least one LED disposed at the front lighting area, the at least one LED being oriented to radiate light away from the front area in operation; and,
  an electronic driver configured to deliver operating power in operation;
 an electronic accessory;
 at least one coupler configured to fixedly and releasably couple the electronic accessory to the lighting system, wherein the coupler is configured to: (1) toolessly couple the electronic accessory at the lighting system by hand, and (2) toolably decouplable the electronic accessory from the lighting system using only tools, wherein the at least one coupler is comprised in at least one of the lighting system and the electronic accessory; and,
 an electrical connection configured to deliver the operating power to the electronic accessory from the electronic driver.

2. The LED system of claim 1, wherein the at least one coupler comprises at least one snap fit member configured to snap-couple the electronic accessory to the lighting system, wherein when the electronic accessory is fixedly and mechanically snap-coupled to the lighting system, the electronic accessory is releasably coupled to the lighting system via the snap fit member.

3. The LED system of claim 1, further comprising a data connection configured to perform at least one of: (1) transmit a first data connection signal to the electronic accessory from the lighting system, and (2) transmit a second data connection signal the lighting system from the electronic accessory.

4. The LED system of claim 3, wherein at least one operating parameter of the lighting system is controllable by the electronic accessory via the data connection.

5. The LED system of claim 4, wherein the at least one operating parameter of the lighting system comprises a light output level parameter associated with a lighting intensity of the at least one LED of the lighting system.

6. The LED system of claim 4, wherein the electronic accessory is configured to transmit a control signal from the electronic accessory to the lighting system using at least one of: (1) a pulse-width modulated (PWM) control signal, (2) a 0-10V electrical signal, and (3) a serial data communication protocol.

7. The LED system of claim 1, wherein the electronic accessory comprises a wireless interface configured to perform at least one of: (1) receive a first wireless data signal at the electronic accessory from a wireless device, and (2) transmit a second wireless data signal to the wireless device from electronic accessory.

8. The LED system of claim 7, wherein at least one operating parameter of the lighting system is configured to be controlled in response to a wireless control signal transmitted from the wireless device to the electronic accessory via the wireless interface when the electronic accessory is operably coupled at the lighting system.

9. The LED system of claim 7, wherein the electronic accessory comprises a non-transitory data store storing a unique lamp identification code, such that when the electronic accessory is operably coupled at the lighting system, the lighting system is configured to respond to a wireless command signal transmitted to the electronic accessory, the wireless command signal being associated with the lamp identification code.

10. The LED system of claim 7, wherein the electronic driver is configured to transmit operating parameter data associated with operation of the lighting system to the wireless device via the data connection, the electronic accessory, and the wireless interface, when the electronic accessory is operably coupled at the lighting system.

11. The LED system of claim 1, wherein the electronic accessory comprises at least one sensor comprising at least one of: a motion sensor, sound sensor, temperature sensor, camera, infrared (IR) camera, smoke sensor, microphone, location sensor, GPS sensor, temperature sensor, RF occupancy sensor, directional motional sensor, humidity sensor, gas sensor, chemical analyzer, gas analyzer.

12. A light emitting diode (LED) system comprising:
a lighting system comprising:
a front lighting area of the lighting system;
at least one LED disposed at the front lighting area, the at least one LED being oriented to radiate light away from the front area in operation; and,
an electronic driver configured to deliver operating power in operation;
an electronic accessory;
at least one coupler configured to fixedly and releasably couple the electronic accessory to the lighting system, wherein the coupler is configured to: (1) toolessly couple the electronic accessory at the lighting system by hand, and (2) toolably decouplable the electronic accessory from the lighting system using only tools; and,
an electrical connection configured to deliver the operating power to the electronic accessory from the electronic driver.

13. The LED system of claim 12, wherein the at least one coupler comprises at least one snap fit member configured to snap-couple the electronic accessory to the lighting system, wherein when the electronic accessory is fixedly and mechanically snap-coupled to the lighting system, the electronic accessory is releasably coupled to the lighting system via the snap fit member.

14. The LED system of claim 12, further comprising a data connection configured to perform at least one of: (1) transmit a first data connection signal to the electronic accessory from the lighting system, and (2) transmit a second data connection signal the lighting system from the electronic accessory.

15. The LED system of claim 12, wherein the electronic accessory comprises a wireless interface configured to perform at least one of: (1) receive a first wireless data signal at the electronic accessory from a wireless device, and (2) transmit a second wireless data signal to the wireless device from electronic accessory.

16. The LED system of claim 12, wherein the electronic accessory comprises at least one sensor and at least one actuator, wherein:
the at least one sensor comprises at least one of: a motion sensor, sound sensor, temperature sensor, camera, infrared (IR) camera, smoke sensor, microphone, location sensor, GPS sensor, temperature sensor, RF occupancy sensor, directional motional sensor, humidity sensor, gas sensor, chemical analyzer, gas analyzer, and,
the at least one actuator comprises at least one of an indicator light, an acoustic speaker, a visual display, a wireless router, a wireless switch, or a wireless extender.

17. A light emitting diode (LED) system comprising:
a lighting system comprising:
a front lighting area of the lighting system;
at least one LED disposed at the front lighting area, the at least one LED being oriented to radiate light away from the front area in operation; and,
an electronic driver configured to deliver operating power in operation;
an electronic accessory;
at least one means for coupling configured to fixedly and releasably couple the electronic accessory to the lighting system, wherein the means for coupling is configured to: (1) toolessly couple the electronic accessory at the lighting system by hand, and (2) toolably decouplable the electronic accessory from the lighting system using only tools; and,
an electrical connection configured to deliver the operating power to the electronic accessory from the electronic driver.

18. The LED system of claim 17, further comprising a data connection configured to perform at least one of: (1) transmit a first data connection signal to the electronic accessory from the lighting system, and (2) transmit a second data connection signal the lighting system from the electronic accessory.

19. The LED system of claim 17, wherein the electronic accessory comprises a wireless interface configured to perform at least one of: (1) receive a first wireless data signal at the electronic accessory from a wireless device, and (2) transmit a second wireless data signal to the wireless device from electronic accessory.

20. The LED of claim 17, wherein the electronic accessory comprises at least one sensor and at least one actuator, wherein:
the at least one sensor comprises at least one of: a motion sensor, sound sensor, temperature sensor, camera, infrared (IR) camera, smoke sensor, microphone, location sensor, GPS sensor, temperature sensor, RF occupancy sensor, directional motional sensor, humidity sensor, gas sensor, chemical analyzer, gas analyzer, and, the at least one actuator comprises at least one of an indicator light, an acoustic speaker, a visual display, a wireless router, a wireless switch, or a wireless extender.

\* \* \* \* \*